United States Patent [19]

Naoi et al.

[11] Patent Number: 5,572,602
[45] Date of Patent: Nov. 5, 1996

[54] IMAGE EXTRACTION SYSTEM FOR EXTRACTING PATTERNS SUCH AS CHARACTERS, GRAPHICS AND SYMBOLS FROM IMAGE HAVING FRAME FORMED BY STRAIGHT LINE PORTIONS

[75] Inventors: Satoshi Naoi; Maki Yabuki; Atsuko Asakawa, all of Kawasaki, Japan

[73] Assignee: Fujitsu Limited, Kawasaki, Japan

[21] Appl. No.: 192,592

[22] Filed: Feb. 7, 1994

[30] Foreign Application Priority Data

Feb. 25, 1993 [JP] Japan ................................. 5-036602
Apr. 28, 1993 [JP] Japan ................................. 5-103257

[51] Int. Cl.$^6$ ....................................... G06K 9/36
[52] U.S. Cl. .......................... 382/178; 382/202; 358/462
[58] Field of Search ........................... 382/22, 9, 7, 24, 382/25, 138, 177, 178, 199, 202, 203, 462

[56] References Cited

U.S. PATENT DOCUMENTS

| | | | |
|---|---|---|---|
| 4,292,622 | 9/1981 | Henrichon, Jr. | 382/9 |
| 4,377,803 | 3/1983 | Lotspiech et al. | 382/9 |
| 4,741,095 | 8/1988 | Denning | 382/9 |
| 5,048,107 | 9/1991 | Tachikawa | 382/9 |
| 5,138,668 | 8/1992 | Abe | 382/9 |
| 5,181,261 | 1/1993 | Nagao | 382/22 |
| 5,191,612 | 3/1993 | Katsuyama et al. | 382/9 |

FOREIGN PATENT DOCUMENTS 62-212888  9/1987  Japan .
3-126186   5/1991  Japan .

Primary Examiner—Yon J. Couso
Assistant Examiner—Larry J. Prikockis
Attorney, Agent, or Firm—Staas & Halsey

[57] ABSTRACT

In an image extraction system, an extracting part for extracting wide lines, an extracting part for extracting narrow lines and a frame detector detect a frame from a pattern which is extracted by a connected pattern extracting part. An attribute adder adds attributes of a character (graphic and symbol inclusive), frame, and a contact pattern of the character and frame to a partial pattern, and a separating part separates the frame from the contact pattern. An intersection calculator calculates intersections of the character and frame, and the calculated intersections are associated by an intersection associating part. An interpolator obtains a character region within the frame and interpolates this region based on the associated intersections. A connection confirming part confirms a connection of the pattern with respect to the extracted character pattern, and patterns confirmed of their connection are integrated in a connected pattern integrating part to thereby extract the character.

18 Claims, 60 Drawing Sheets

F I G. 5
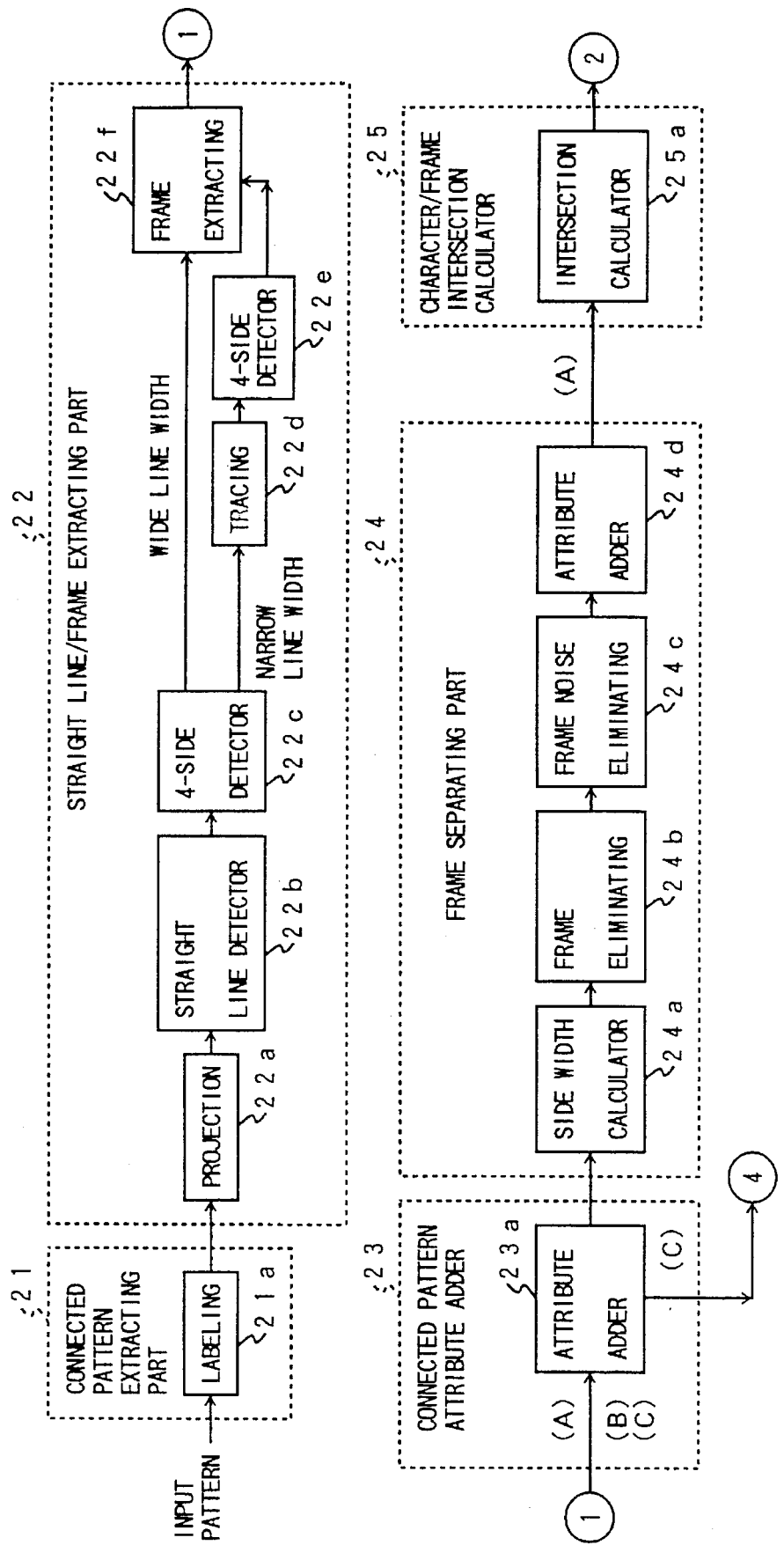

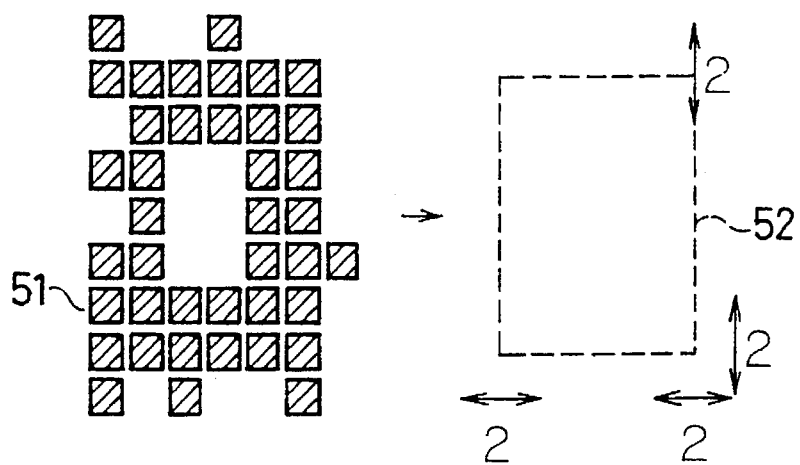
FIG. 11A
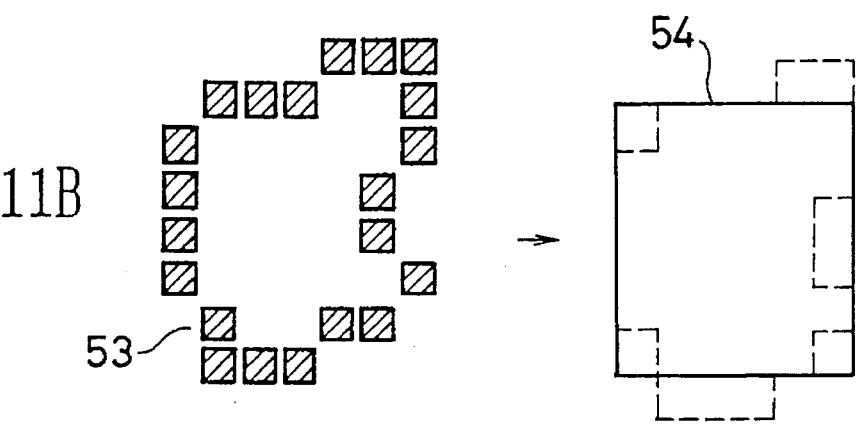
FIG. 11B
FIG. 12
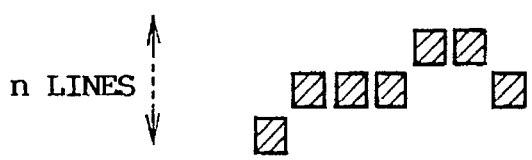
n LINES

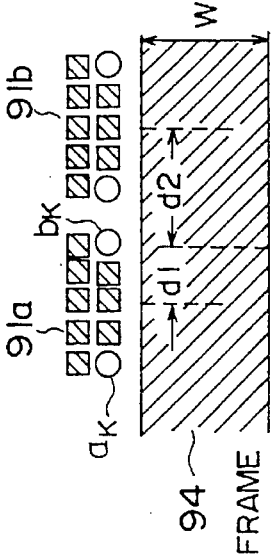
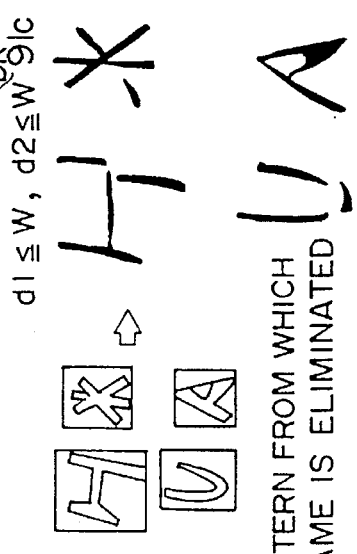
FIG. 22A — 1ST CONDITIONS, DISTANCE (BETWEEN MIDDLE POINTS)
$d1 \leq W$, $d2 \leq W$
FIG. 22B — 2ND CONDITIONS, CONTINUITY
FIG. 22C — 3RD CONDITIONS, DISTANCE (BETWEEN INTERSECTIONS)
$d3 \leq W/2$, $d4 \leq W/2$
PATTERN FROM WHICH FRAME IS ELIMINATED

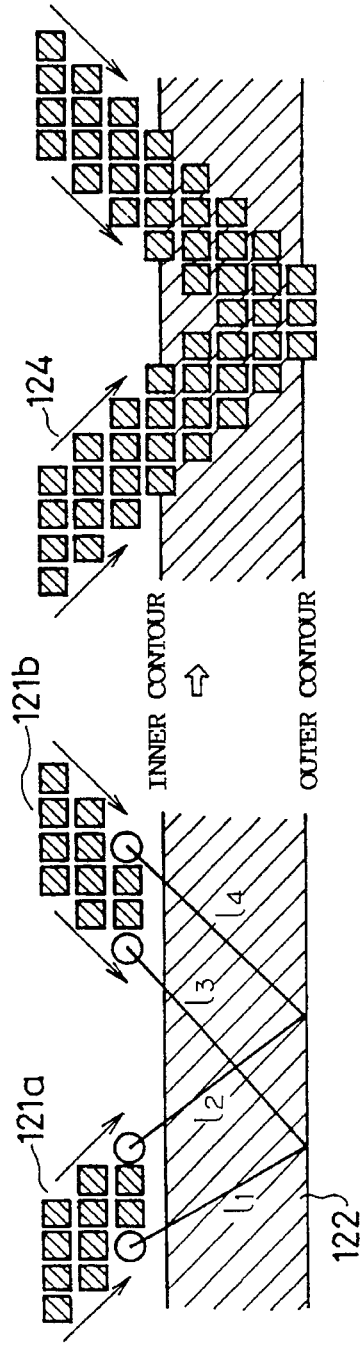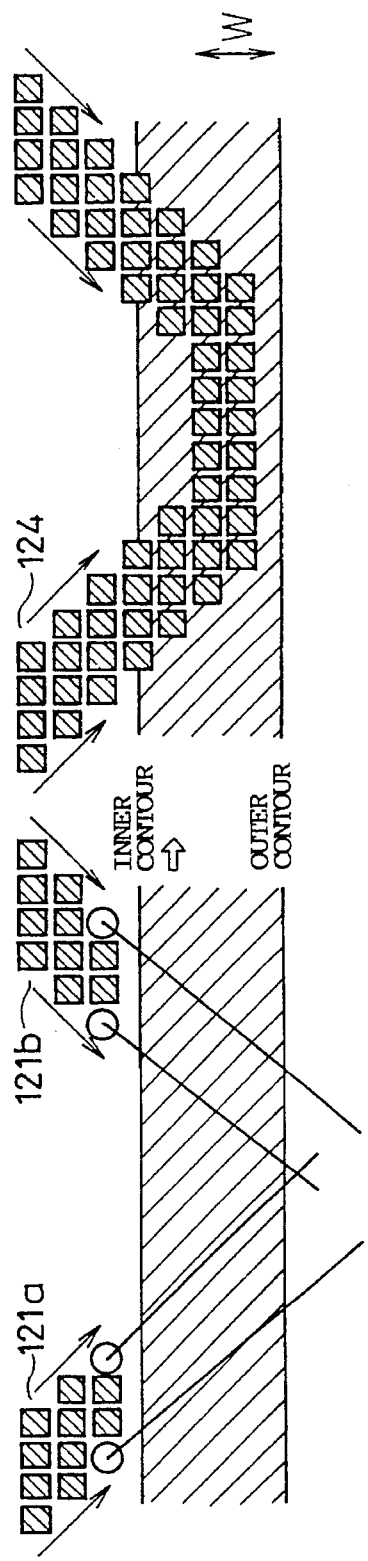
FIG. 29A
FIG. 29B

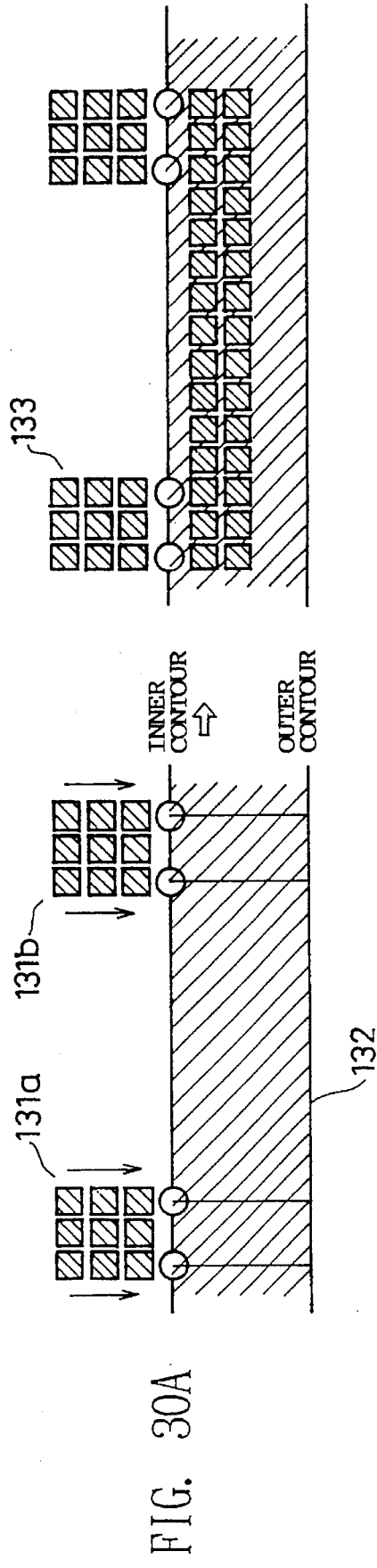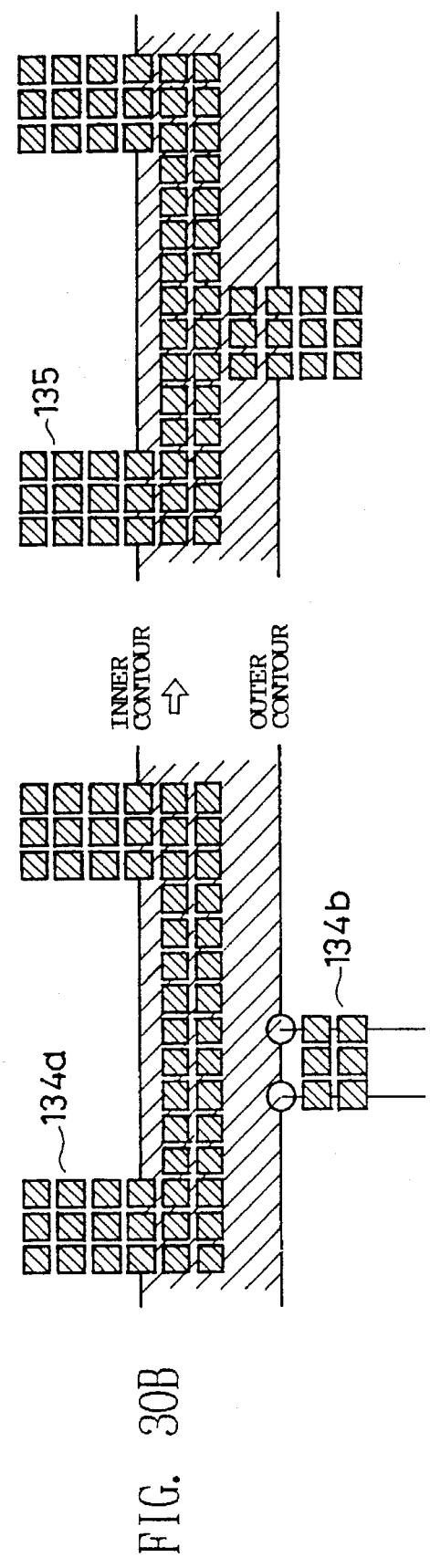
FIG. 30A
FIG. 30B

FIG. 40A 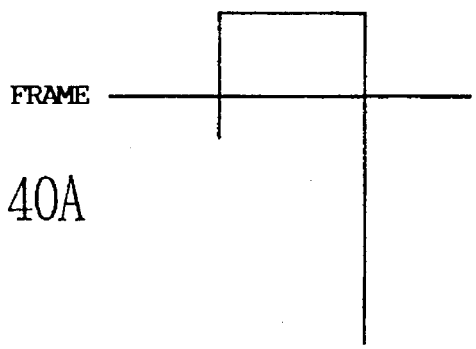 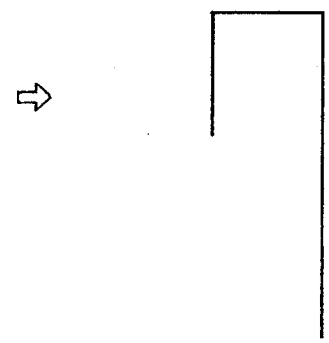
FIG. 40B 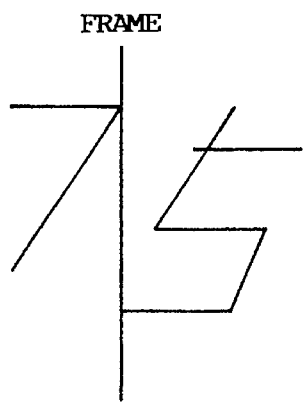 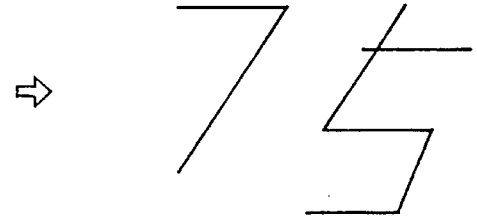
FIG. 40C 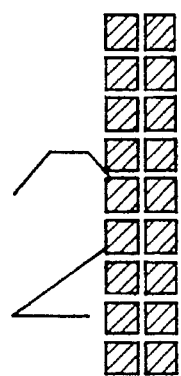 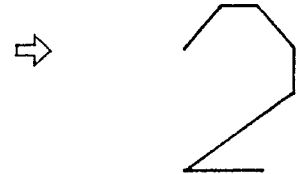

BEFORE PROCESSING    AFTER PROCESSING    AFTER PROCESSING    CORRECT SOLUTION

FIG. 46

| | ASSOCIATING CONDITIONS |
|---|---|
| ○ | HAVING DIFFERENT LABEL & SHORTER DISTANCE BETWEEN INTERSECTIONS |
| × | HAVING DIFFERENT LABEL & LONGER DISTANCE BETWEEN INTERSECTIONS |
| × | HAVING SAME LABEL & SHORTER DISTANCE BETWEEN INTERSECTIONS |
| × | HAVING SAME LABEL & LONGER DISTANCE BETWEEN INTERSECTIONS |
| × | BETWEEN ALL INTERSECTIONS |

310

CORRECT SOLUTION

FIG. 48
| KIND OF CHARACTER | NUMERAL | ALPHABET | HIRAGANA | KATAKANA |
|---|---|---|---|---|
| ASSOCIATION FOR EACH FRAME | UPPER FRAME PORTION : ○<br>LEFT FRAME PORTION : ○ | UPPER FRAME PORTION : ○<br>LEFT FRAME PORTION : ○ | UPPER FRAME PORTION : ×<br>LEFT FRAME PORTION : ○ | UPPER FRAME PORTION : ○<br>LEFT FRAME PORTION : × |
FIG.49A      FIG.49B
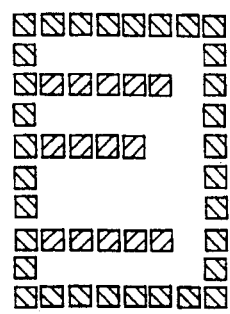    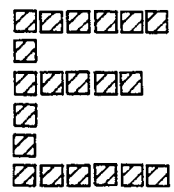

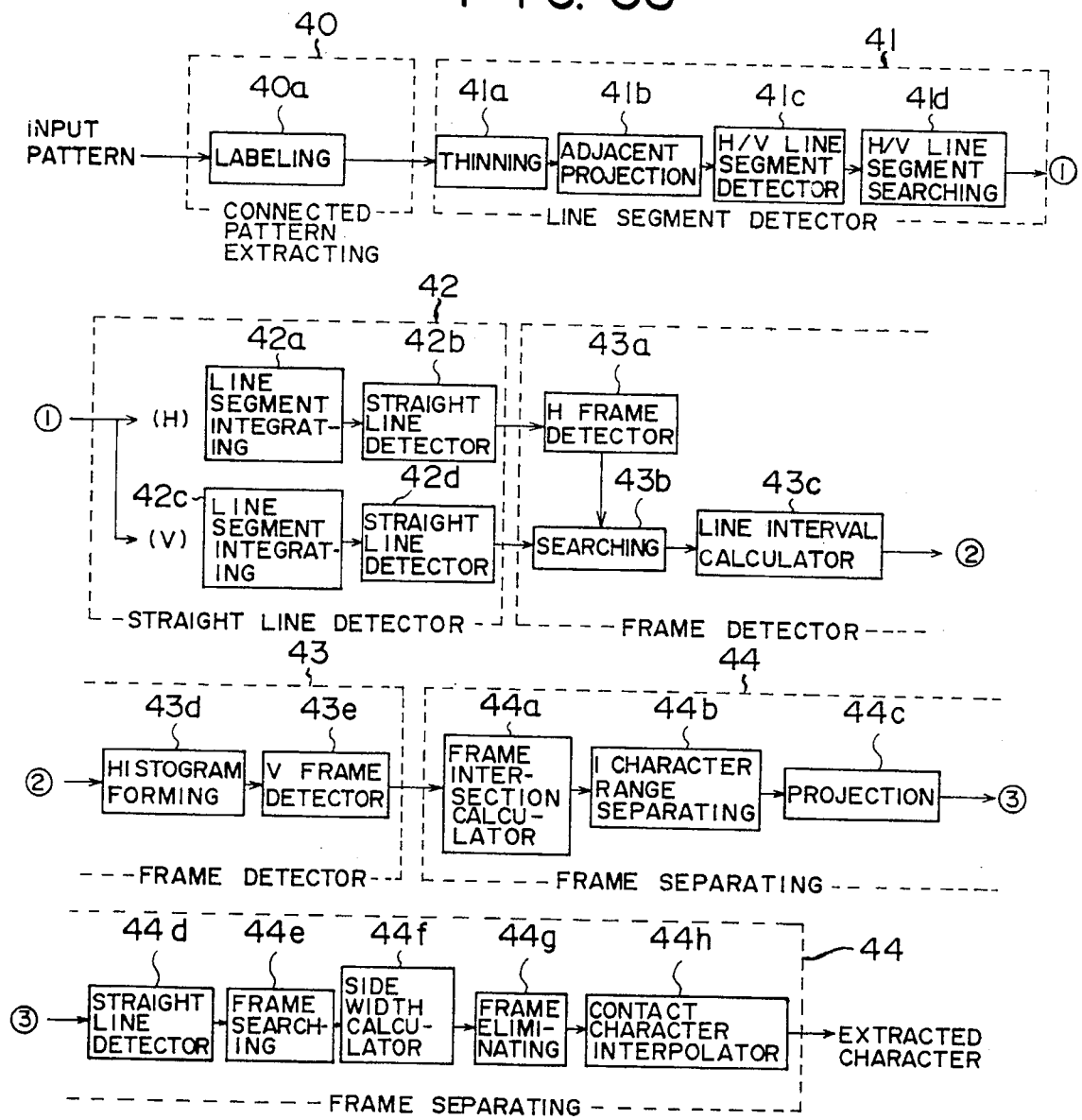

EXTRACTED FRAME

ORIGINAL PATTERN

FIG. 69A 054863729051
21745896/3870
*HPQRSTUAONC
JSP*RTNOPCD
31543981540T

FRAME ELIMINATION

FIG. 69B 054863729051
21745896/3870
*HPQRSTUAONC
JSP*RTNOPCD
31543981540T

AFTER ASSOCIATING PROCESS

IMAGE EXTRACTION SYSTEM FOR EXTRACTING PATTERNS SUCH AS CHARACTERS, GRAPHICS AND SYMBOLS FROM IMAGE HAVING FRAME FORMED BY STRAIGHT LINE PORTIONS

BACKGROUND OF THE INVENTION

The present invention generally relates to image extraction systems, and more particularly to an image extraction system for extracting characters, graphics and the like which touch a character frame, a rule and the like in a hand-written character recognition apparatus such as an optical character reader (OCR).

As input/output devices designed for hand-written characters, increase the demands for hand-written character recognition apparatuses are increasing. In order to realize a high recognition rate of the individual characters in such a hand-written character recognition apparatus, it is important that the process of extracting the character is carried out accurately prior to the recognition stage.

An example of a document which is th subject of the recognition, there are documents such as form sheets which specify the positions where the characters should be written. In such documents, a frame or the like, which specifies the position where the character should be written, is printed, not in a dropout color, but in the same color and density as the character. That is, a black frame, a black rule or the like, is printed on such a document. Accordingly, if the characters are clearly written within the specified ranges, it is possible to automatically recognize the characters at a relatively high recognition rate. However, if the hand-written character exceeds the specified range and touches or penetrates the frame or rule which indicates the specified range, the recognition rate greatly deteriorates.

Various methods have been proposed to extract only the character which touches the character frame. For example, Japanese Laid-Open Patent Application No.63-251874 proposes a method of extracting a touching character, and Japanese Laid-Open Patent Application No.3-233787 proposes a method of extracting a character image.

FIG.1 shows an example of a conventional character extraction system. In FIG. 1, the character extraction system includes a contact detection means 181 for detecting contact between the character frame and the character, a contact range determination means 183 for determining a contact range between the character and the character frame, and an interpolation means 184 for interpolating an overlapping portion of the character and the character frame by rectangles. Frame position data 182 related to the position and size of the character frame are supplied to the contact detection means 181.

When extracting the character, the frame position data 182 are stored in advance as form sheet data. The contact detection means 181 checks whether or not the black pixels of the input image make contact at the position of the character frame, based on the frame position data 182. In addition, the contact range determination means 183 determines that a region obtained by connecting points where the input image makes contact with the character frame is the character portion within the character frame. The interpolation means 184 regards that the region which is determined by the contact region determination means 183 is the character region, and fills this character region by the rectangles. The character is extracted in this manner.

According to the conventional system described above, it is a precondition that the position and line width of the character frame are known in advance. For this reason, the accuracy of the character extraction is easily affected by a slight skew or unevenness of the character frame. In other words, if a portion of the character frame projects from a predetermined position, for example, this projecting portion will be recognized as the character and this projecting portion will remain as noise. In addition, unwanted joining of the character and the character frame portion may occur and make the quality of the extracted character extremely poor. Further, the original character portion may drop out (that is, become chipped) due to a deviation in the position or line width of the character frame.

On the other hand, the method employed in the conventional system to judge the character region within the character frame does not consider the continuity or connection of the character line segment. As a result, the method simply fills the gap locally by the rectangular region, and there is considerable deterioration in the quality of the extracted character.

FIG.2 shows an example of a character pattern extracted by the conventional system described above. In FIG.2, the left half shows a contact portion between a character line segment 191 and a character frame 192, and the right half shows a portion of the character which is extracted from the pattern shown on the left half.

FIG.2 shows the character line segment 191 which is extracted from the character frame 191 on the precondition that the character frame 192 has a width amounting to 2 pixels. In the character frame portion shown on the left half of FIG. 2, a portion 192a having a width amounting to 2 pixels is eliminated as the character frame portion when the character is extracted. However, a thinned portion 192b having a width narrower than the width amounting to 2 pixels due to grazing or the like will not be eliminated as the character frame portion. For this reason, in the character line segment which is extracted from the pattern shown on the left half of FIG. 2, the character frame portion where the width of the character frame is narrower than the width amounting to 2 pixels due to the grazing or the like remains as a portion of the character, and the character line segment having a poor quality is extracted as shown on the right half of FIG. 2.

FIGS. 3A, 3B and 3C respectively show examples of the character which is extracted by the conventional system described above. In FIGS. 3A through 3C, the left half shows the character which makes contact with the frame, and the right half shows the extracted character. As described above, the conventional system does not take into consideration the continuity and connection of the character line segment, the line width of the character, the size of the character and the like. For this reason, the quality of the extracted character is extremely poor. FIG. 3A shows a case where the frame is extracted as a portion of the character. FIG. 3B shows a case where the frame makes contact with 2 characters and the 2 characters which are connected via the frame are extracted as 1 character. FIG. 3C shows a case where a stain or spot on the character is extracted as a portion of the character.

SUMMARY OF THE INVENTION

Accordingly, it is a general object of the present invention to provide a novel and useful image extraction system in which the problems described above are eliminated.

Another and more specific object of the present invention is to provide an image extraction system for extracting characters, graphics or symbols from an image which is formed by straight line portions such as frame and rule and the characters, graphics or symbols, comprising connected pattern extracting means for extracting partial patterns respectively having connected pixels from the image which is formed by the straight line portions such as the frame and rule and the characters, graphics or symbols, straight line extracting means for extracting straight line portions such as the frame and rule from the partial patterns which are extracted by the connected pattern extracting means, attribute adding means for categorizing the partial patterns into a first pattern including only the character, graphic, symbol or the straight line portion such as the frame and rule, and a second pattern including the character, graphic or symbol which touches the straight line portion such as the frame and rule, based on each straight line portion extracted by the straight line extracting means, and separating means for separating the straight line portions such as the frame and rule from the second pattern including the character, graphic or symbol which touches the straight line portion such as the frame and rule. According to the image extraction system of the present invention, it is possible to positively eliminate the straight line portions such as the frame and rule from the image which is formed by the straight line portions such as the frame and rule and the characters, graphics or symbols, and it is thus possible to extract characters, graphics or symbols of a high quality. For this reason, it is possible to considerably improve the recognition rate of the characters, graphics or symbols in a character recognition apparatus which employs the present invention.

Still another object of the present invention is to provide an image extraction system for extracting rectangular frames which are independent and separated from an image which is formed by the frames and characters, graphics or symbols, comprising connected pattern extracting means for extracting partial patterns having connected pixels from a pattern which forms the image, means for obtaining vertical and horizontal projections respectively in vertical and horizontal directions for each of the extracted patterns, means for obtaining a candidate of a straight line forming the frame based on first and second ratios by approximating the partial pattern by a rectangle and obtaining the first ratio of a vertical projection value and a length of the approximating rectangle in the vertical direction and the second ratio of a horizontal projection value and a length of the approximating rectangle in the horizontal direction, means for calculating a line width of each side of the frame by calculating distances among the candidates of the straight line, extracting the straight line forming an outermost part of the frame, and obtaining candidates of straight lines adjacent to the straight line forming the outermost part of the frame, and means for separating the frame based on a position of the straight line at the outermost part of each side and a line width of this straight line. According to the image extraction system of the present invention, it is possible to accurately extract at a high speed the frames which frequently appear and have a wide line width. In addition, it is possible to accurately separate only the frame without chipping a portion of the character, graphic or symbol which touches the frame. As a result, the character, graphic or symbol can be restored with a high quality.

A further object of the present invention is to provide an image extraction system for extracting rectangular frames which are independent and separated from an image which is formed by the frames and characters, graphics or symbols, comprising connected pattern extracting means for extracting partial patterns having connected pixels from a pattern which forms the image, means for approximating the partial pattern by a rectangle, extracting as a starting point a position where the partial pattern touches normals which are drawn inside the rectangle from a plurality of points including both ends of a straight line forming the rectangle and a middle point therebetween, and searching from the starting point along the partial pattern from left to right or vice versa, or top to bottom or vice versa, means for obtaining a candidate of the straight line forming the frame based on a ratio of a length of a straight line which is obtained by the search and a length of each side of the rectangle, means for calculating distances among the candidates of the straight line to extract the straight line at the outermost part forming the frame, and calculating a line width of each side of the frame by obtaining candidates of straight lines adjacent to the straight line at the outermost part of the frame, and means for separating the frame based on a position of the straight line at the outermost part of each side and a line width of this straight line. According to the image extraction system of the present invention, it is possible to accurately extract at a high speed the frame having a narrow line width. In addition, it is possible to accurately separate only the frame without chipping a portion of the character, graphic or symbol which touches the frame. As a result, the character, graphic or symbol can be restored with a high quality.

Another object of the present invention is to provide an image extraction system for extracting rectangular frames which are independent and separated from an image which is formed by the frames and characters, graphics or symbols, comprising connected pattern extracting means for extracting partial patterns having connected pixels from a pattern which forms the image, frame extracting means for extracting the frame from the partial patterns extracted by the connected pattern extracting means, attribute adding means for categorizing the partial patterns into a first pattern including only the character, graphic or symbol, a second pattern including only the frame, and a third pattern including the character, graphic or symbol which touches the frame, based on the frame extracted by the frame extracting means, and means for extracting partial patterns existing within a range to the right and left or above and below by an amount corresponding to a size of the extracted frame, and re-deciding that the extracted frame is the first pattern including only the character, graphic or symbol if the attribute adding means categorizes all of the extracted partial patterns as the first pattern including only the character, graphic or symbol. According to the image extraction system of the present invention, it is possible to prevent a rectangular portion of the character from being erroneously extracted as the frame, and the frame can be extracted stably.

Still another object of the present invention is to provide an image extraction system for extracting straight line portions such as a frame and rule which include inclination, noise or the like from an image which is formed by the straight line portions such as the frame and rule and characters, graphics or symbols, comprising means for determining a vertical or horizontal interval from a coordinate of a starting point by considering a slope and regarding as a length of a straight line a number of consecutive pixels of a pattern which is reached by horizontally or vertically tracing a pattern which is connected in one of 4 directions or one of 8 directions within the interval, the 4 directions being vertical and horizontal directions, the 8 directions including oblique or diagonal directions in addition to the 4 directions, and means for extracting the traced pattern as the straight line portion having the length amounting to the number of consecutive pixels. According to the image extraction system of the present invention, it is possible to positively extract even a straight line which is uneven.

A further object of the present invention is to provide an image extraction system comprising connected pattern extracting means for extracting partial patterns having connected pixels from an image which is formed by block frames partitioned by frames of 1 character each and characters, graphics or symbols, straight line extracting means for detecting straight lines from the partial patterns extracted by the connected pattern extracting means, frame detecting means for detecting straight lines which form the frame out of the straight lines detected by the straight line extracting means, and frame separating means for separating the straight lines detected by the frame detecting means from the partial patterns so as to extract the character, graphic or symbol, the frame detecting means comprising first means for determining whether or not the straight line within the partial pattern forms the frame based on whether or not the straight line within the partial pattern reaches a straight line which is located at an outermost part of the partial pattern and is perpendicular to the straight line within the partial pattern, and second means for determining the straight lines which form the frame depending on intervals of candidates of the straight lines forming the frame obtained by the first means. According to the image extraction system of the present invention, it is possible to positively and accurately extract the frames even when the block frame is inclined.

Other objects and further features of the present invention will be apparent from the following detailed description when read in conjunction with the accompanying drawings.

BRIEF DESCRIPTION OF THE DRAWINGS

FIG. 5 is a system block diagram showing a second embodiment of the image extraction system according to the present invention;

FIGS. 11A and 11B respectively are diagrams showing examples of a frame having a wide line width and a frame having a narrow line width;

FIG. 12 is a diagram for explaining a frame searching technique used in the second embodiment;

FIG. 17 is a diagram showing a coordinate system used in a side width calculator 24a;

FIG. 18 is a flow chart for explaining a process of an intersection calculator 25a;

FIG. 20 is a flow chart for explaining a process of an ordering associating part 31a;

FIGS. 22A, 22B and 22C respectively are diagrams showing examples of one-to-many association of the intersections;

FIG. 26 is a flow chart for explaining a process of a simple interpolator 32a;

FIGS. 29A and 29B respectively are diagrams showing examples of interpolation made by re-association;

FIGS. 30A and 30B respectively are diagrams showing examples of the interpolation made by the re-association;

FIG. 37 is a flow chart for explaining a process of a labeling part 33a;

FIGS. 40A, 40B and 40C respectively are diagrams showing examples of character patterns extracted by the second embodiment;

FIG. 46 is a diagram showing an embodiment of a priority sequence table;

FIG. 48 is a diagram showing another embodiment of the priority sequence table;

FIGS. 49A and 49B respectively are diagrams for explaining the character extraction when the kind of character is an alphabet;

FIG. 56 is a system block diagram showing a fourth embodiment of the image extraction system according to the present invention;

FIG. 57 is a diagram for explaining an adjacent projection technique;

FIGS. 69A and 69B respectively are diagrams for explaining the character extraction and interpolation in the fourth embodiment.

DESCRIPTION OF THE PREFERRED EMBODIMENTS

Figure 4:
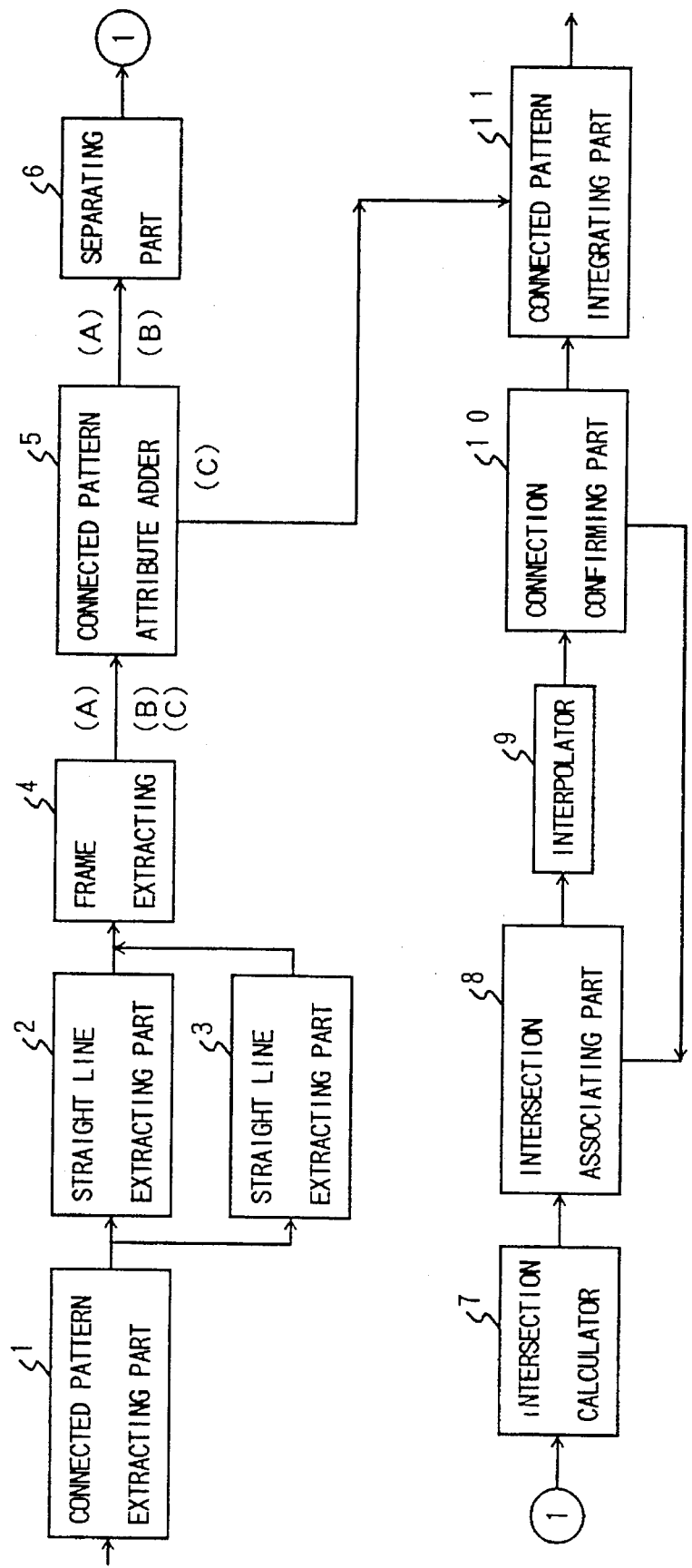
FIG. 4 is a system block diagram showing a first embodiment of an image extraction system according to the present invention.

FIG. 4 shows a first embodiment of an image extraction system according to the present invention. In FIG. 4, a connected pattern extracting part 1 extracts partial patterns of connected pixels from an image which is made up of linear portions and characters, graphics or symbols, where the straight line portion is made up of a frame, a rule or the like. A straight line extracting part 2 is provided to extract straight lines having a wide line width. In other words, the straight line extracting part 2 obtains projections of the partial patterns extracted in the connected pattern extracting part 1, and extracts for each partial pattern a straight line such as the frame and rule having a wide line width corresponding to the vertical and horizontal lengths of the size of the connected pattern. A straight line extracting part 3 is provided to extract straight lines having a narrow line width. In other words, the straight line extracting part 3 extracts the straight lines such as the frame and rule not extracted by the straight line extracting part 2. A frame extracting part 4 extracts 4 sides forming the frame from a plurality of straight lines which are extracted. In other words, the frame extracting part 4 extracts the frame by obtaining the straight lines on the outermost part of the partial pattern out of the straight lines which are extracted by the straight line extracting part 2 or the straight line extracting part 3. A connected pattern attribute adder 5 checks whether or not a straight line such as the frame and rule exists in the connected pattern, and if no such straight line exists, the connected pattern attribute adder 5 adds an attribute of a pattern (C) which is formed by a character, a graphic, a symbol, or a portion thereof. In addition, depending on whether or not the partial pattern of the character, graphic, symbol or a portion thereof exists after the straight line such as the frame and rule is separated, the connected pattern attribute adder 5 adds an attribute of a pattern (B) of the straight line such as the frame and rule or a pattern (A) of a pattern of the character, graphic, symbol or a portion thereof touching the straight line such as the frame and rule.

A separating part 6 calculates the width of the straight line such as the frame and rule, and separates the straight line such as the frame and rule from the connected pattern. An intersection calculator 7 calculates intersections (intersecting points) where the straight line such as the frame and rule touches the character, graphic or symbol. An intersection associating part 8 associates the intersections based on conditions such as the continuity of the line segments based on the distances among the line segments forming the character, graphic or symbol and the directions of the line segments. An interpolator 9 interpolates the region of the character, graphic or symbol within the straight line such as the frame and rule, by connecting the intersections which are associated in the intersection associating part 8. A connection confirming part 10 confirms the connection of the pattern by conversely using the information which indicates that the pattern obtained in the interpolator 9 is originally connected.

In this specification, "associating" 2 intersections, for example, means that the 2 intersections are regarded as forming a related pair, that is, regarded as corresponding or linked intersections.

When the connection cannot be confirmed in the connection confirming part 10, the process returns to the process of the intersection associating part 8 so as to make the association by expanding the conditions for associating the intersections. In addition, the inetrpolating part 9 carries out the interpolation with respect to the associated intersections, and the connection confirming part 10 confirms the connection again. A connected pattern integrating part 11 integrates (joins or connects into one) the patterns (C) which are respectively formed by the character, graphic, symbol or a portion thereof, and extracts the character, graphic or symbol. In addition, the connected pattern integrating part 11 integrates the patterns of the characters, graphics or symbols interpolated in the interpolator 9 and the above patterns (C) by taking into consideration the size when the integration of the patterns is made.

Accordingly, the straight line such as the frame and rule is positively eliminated from a image which is made up of the linear portion such as the frame and rule and the character, graphic or symbol, and the eliminated portion is accurately interpolated, so that the character, graphic or symbol of a high quality is extracted. For this reason, it is possible to considerably improve the recognition rate of the character, graphic, symbol and the like in a character recognition apparatus or the like.

Figure 6:
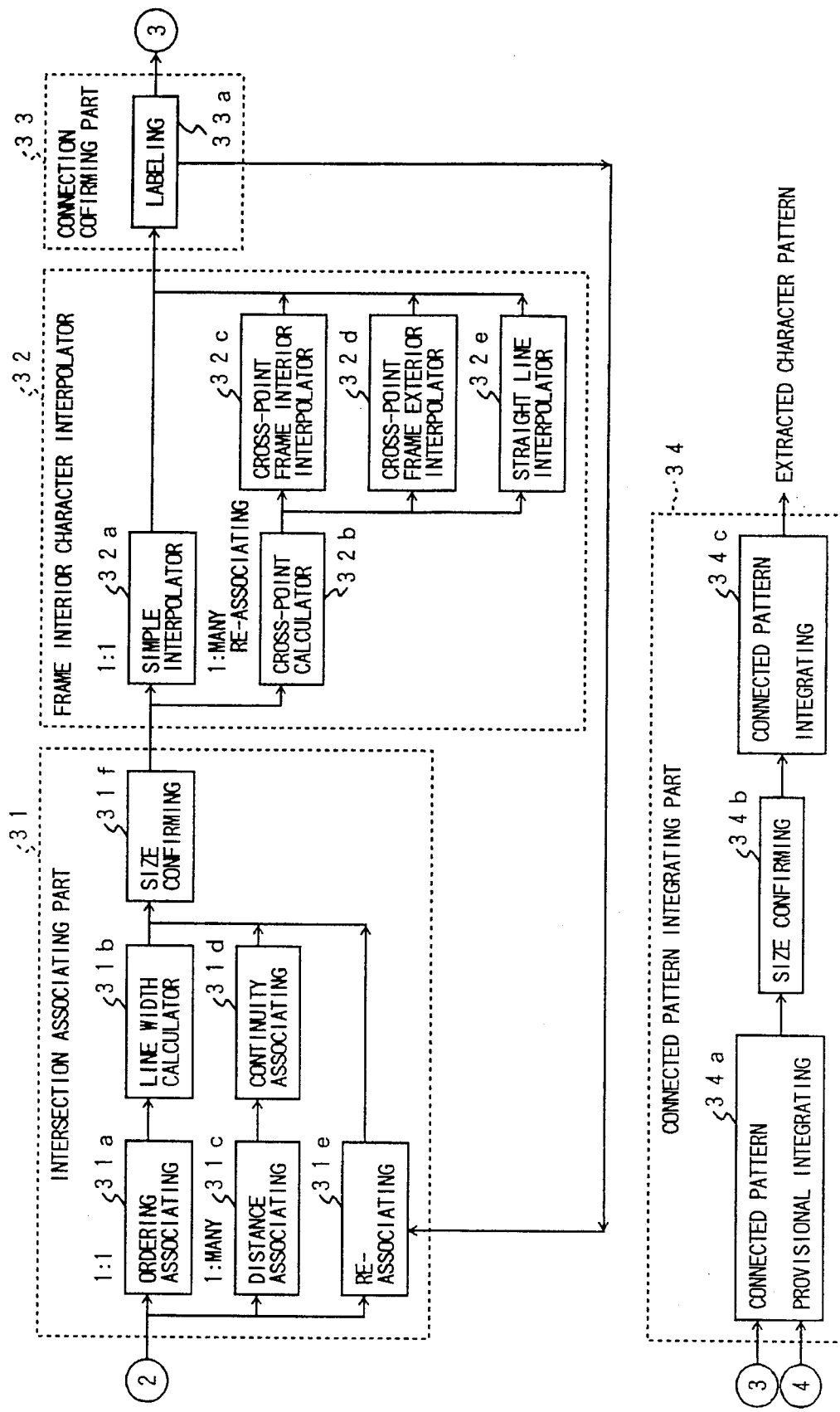
FIG. 6 is a system block diagram showing the second embodiment of the image extraction system.

Next, a description will be given of a second embodiment of the image extraction system according to the present invention, by referring to FIGS. 5 and 6. FIGS. 5 and 6 respectively show the second embodiment of the image extraction system. In this embodiment, the present invention is applied to the process of extracting characters from a form sheet having black frames. In other words, in a case where a plurality of character frames are separated by rectangles and the size and position of each character frame are unknown and hand-written characters are written in such a manner that the hand-written characters touch or penetrate the character frames, this embodiment extracts only the character portion one character at a time from the patterns of the characters and character frames.

In this embodiment, the image extraction system generally comprises a connected pattern extracting part 21, a straight line/frame extracting part 22, a connected pattern attribute adder 23, a frame separating part 24, and a character/frame intersection calculator 25, shown in FIG. 5, as well as an intersection associating part 31, an frame interior character interpolator 32, a connection confirming part 33 and a connected pattern integrating part 34, shown in FIG. 6.

In FIG. 5, the connected pattern extracting part 21 includes a labeling part 21*a* which extracts a pattern having a 8-connection from a prepared input pattern signal by using a labeling. The pattern having the "8-connection" is defined as a pattern having a connection (or link) in any one of 8 directions which include the vertical, horizontal and oblique (or diagonal) directions. A general technique may be used for the above labeling. In this embodiment, the partial pattern obtained by the labeling part 21*a* is one of a frame which does not touch a character, a character or a portion thereof which does not touch a frame, or a character which touches the frame. In order to distinguish these partial patterns and to focus the attention to only the character touching the frame, the frame is extracted. In addition, since the size of the partial pattern obtained by the labeling is required for a process which will be described later, corner coordinates of the rectangle which are obtained by approximating the partial pattern by the rectangle are calculated during the labeling process.

The straight line/frame extracting part 22 extracts the straight line/frame having the wide line width and the straight line/frame having the narrow line width. As shown in FIG. 5, the straight line/frame extracting part 22 includes a projecting part 22*a*, a straight line detector 22*b*, a 4-side detector 22*c*, a tracing part 22*d*, a 4-side detector 22*e* and a frame extracting part 22*f*.

The projecting part 22*a* projects the partial pattern which is extracted by the connected pattern extracting part 21 in the horizontal and vertical directions. The straight line detector 22*b* detects horizontal lines from horizontal projections in the horizontal direction obtained in the projecting part 22*a* and detects vertical lines from vertical projections in the vertical direction obtained in the projecting part 22*a*. The 4-side detector 22*c* detects the 4 sides of the rectangle which is made up of the straight lines detected in the straight line detector 22*b*. The tracing part 22*d* traces the lines using an n-line run length which will be described later, in order to obtain straight lines which have the narrow width and are not detectable by the straight line detector 22*b* and the 4-side detector 22*c*. The 4-side detector 22*e* detects the 4 sides of the rectangle which is made up of the straight lines having the narrow width obtained in the tracing part 22*d*. The frame extracting part 22*f* extracts the frame based on the rectangles obtained in the 4-side detectors 22*c* and 22*e*.

The connected pattern attribute adder 23 includes an attribute adder 23*a* as shown in FIG. 5. With respect to the connected pattern which is extracted in the connected pattern extracting part 21, the attribute adder 23*a* adds the attribute of the "frame", "character pattern or a portion thereof" and "a contact pattern of the frame and the character pattern or a portion of the character pattern (hereinafter also referred to as a contact character pattern)" based on the result of the extraction made in the straight line/frame extracting part 22.

In addition, the frame separating part 24, shown in FIG. 5, separates the frame from the connected pattern, which is added with the attribute of the frame or the contact pattern of the character and frame in the connected pattern attribute adder 23. The frame separating part 24 includes a side width calculator 24*a* for calculating the width of the sides of the frame portion, a frame eliminating part 24*b* for eliminating the frame, a frame noise eliminating part 24*c* for labeling again the pattern which is eliminated of the frame so as to eliminate the pattern having a small area as noise, and an attribute adder 24*d*. Out of the patterns which are not added with the attribute in the connected pattern attribute adder 23, the attribute adder 24*d* adds the attribute of the contact character pattern to the pattern which remains even after the elimination of the frame, and adds the attribute of the frame (only) to the pattern which does not remain after the elimination of the frame.

The character/frame intersection calculator 25 includes an intersection calculator 25*a* for calculating the intersections of the frame and the character with respect to the contact character pattern, as shown in FIG. 5.

In addition, in FIG. 6, the intersection associating part 31 obtains the intersections where the character and the frame touch, with respect to the character pattern which is separated by the elimination of the character frame. The intersection associating part 31 associates the above intersections under conditions such as the distance among the character line segments and the continuity of the character line segments. The intersection associating part 31 includes an ordering associating part 31*a*, a line width calculator 31*b*, a distance associating part 31*c*, a continuity associating part 31d, a re-associating part 31e, and a size confirming part 31f. The ordering associating part 31a associates the intersections in order as one-to-one association (or correspondence) when the number of intersections at the outer contour of the character frame and the number of intersections at the inner contour of the character frame are the same. The line width calculator 31b focuses the attention on the line segments which are made to have the one-to-one association, and calculates the line width of the character line segment based on the distances between respective pairs of the intersections at the outer and inner contours of one character line segment. The distance associating part 31c associates the intersections based on the distance as one-to-many association (or correspondence), when the number of intersections at the outer contour and the number of intersections at the inner contour differ. The continuity associating part 31d associates the intersections based on the conditions for continuity of the character line segments. The re-associating part 31e makes a re-association with respect to the character pattern which cannot be confirmed of its connection in the connection confirming part 33 which will be described later. The size confirming part 31f confirms the size of the character pattern for which the intersections are associated.

The frame interior character interpolator 32 connects the intersections and the like, which are associated in the intersection associating part 31, and connects the character patterns which are separated by eliminating the character frame. As shown in FIG. 6, the frame interior character interpolator 32 includes a simple interpolator 32a, a cross-point calculator 32b, a cross-point frame interior interpolator 32c, a cross-point frame exterior interpolator 32d, and a straight line interpolator 32e. The simple interpolator 32a carries out the interpolation by connecting the intersections having a one-to-one association. The cross-point calculator 32b calculates a cross-point of direction vectors of the contours of the character line segment at the intersection, for the intersections which have the one-to-many association and the intersections which are re-associated. The cross-point frame interior interpolator 32c connects the intersections when the obtained cross-point falls within the line width of the frame. The cross-point frame exterior interpolator 32d connects the intersections when the obtained cross-point falls outside the line width of the frame. The straight line interpolator 32e interpolates the character line segment along the frame by a straight line when the cross-point cannot be calculated.

The connection confirming part 33, shown in FIG. 6, includes a labeling part 33a for confirming the connection of the character pattern which is interpolated in the frame interior character interpolator 32. As described above, the character pattern, for which the connection cannot be confirmed in the connection confirming part 33, is re-associated in the re-associating part 31e of the intersection associating part 31.

The connected pattern integrating part 34 integrates the character patterns for which the connection is confirmed in the connection confirming part 33 or the character patterns which are added with the attribute of the character patterns in the connected pattern attribute adder 23 shown in FIG. 5. As shown in FIG. 6, the connected pattern integrating part 34 includes a connected pattern provisional integrating part 34a, a size confirming part 34b, and a connected pattern integrating part 34c. The connected pattern provisional integrating part 34a provisionally integrates the connected patterns. The size confirming part 34b confirms the size of the provisionally integrated character pattern. The connected pattern integrating part 34c further integrates the connected patterns if the size of the character pattern confirmed in the size confirming part 34b is not appropriate.

Next, a description will be given of a character extracting process of this embodiment.

(1) Extraction of the connected Patterns:

The input pattern which is input to the connected pattern extracting part 21 shown in FIG. 5 is already subjected to the preparations such as correction of extreme inclination or rotation, elimination of noise, and filling of gaps caused by grazing. With respect to this input pattern, the labeling part 21a selects the candidates for the contacting character regardless of the position of the frame, and thus, the pattern which is connected in one of the 8 directions including the vertical, horizontal and oblique directions is extracted by the labeling. The partial pattern which is obtained by such a labeling is one of (A) a frame which is not touched by the character, (B) a character which does not touch the frame or a portion of such a character, and (C) a character touching the frame.

The size of the partial pattern obtained by the labeling becomes necessary in the latter process. Hence, the corner coordinates of the rectangle which is obtained by approximating the partial pattern by the rectangle are obtained when carrying out the labeling process.

(2) Extraction of the Frame:

In order to focus the attention on only those characters touching the frame out of the connected patterns which are extracted as described above, the frame extracting part 22 extracts the frame. When extracting the frame, it is in general necessary that the extraction frequency is high and the extraction speed is high. Hence, the straight line/frame having the wide line width is first extracted, and if no extraction is possible, the straight line/frame having the narrow line width is next extracted.

(2a) Extraction of the Straight Line/Frame Having the Wide Line Width:

It is necessary that the frame can be extracted stably even when the size of the frame is unknown and the character touches the frame. For this reason, the projecting part 22a of the frame extracting part 22 obtains the projection for every partial pattern which is obtained by the labeling. Then, the straight line detector 22b calculates a ratio of the projection values and the vertical and horizontal sizes which are obtained by approximating the partial pattern into the rectangle, and judges that the partial pattern is a long straight line when this ratio is greater than a predetermined threshold value.

This straight line may not only be the frame but also the stroke of the character. For this reason, the straight line which is obtained should desirably be the straight line at the outermost part and corresponding to the 4 sides which most satisfy the rectangular shape.

Figure 7:
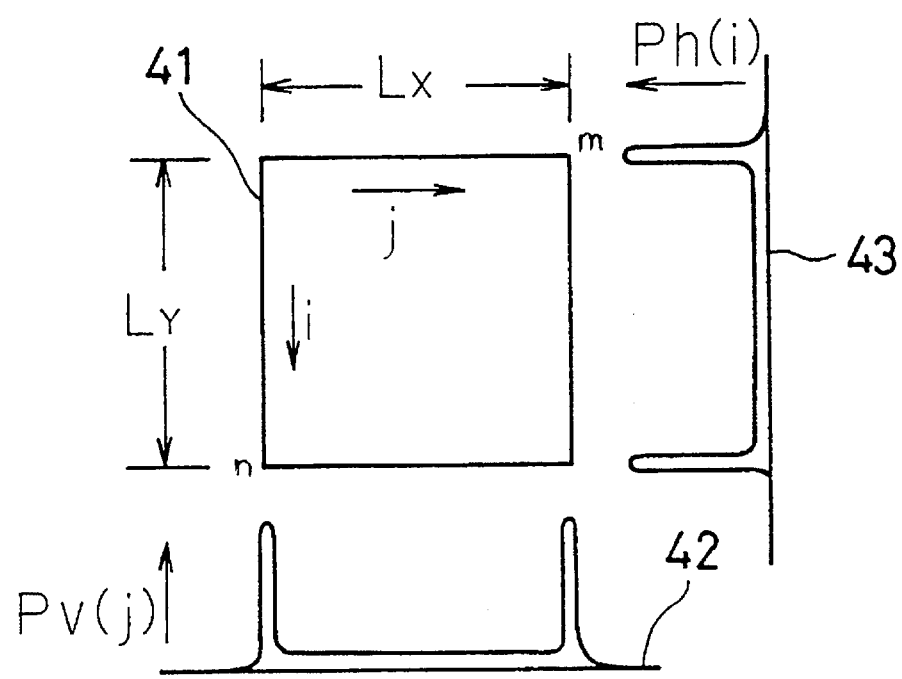
FIG. 7 is a diagram showing projections in horizontal and vertical direction of a partial pattern.

FIG. 7 is a diagram showing the horizontal and vertical projections of the partial pattern which is obtained by the labeling in the labeling part 21a in the horizontal and vertical directions. In FIG. 7, a partial pattern 41 which is obtained by the labeling has a length $L_x$ in the horizontal direction and a length $L_y$ in the vertical direction. In addition, this partial pattern 41 includes a vertical projection 42 in the vertical direction and a horizontal projection 43 in the horizontal direction.

For the sake of convenience, it will be assumed that the image has a size of m columns by n rows, and the density value at a coordinate (i, j) is denoted by f(i, j), the horizontal projection of the ith row is denoted by Ph(i), and the vertical projection of the jth column is denoted by Pv(j). In this case, the horizontal projection Ph(i) and the vertical projection Pv(j) can respectively be described by the following formulas (1) and (2).

$$Ph(i) = \sum_{j=1}^{m} f(i,j) \quad (1)$$

$$Pv(j) = \sum_{i=1}^{n} f(i,j) \quad (2)$$

The straight line detector 22b obtains a ratio of the horizontal length $L_x$ and the horizontal projection Ph(i) and a ratio of the vertical length Ly and the vertical projection Pv(j) using the horizontal and vertical lengths $L_x$ and $L_y$ of the rectangle in the rectangular coordinate of the partial pattern which is obtained in the labeling part 21a. In addition, the straight line detector 22b compares these ratios with a predetermined threshold value $TH_L$ as shown by the following formulas (3) and (4).

$$[Ph(i)/L_x] \geq TH_L \quad (3)$$

$$[Pv(j)/L_y] \geq TH_L \quad (4)$$

If the ratios in the formulas (3) and (4) are greater than or equal to the predetermined threshold value $TH_L$, it is regarded that the partial pattern is a candidate of the straight line which forms the frame. In other words, when the extracted partial pattern is a rectangle as shown in FIG. 7, the horizontal projection Ph(i) and the vertical projection Pv(j) of this straight line portion become maximum, and the ratios with the horizontal and vertical lengths $L_x$ and $L_y$ also become large. Hence, it is possible to discriminate the straight line portion using the formulas (3) and (4).

Figure 8:
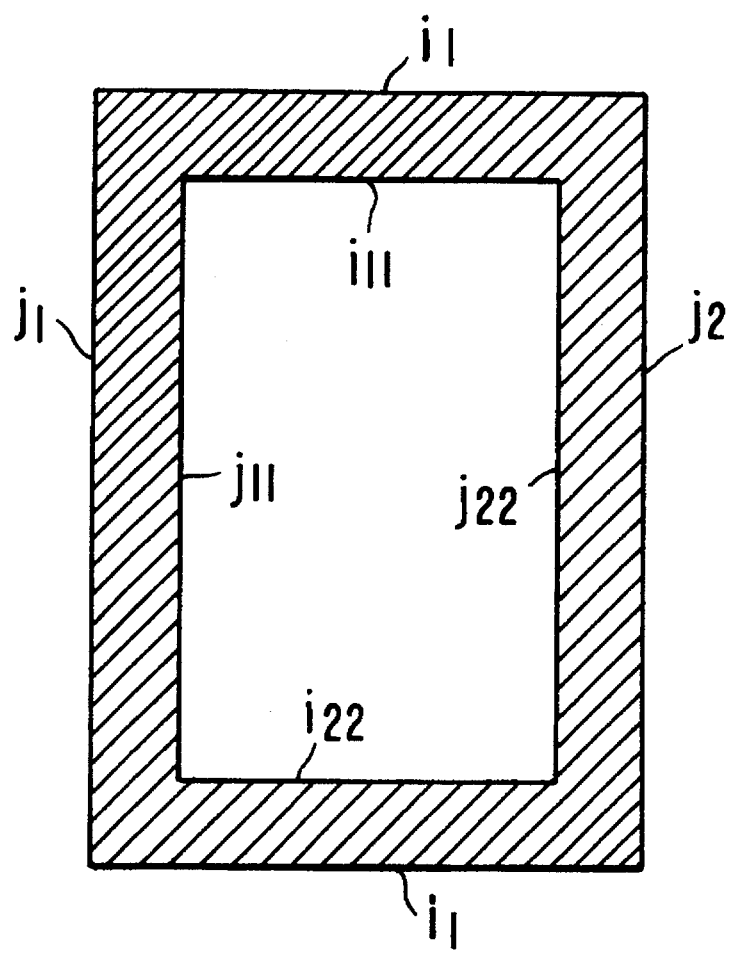
FIG. 8 is a diagram showing constituent elements of a frame.
Figure 9:
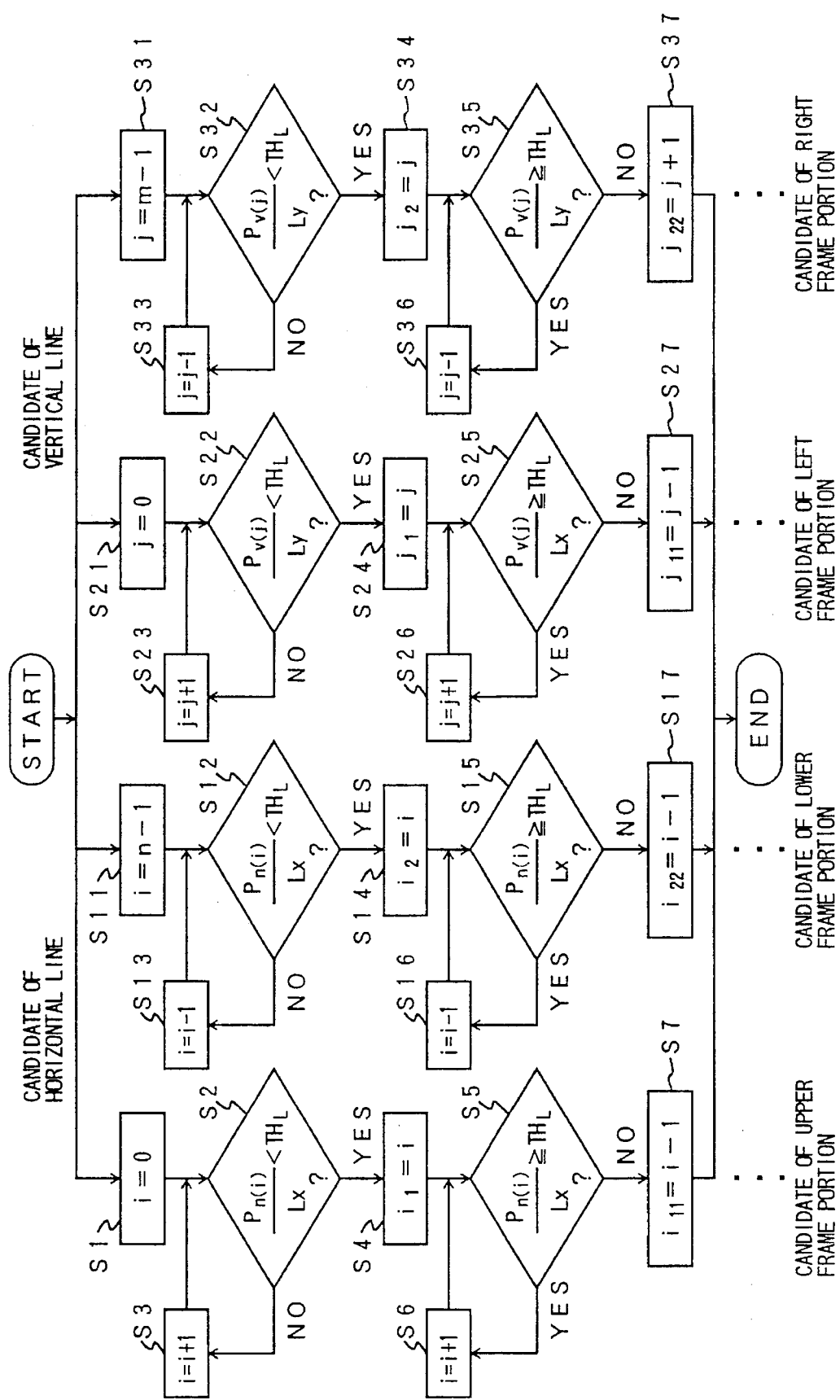
FIG. 9 is a flow chart for explaining a process of a straight line detector 22b.

FIGS. 8 and 9 are diagrams for explaining an embodiment of the process of the straight line detector 22b in more detail. FIG. 8 shows the constituent elements of the frame. The frame is formed by an upper frame portion, a lower frame portion, a right frame portion and a left frame portion. The upper frame portion is made up of line segments (straight lines) i1 and i11. The lower frame portion is made up of line segments (straight lines) i2 and i22. The right frame portion is made up of line segments (straight lines) j2 and j22. In addition, the left frame portion is made up of line segments (straight lines) j1 and j11. If the horizontal and vertical lengths of the rectangle of the partial pattern which is obtained by the labeling are respectively denoted by $L_x$ and $L_y$, the line segment (straight line) is regarded as a candidate of the line segment (straight line) forming the frame when the ratio of the projection and the corresponding length is greater than or equal to the predetermined threshold value $TH_L$.

FIG. 9 shows a flow chart for the case where the process of the straight line detector 22b is realized by software. In FIG. 9, steps S1 through S7 detect the candidates of the upper frame portion out of the horizontal lines. Steps S11 through S17 detect the candidates of the lower frame portion out of the horizontal lines. Steps S21 through S27 detect the candidates of the left frame portion out of the vertical lines. In addition, steps S31 through S37 detect the candidates of the right frame portion out of the vertical lines. For the sake of convenience, only the operation of the steps S1 through S7 will be described, and a description of the other steps will be omitted because their operations are similar thereto.

In FIG. 9, the step S1 sets i to i=0. The step S12 decides whether or not the relation $[Ph(i)/L_x] < TH_L$ stands. If the decision result in the step S2 is NO, the step S3 increments i by 1, and the process returns to the step S2. On the other hand, if the decision result in the step S2 is YES, the step S4 sets i1 to i1=1. Next, the step S5 decides whether or not the relation $[Ph(i)/L_x] \geq TH_L$ stands. If the decision result in the step S5 is YES, the step S6 increments i by 1 and the process returns to the step S5. On the other hand, if the decision result in the step S5 is NO, the step S7 sets i11 to i11=i−1, and the candidates of the upper frame portion are obtained by the above described operation.

The candidates of the lower, right and left frame portions are similarly obtained by the corresponding steps S11 through S17, steps S31 through S37, and steps S21 through S27. But in the steps S13 and S16, for example, i is decremented by 1.

The 4-side detector 22c focuses attention on the horizontal line candidates i1 and i2 and the vertical line candidates j1 and j2 at the outermost part out of the candidates of the horizontal line i and the candidates of the vertical line j which are detected in the straight line detector 22b. More particularly, the 4-side detector 22c calculates the following formulas (5) and (6) to make a comparison with a threshold value $TH_L'$.

$$|i1-i2|/L_y \geq TH_L \quad (5)$$

$$|j1-j2|/L_x \geq TH_L' \quad (6)$$

Figure 10:
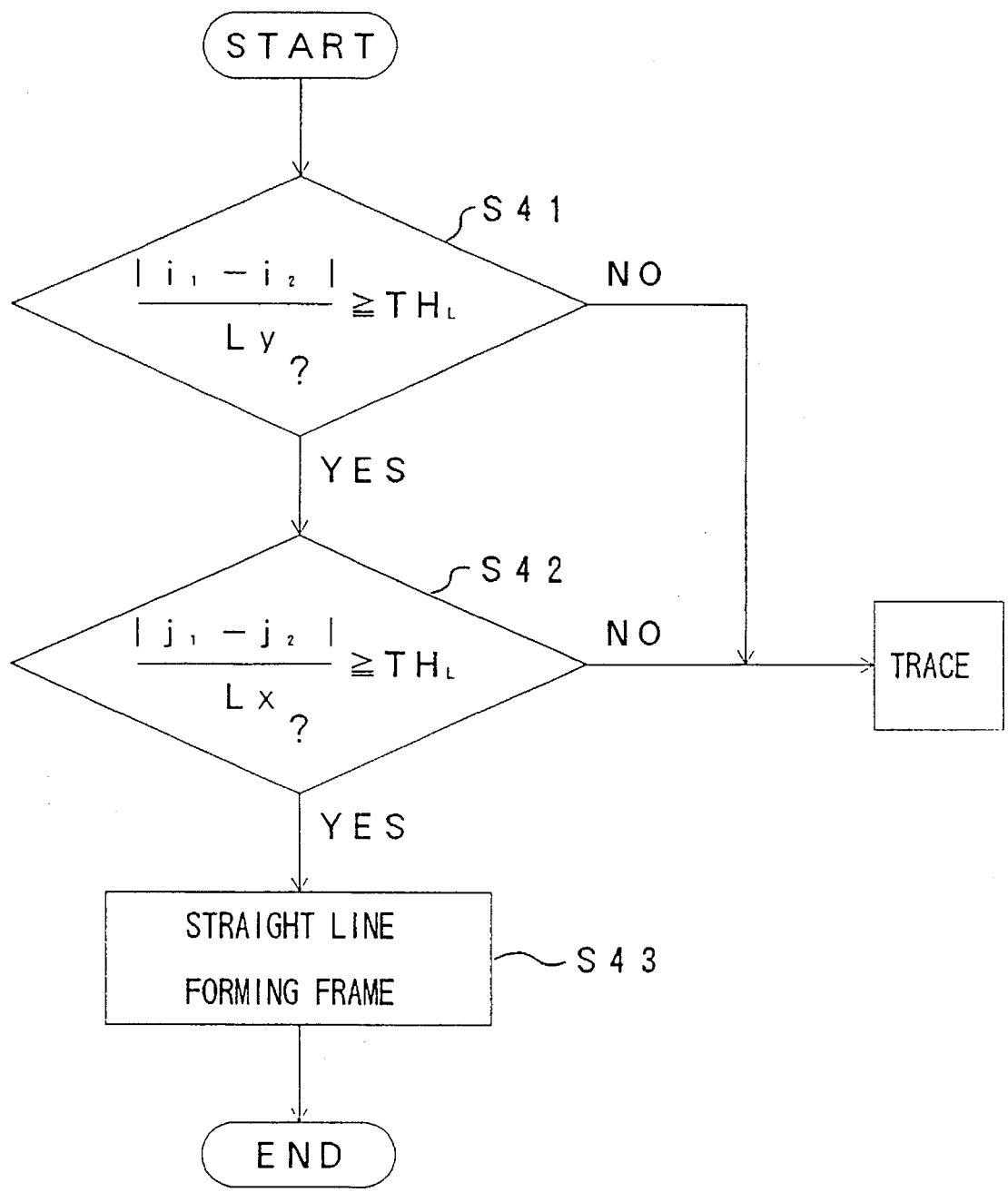
FIG. 10 is a flow chart for explaining a process of a 4-side detector 22c.

FIG. 10 shows a flow chart for the case where the process of the 4-side detector 22c is carried out by software, in order to describe an embodiment of the process of the 4-side detector 22c in more detail. In FIG. 10, a step S41 decides whether or not the formula (5) described above stands. If the decision result in the step S41 is YES, a step S42 decides whether or not the formula (6) described above stands. If the decision result in the step S41 or S42 is NO, the process advances to the process of the tracing part 22d. On the other hand, if the decision result in the step S42 is YES, a step S43 detects the straight line portion by regarding that the partial pattern is the straight line portion forming the frame.

The frame extracting part 22f extracts the frame based on the detection result of the 4-side detector 22c. In other words, when the straight line portion is detected by the 4-side detector 22c, the frame is extracted based on the detected straight line portion, and the above described process is repeated by focusing attention on another candidate if no straight line portion is detected, to thereby extract the frame. More particularly, it is regarded that the candidate is the straight line forming the frame if the above described formulas (5) and (6) are satisfied, and if not, the above described process is repeated by focusing attention on another candidate.

After the straight lines forming the skeleton of the frame are obtained as described above, attention is focused before and after the skeleton line. Calculation is made to determine how many horizontal line candidates i or vertical line candidates j exist in continuance from the skeleton line, and the calculated value is used as a reference for the line width of each side.

FIG. 11A is a diagram showing an example of the frame having the wide line width extracted in the above described manner. In FIG. 11A, a skeleton line 52 is obtained with respect to a frame 51 which is extracted, and the line width of each side amounts to 2 pixels in this example.

(2b) Extraction of the Straight Line/Frame Having the Narrow Line Width:

The straight line/frame having the narrow line width is extracted by focusing the attention to the partial pattern which could not be calculated by the process of extracting the straight line/frame having the wide line width shown in FIG. 11A.

FIG. 11B shows an example of the frame having the narrow line width, that is, a frame 53 and its skeleton line 54. The frame having the narrow line width includes a pattern which has a line width amounting to approximately 1 pixel and has unevenness caused by inclination or the like as shown in FIG. 11B. In order to stably extract the frame having the narrow line width as shown in FIG. 11B, this embodiment searches the frame as follows.

In other words, when extracting the frame, a straight line length called "n-line run length" is defined which can detect the straight line even if the unevenness occurs due to inclination, as shown in FIG. 12.

According to the normal run length, the number of pixels continuous in the horizontal or vertical direction is calculated. For this reason, the long straight line having the unevenness as shown in FIG. 11B will be divided into short straight lines. However, according to the n-line run length shown in FIG. 12, the run length connecting n lines by the 8-connection is calculated as the n-line run length. The value of n is determined by the magnitude of the inclination, and the value of n is made larger as the inclination becomes larger. When n=1, the n-line run length corresponds to the normal run length.

FIG. 12 shows the case where n=3. In this case, even though the unevenness exists, it is possible to extract the segment as the straight line, that is, a horizontal line amounting to 7 pixels.

The tracing part 22d of the frame extracting part 22 draws normals (vertical lines) from a plurality of points including both ends and middle point of the straight line forming the rectangle to the inside of the frame in the rectangular coordinate of the partial pattern which is obtained in the labeling part 21a, and regards the positions where the normals contact the partial pattern as starting points. Using the above described n-line run length, the search is made in the right and left directions or the up and down directions along the partial pattern starting from each starting point.

By using such a technique, it is possible to stably obtain the straight line having the narrow line width even if the character projects from the frame.

Figure 13:
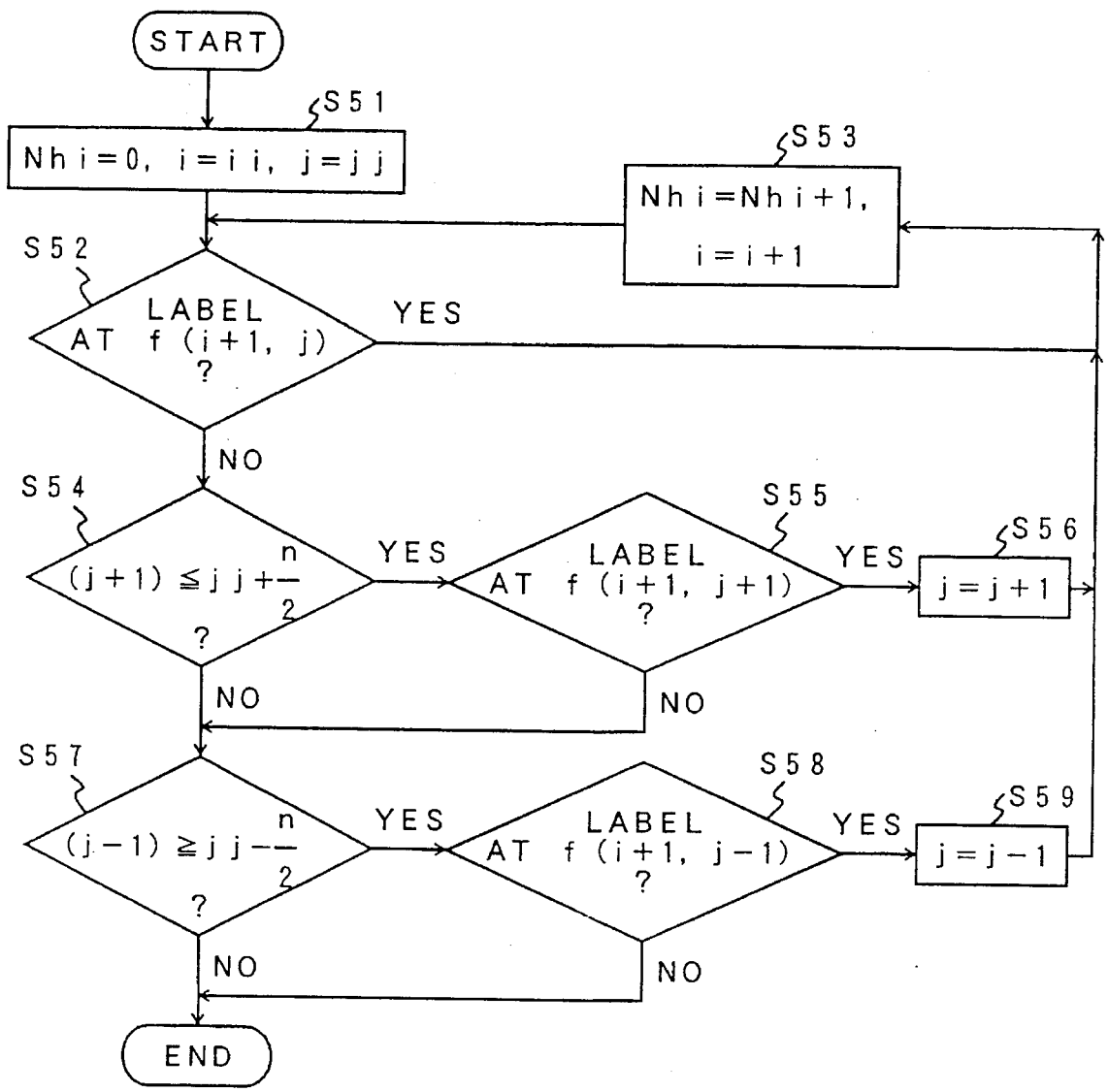
FIG. 13 is a flow chart for explaining a process of obtaining an n-line run length in the horizontal direction.
Figure 14:
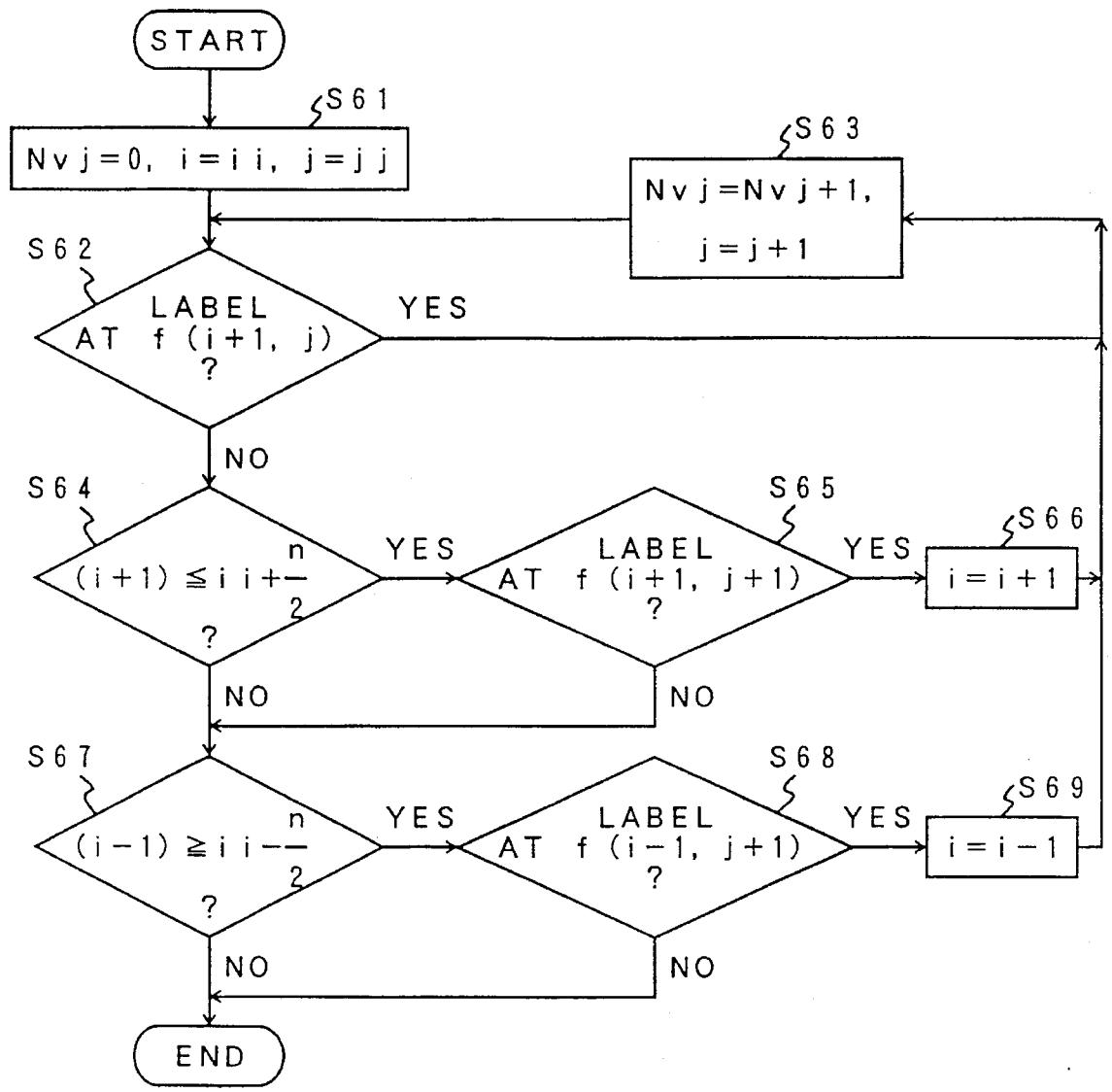
FIG. 14 is a flow chart for explaining a process of obtaining an n-line run length in the vertical direction.

FIGS. 13 and 14 respectively show flow charts for the case where the process of the tracing part 22d is carried out by software, in order to describe an embodiment of the process of the tracing part 22d in more detail. FIG. 13 shows the process of obtaining the n-line run length in the horizontal direction, and FIG. 14 shows the process of obtaining the n-line run length in the vertical direction. In FIGS. 14 and 15, it is assumed for the sake of convenience that a search starting point is (ii, jj), the horizontal line has a length Nhi, and the vertical line has a length Nvj.

In FIG. 13, a step S51 sets Nhi, i and j to Nhi=0, i=ii and j=jj, respectively. A step S52 decides whether or not f(i+1, j) has a label. If the decision result in the step S52 is YES, a step S53 increments Nhi and i by 1 and the process returns to the step S52. On the other hand, if the decision result in the step S52 is NO, a step S54 decides whether or not (j+1)≦jj+n/2. If the decision result in the step S54 is YES, a step S55 decides whether f(i+1, j+1) has a label. If the decision result in the step S55 is YES, a step S56 increments j by 1 and the process returns to the step S53. If the decision result in the step S54 or S55 is NO, a step S57 decides whether or not (j−1)≧jj−n/2. If the decision result in the step S57 is YES, a step S58 decides whether or not f(i+1, j−1) has a label. If the decision result in the step S58 is YES, a step S59 decrements j by 1 and the process returns to the step S53. If the decision result in the step S57 or S58 is NO, the process of obtaining the n-line run length in the horizontal direction ends.

In FIG. 14, a step S61 sets Nvj, i and j to Nvj=0, i=ii and j=jj, respectively. A step S62 decides whether or not f(i, j+1) has a label. If the decision result in the step S62 is YES, a step S63 increments Nvj and j by 1 and the process returns to the step S62. On the other hand, if the decision result in the step S62 is NO, a step S64 decides whether or not (i+1)≦ii+n/2. If the decision result in the step S64 is YES, a step S65 decides whether f(i+1, j+1) has a label. If the decision result in the step S65 is YES, a step S66 increments i by 1 and the process returns to the step S63. If the decision result in the step S64 or S65 is NO, a step S67 decides whether or not (i−1)≧ii−n/2. If the decision result in the step S67 is YES, a step S68 decides whether or not f(i−1, j+1) has a label. If the decision result in the step S68 is YES, a step S69 decrements i by 1 and the process returns to the step S63. If the decision result in the step S67 or S68 is NO, the process of obtaining the n-line run length in the vertical direction ends.

The 4-side detector 22e sets the candidate i of the horizontal line to Nhi and the candidate j of the vertical line to Nvj based on the length of the straight line obtained in the above described manner. In addition, using the horizontal and vertical lengths $L_x$ and $L_y$ of the rectangle in the rectangular coordinate of the partial pattern which is obtained in the labeling part 21a, the 4-side detector 22e obtains the ratio of the horizontal length $L_x$ and the horizontal line candidate Nhi and the ratio of the vertical length $L_y$ and the vertical line candidate Nvj, and compares these ratios with a predetermined threshold value $TH_L$. More particularly, the 4-side detector 22e calculates the following formulas (7) and (8) to make a comparison with the predetermined threshold value $TH_L$.

$$[Nhi/L_x] \geq TH_L \qquad (7)$$

$$[Nvj/L_y] \geq TH_L \qquad (8)$$

It is regarded that each candidate is the candidate of the straight line forming the frame if the ratios in the above formulas (7) and (8) are greater than or equal to the predetermined threshold value $TH_L$.

Figure 15A:
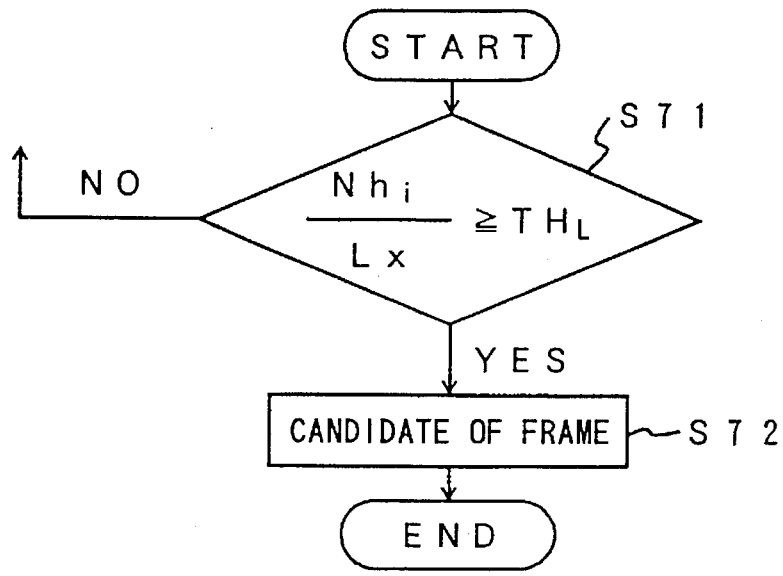
FIGS. 15A and 15B respectively are flow charts for explaining a process of a 4-side detector 22e.
Figure 15B:
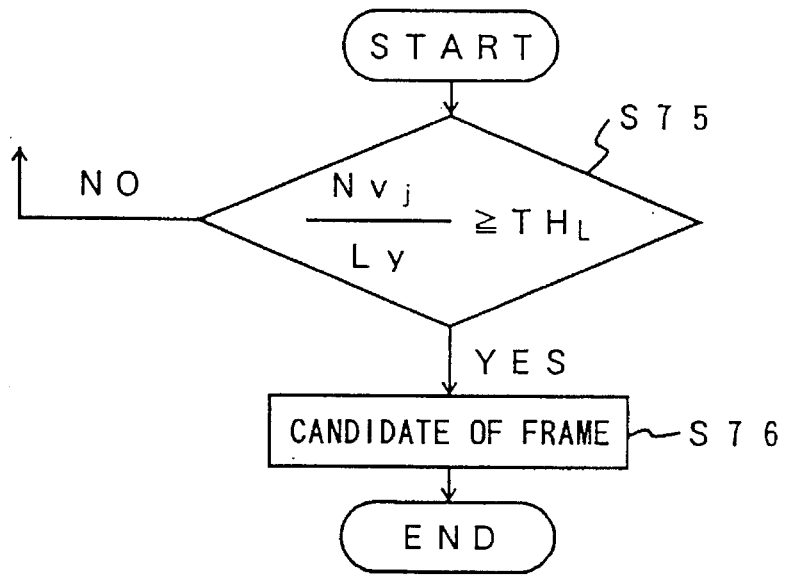

FIGS. 15A and 15B respectively show flow charts for the case where the process of the 4-side detector 22e is carried out by software, in order to describe an embodiment of the process of the 4-side detector 22e in more detail. FIG. 15A shows the process with respect to the candidate i of the horizontal line, that is, Nhi, and FIG. 15B shows the process with respect to the candidate j of the vertical line, that is, Nvj. It is assumed for the sake of convenience that in the rectangular coordinate of the partial pattern obtained by the labeling, the horizontal and vertical lengths of the rectangle respectively are $L_x$ and $L_y$.

In FIG. 15A, a step S71 decides whether or not Nhi/Lx≧$TH_L$. If the decision result in the step S71 is YES, a step S72 judges that the candidate i is appropriate as the candidate of the straight line forming the frame. On the other hand, if the decision result in the step S71 is NO, a process is started with respect to the next candidate of the horizontal line.

In FIG. 15B, a step S75 decides whether or not Nvj/$L_y$≧$TH_L$. If the decision result in the step S75 is YES, a step S76 judges that the candidate j is appropriate as the candidate of the straight line forming the frame. On the other hand, if the decision result in the step S75 is NO, a process is started with respect to the next candidate of the vertical line.

The 4-side detector 22e focuses attention on the horizontal line candidates i1 and i2 and the vertical line candidates j1 and j2 at the outermost part out of the candidates i of the horizontal line and the candidates j of the vertical line which are detected as described above. More particularly, the 4-side detector 22e calculates the following formulas (9) and (10) to make a comparison with the threshold value $TH_L'$.

$$|i1-i2|/L_y \geq TH_L' \tag{9}$$

$$|j1-j2|/L_x \geq TH_L' \tag{10}$$

The frame extracting part 22f extracts the frame based on the detection result of the 4-side detector 22e, similarly as described above for the wide line width. In other words, the frame extracting part 22f extracts the frame when the straight line portion is detected by the 4-side detector 22e, and the above described process is repeated by focusing the attention on the other candidates when no straight line portion is detected so as to extract the frame. More particularly, it is regarded that the candidates are the straight lines forming the frame if the above formulas (9) and (10) are satisfied, and the above described process is repeated by focusing the attention on the other candidates if these formulas are not satisfied. The reference value of the line width is obtained as a difference of the position coordinates of the maximum and minimum which are obtained during the frame extraction process.

After 1 character frame is obtained in the above described manner, it is also possible to newly extract the character frame by scanning the extracted character frame for the entire image and matching it with the partial pattern which is extracted by the connected pattern extracting part 21.

In addition, it is possible to calculate the size ratio of the extracted character frame and the rectangle approximating the partial pattern which is obtained in the connected pattern extracting part 21, extract only the partial pattern for which the calculated size ratio is within a predetermined threshold value, and newly extract the character frame by matching the extracted partial pattern with the character frame which has already been extracted.

Furthermore, it is possible to provide a means for extracting the partial pattern which exists within the horizontal or vertical range by an amount corresponding to the size of the extracted character frame, and for re-judging the extracted character frame as the character pattern if it is judged in the attribute adding means that all of the extracted partial patterns are patterns made up solely of the character. The attribute adding means will be described later. In this case where such a re-judging means is provided, it is possible to prevent a portion of the character from being erroneously judged as the frame even if the character has a rectangular portion corresponding to a frame such as the Japanese Kanji character "kuni" which means "country". More particularly, the Japanese Kanji character "kuni" is made up of a rectangular frame-shaped portion and vertical and horizontal lines within the rectangular frame-shaped portion.

(3) Adding Attributes to the connected Pattern:

As shown in FIG. 5, the connected pattern attribute adder 23 includes an attribute adder 23a which categorizes each of the connected patterns based on the result of the frame extraction made in the frame extracting part 22 into the following patterns (A) through (C), and adds the attributes of the frame and the character to the frame pattern, the character pattern, and the partial pattern of the character.

(A) Contact pattern of the character and frame;

(B) Frame pattern; and (C) Character pattern and Partial pattern of character.

If the frame cannot be extracted, the attribute "character pattern" or "portion of character pattern" is added. The pattern which is added with the above attribute is supplied to the connected pattern integrating part 34 which will be described later, where a decision is made on whether the pattern is to be extracted independently or the pattern is to be regarded as a portion of the character pattern and integrated with other patterns.

(4) Separation of the Frame:

In FIG. 5, the side width calculator 24a of the frame separating part 24 obtains as the line width a reference value of the line width obtained at the time of the frame extraction plus 2 (plus 1 to the outer contour and plus 1 to the inner contour), by taking into consideration the unevenness of the outer contour of the frame and the unevenness of the inner contour of the frame. In addition, the side width calculator 24a determines coordinate values of the outer contour and the inner contour of the frame based on the skeleton line which is calculated at the time of the frame extraction or based on the position of the maximum/minimum which is being extracted.

Figure 16A:
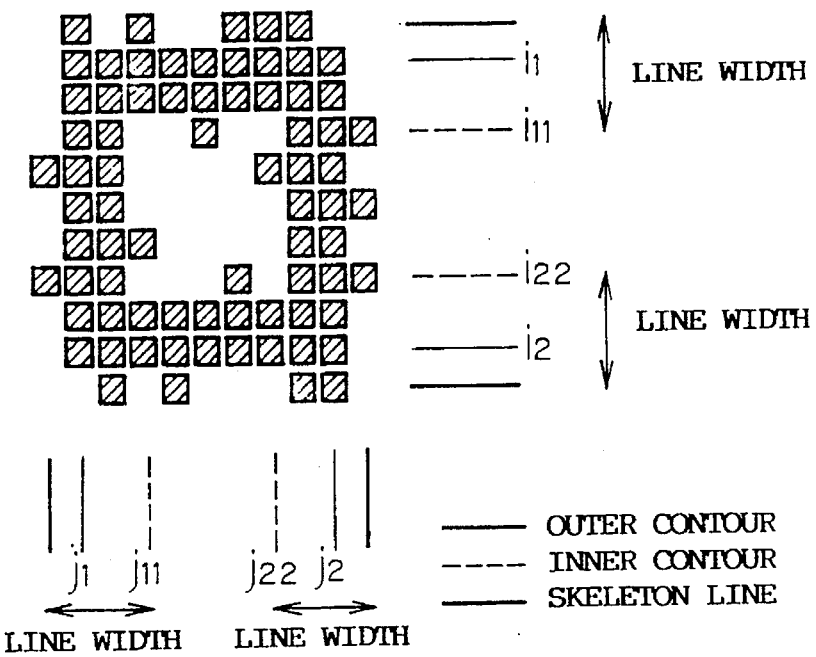
FIGS. 16A and 16B respectively are diagrams showing a skeleton, an external contour and the like of the frame having the wide line width and the frame having the narrow line width.
Figure 16B:
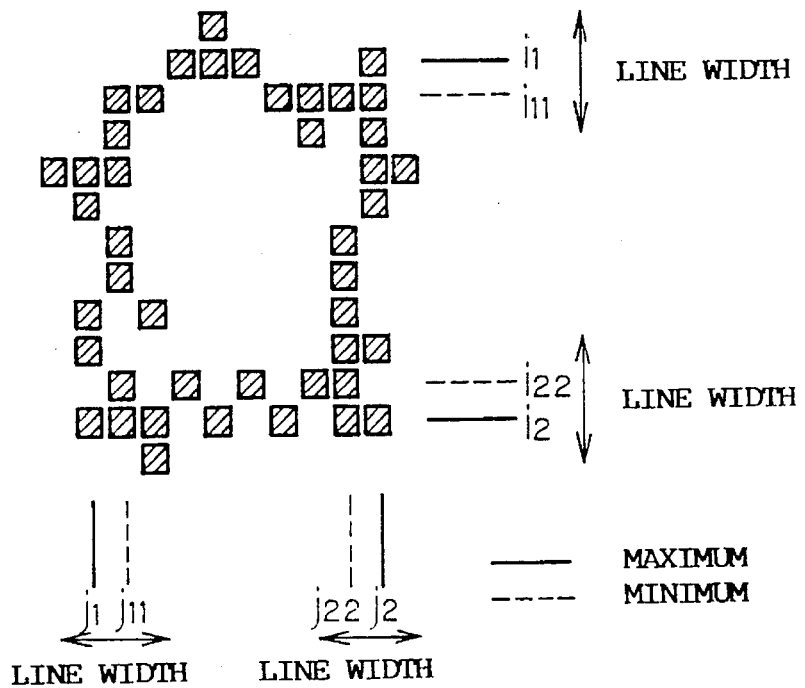

FIGS. 16A and 16B respectively are diagrams showing the skeleton line, the outer contour, the inner contour and the line width of the frame having the wide line width and the frame having the narrow line width. FIG. 16A shows the frame having the wide line width, and FIG. 16B shows the frame having the narrow line width. In FIGS. 16A and 16B, the "wide (or fat) line" indicates the outer contour, the "dotted line" indicates the inner contour, and the "narrow (or thin) line" indicates the skeleton line. The side width calculator 24a determines the coordinate values of the outer contour and the inner contour of the frame for the frame having the wide line width and the frame having the narrow line width, as shown in FIGS. 16A and 16B.

Figure 17:
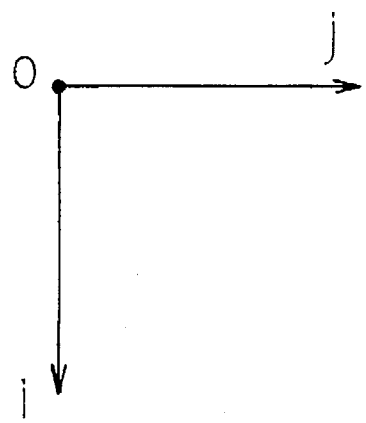

When it is assumed that the coordinate system shown in FIG. 17 is used, the side width calculator 24a sets the frame coordinate of the upper frame portion to (i1−1, i11+1) and the width of the side to w1+2 when the coordinate of the outer contour of the upper frame portion is (i1, i11) and the width is w1. In addition, when the coordinate of the outer contour of the lower frame portion is (i2, i22) and the width is w2, the side width calculator 24a sets the frame coordinate of the lower frame portion to (i2+1, i22−1) and the width of the side to w2+2. Similarly, when the coordinate of the outer contour of the left frame portion is (j1, j11) and the width is w3, the side width calculator 24a sets the frame coordinate of the left frame portion to (j1−1, j11+1) and the width of the side to w3+2. Furthermore, when the coordinate of the outer contour of the right frame portion is (j2, j22) and the width is w4, the side width calculator 24a sets the frame coordinate of the right frame portion to (j2+1, j22−1) and the width of the side to w4+2.

Returning now to the description of the frame separating part 24 shown in FIG. 5, the frame eliminating part 24b eliminates the pattern existing between the outer contour and the inner contour based on the coordinate values of the outer contour and the inner contour of the frame obtained in the side width calculator 24a.

The frame noise eliminating part 24c carries out a labeling again with respect to the pattern which is eliminated of the frame, and eliminates the pattern which remains as a portion of the frame due to the characteristics such as small area for each label.

The attribute adder 24d focuses the attention on the pattern which is not added with an attribute in the connected pattern attribute adder 23, and adds an attribute of a pattern indicating that the pattern is either the contact character pattern or a portion of the character if the pattern exists after elimination of the frame and adds an attribute of a pattern indicating only the frame if no pattern exists after elimination of the frame.

As will be described later, the connected pattern integrating part 34 decides whether the contact character pattern or the portion of the character is to be integrated with other contact character patterns or portions of the character or is to be regarded as an independent pattern, after the character portion within the frame is interpolated.

(5) Calculation of the Character/Frame Intersection:

In the character/frame intersection calculator 25 shown in FIG. 5, the intersection calculator 25a calculates the intersections of the pattern and the frame with respect to the contact character pattern or the portion of the character. In other words, using the outer contour and the inner contour obtained in the frame separating part 24, a straight line 1 pixel on the outer side of the outer contour and a straight line 1 pixel on the inner side of the inner contour are obtained. Then, transition points where the pixel changes from black to white or from white to black are obtained at the points where these straight lines and the contact character pattern or the portion of the character intersect, and these points are extracted as intersections.

Figure 18:
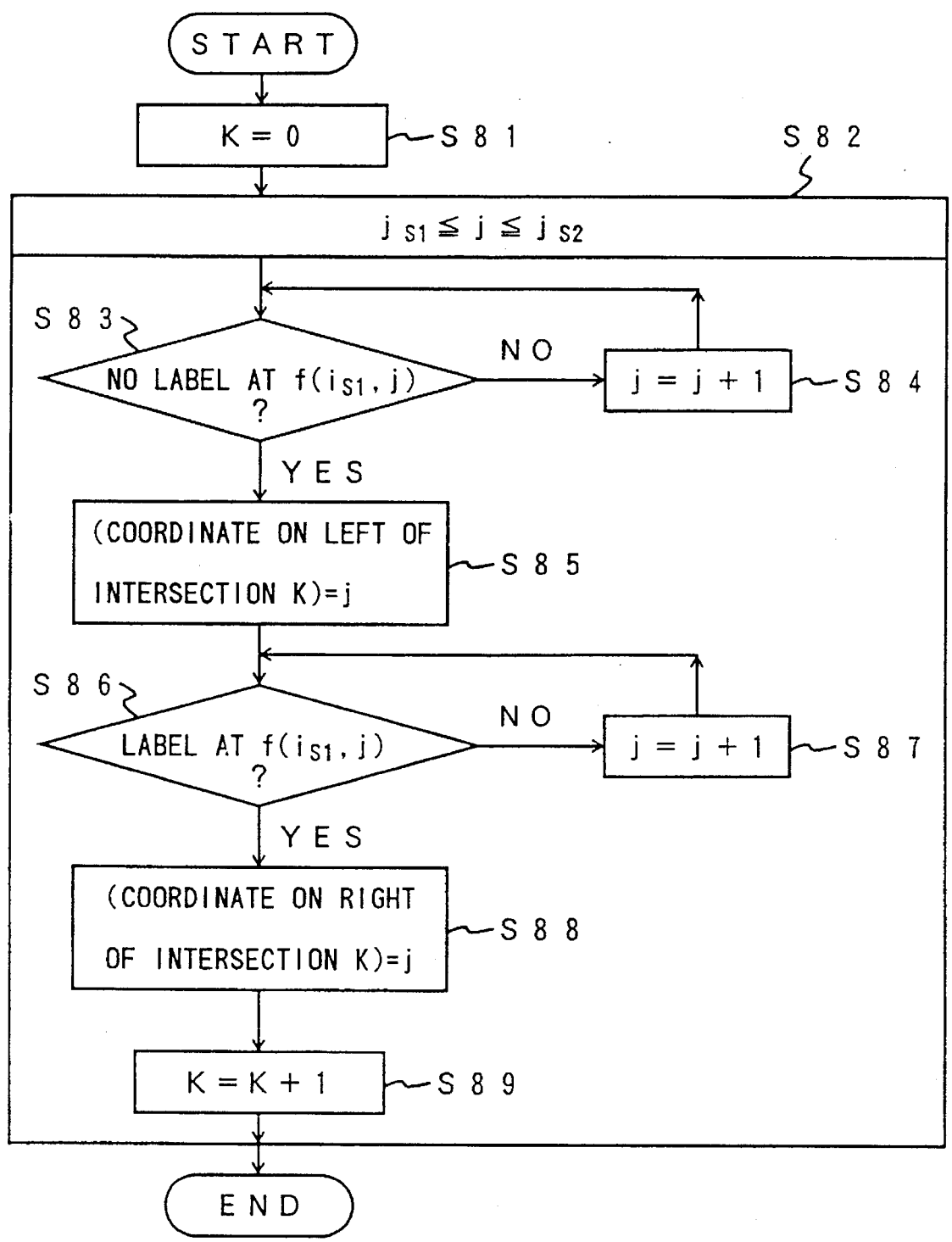

FIG. 18 shows a flow chart for the case where the process of the intersection calculator 25a is carried out by software, in order to describe an embodiment of the process of the intersection calculator 25a in more detail. In this case, the same coordinate system shown in FIG. 17 is used, and the following process is carried out by setting the coordinate on the outer side of the outer contour of the upper frame portion to is1, the coordinate on the inner side of the inner contour of the upper frame portion to iu1, the coordinate on the outer side of the outer contour of the lower frame portion to is2, the coordinate on the inner side of the inner contour of the lower frame portion to iu2, the coordinate on the outer side of the outer contour of the left frame portion to js1, the coordinate on the inner side of the inner contour of the left frame portion to ju1, the coordinate on the outer side of the outer contour of the right frame portion to is2, and the coordinate on the inner side of the inner contour of the right frame portion to ju2.

FIG. 18 shows the process of calculating the intersection of the outer contour of the upper frame portion and the character. In FIG. 18, a step S81 sets a number K of intersections to K=0, and a step S82 sets j to js1≦j≦js2. In other words, the following steps S83 through S89 are carried out for j=js1 to js2 by the setting of the step S82. A step S83 decides whether or not no label exists at f(is1, j). When no label exists at f(is1, j) and the decision result in the step S83 is NO, a step S84 increments j by 1 and the process returns to the step S83. On the other hand, if the decision result in the step S83 is YES, a step S85 sets the coordinate on the left side of the intersection to j. In addition a step S86 decides whether or not a label exists at f(is1, j). If the decision result in the step S86 is NO, a step S87 increments j by 1 and the process returns to the step S86. On the other hand, if the decision result in the step S86 is YES, a step S88 sets the coordinate on the right side of the intersection to j. Thereafter, a step S89 increments K by 1. After carrying out the above described steps S83 through S89 for j=js1 to is2, the process of calculating the intersection of the outer contour of the upper frame portion and the character ends.

The intersection of the inner contour of the upper frame portion, and the intersections of the character and the outer and inner contours of each of the lower, right and left frame portions can be calculated by processes similar to the process shown in FIG. 18, and a description and illustration thereof will be omitted in this specification.

(6) Association of the Intersections:

In the intersection associating part 31 shown in FIG. 6, the intersections of the frame and the character pattern or the portion of the character are associated in order to interpolate the contact character pattern or the portion of the character which has lost the continuity due to the separation of the frame. As kinds of intersection association, there are the one-to-one association, one-to-many association, and the re-association which is carried out responsive to a feedback based on the confirmation of the connection made in the connection confirming part 33 which will be described later. The re-association will be described later after describing the confirmation of the connection in the connection confirming part 33.

When the number of intersections on the outer contour and the number of intersections on the inner contour are the same, the ordering associating part 31a of the intersection associating part 31 regards the intersections as being the one-to-one association and associate the intersections in order. In doing so, the distance between the associated intersections is obtained.

Figure 19:
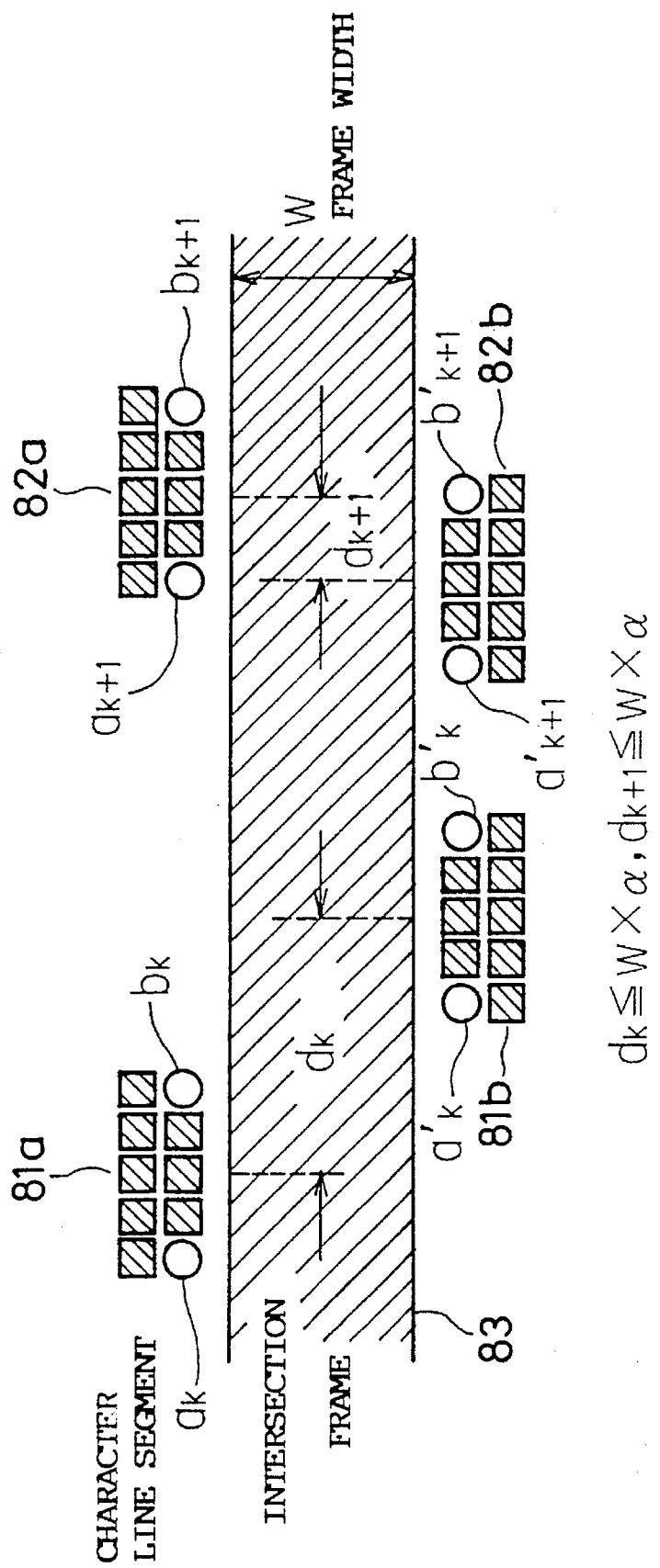
FIG. 19 is a diagram showing an example of an ordering association of intersections.

FIG. 19 shows an example of the ordering association. In FIG. 19, "white circles" which are unmarked indicate the intersections of a frame portion 83 and character line segments 81a, 81b, 82a and 82b. According to the ordering association, a middle point between 2 intersections existing on 1 character line segment is obtained as shown in FIG. 19, and differences $d_k$ and $d_{k+1}$ in the coordinate values of the middle point of the outer contour and the middle point of the inner contour in the X-axis direction, or the differences in the coordinate values in the Y-axis direction, are obtained. The intersections are associated if the differences in the coordinate values is less than or equal to a value which is obtained by multiplying a weighting coefficient α to the line width W of the frame which is obtained from the difference between the outer contour and the inner contour.

Figure 20:
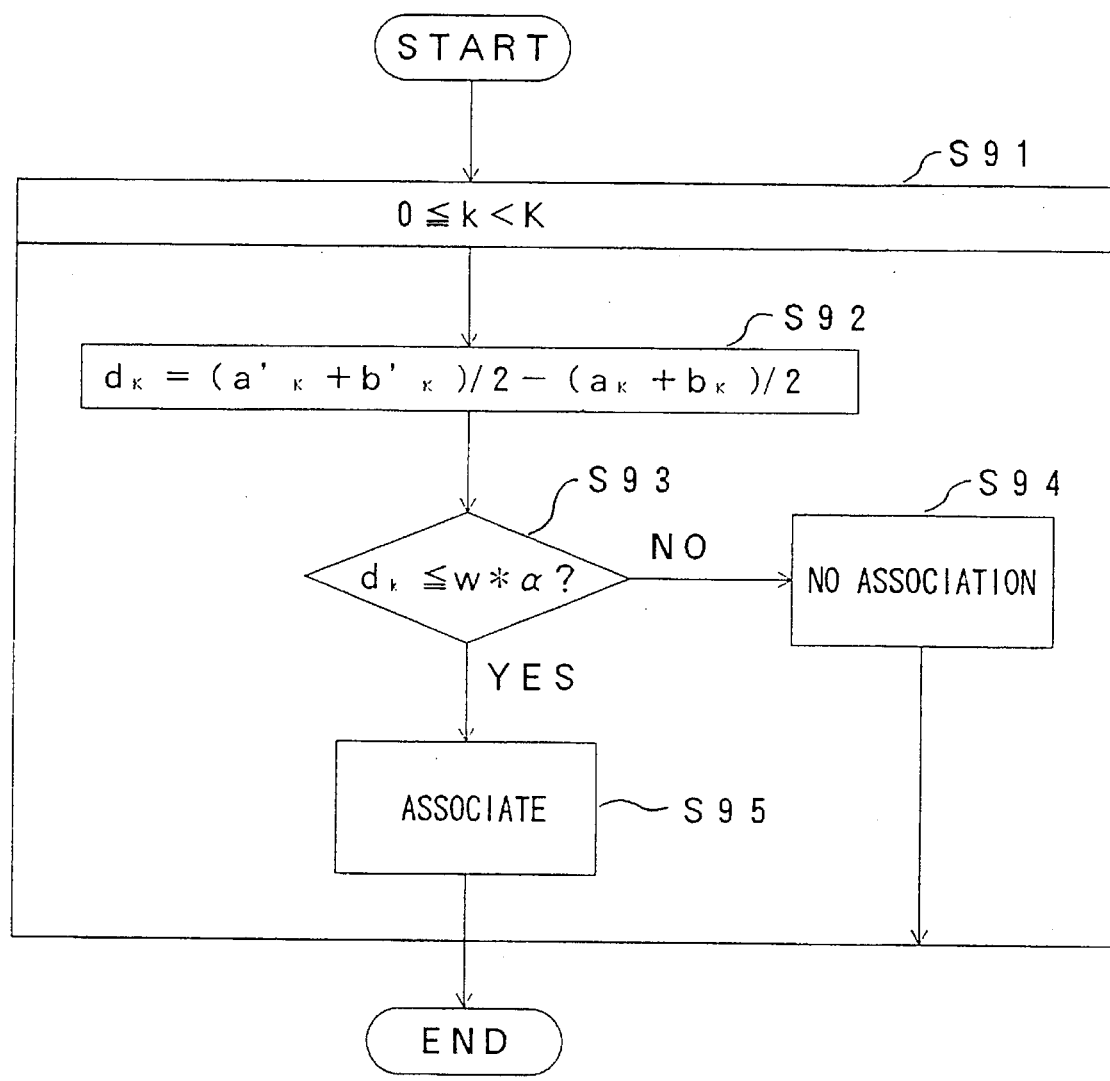

FIG. 20 shows a flow chart for the case where the process of the ordering associating part 31a is carried out by software, in order to describe an embodiment of the process of the ordering associating part 31a in more detail. When the number of intersections is denoted by K and the intersections shown in FIG. 19 are respectively denoted by $a_k$, $a_{k+1}$, $a'_k$, $a'_{k+1}$, $b_k$, $b_{k+1}$, $b'_k$ and $b'_{k+1}$, a step S91 sets 0≦k≦K with respect to the kth intersection. A step S92 obtains the difference $d_k$ of the coordinate values from $d_k=(a'_k+b'_k)/2-(a_k+b_k)/2$. A step S93 decides whether or not $d_k$≦Wxα. If the decision result in the step S93 is NO, a step S94 judges that no association of the intersections exists. On the other hand, if the decision result in the step S93 is YES, a step S95 associates the intersections. The above described steps S92 through S95 are repeated for k=0 to K.

Returning now to the description of FIG. 6, the line width calculator 31b of the intersection associating part 31 focuses the attention on the line segment which is subject to the one-to-one association. The line width calculator 31b calculates the distance between 2 intersections existing on 1 character line segment for each of the outer contour and the inner contour, and obtains the line width of the character line segment by taking an average of the calculated distances.

Figure 21:
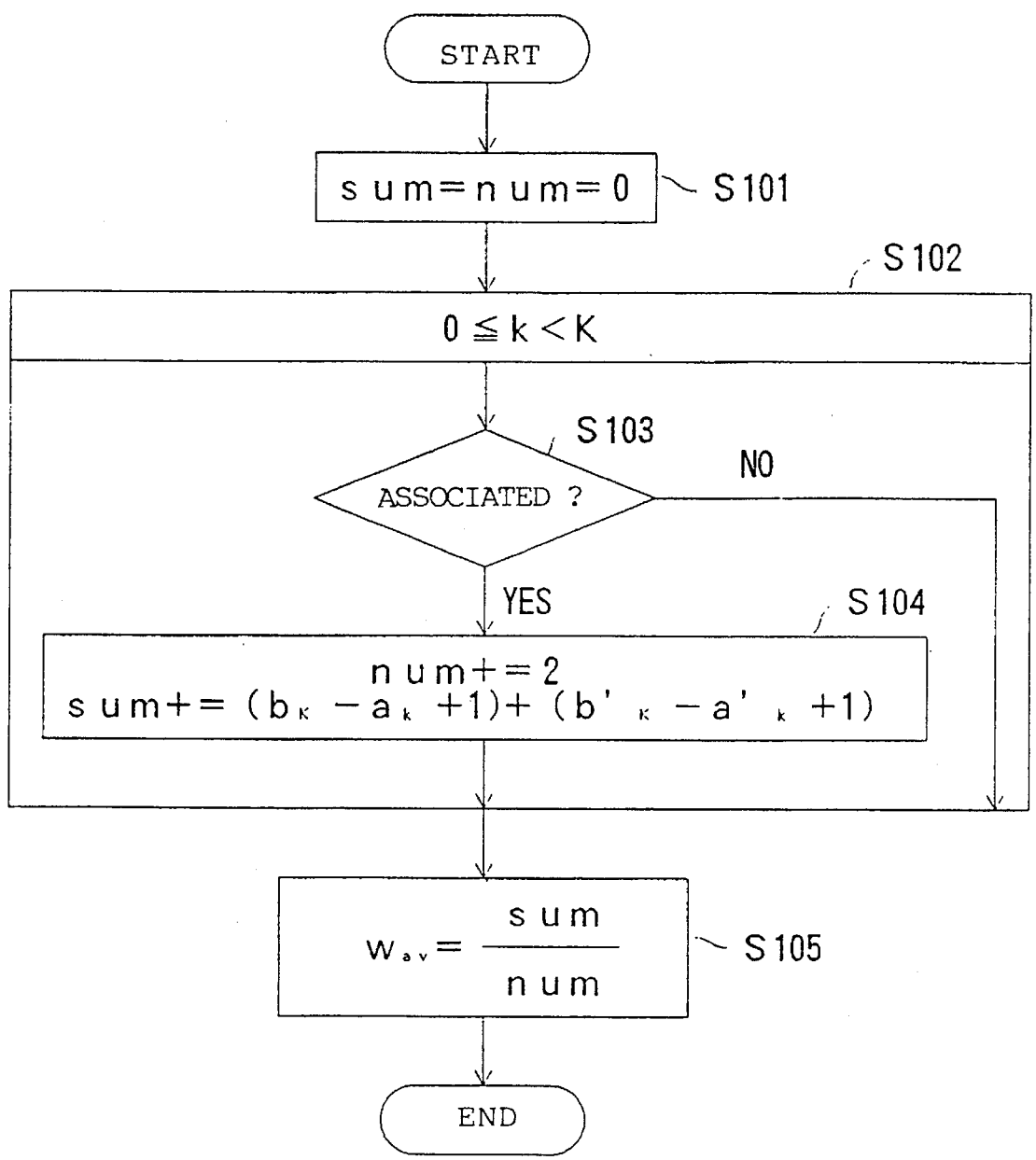
FIG. 21 is a flow chart for explaining a process of a line width calculator 31b.

FIG. 21 shows a flow chart for the case where the process of the line width calculator 31b is carried out by software, in order to describe an embodiment of the process of the line width calculator 31b in more detail. In FIG. 21, "num" denotes a number of intersections forming a pair, "sum" denotes a total of the line width between each of the intersections forming the pair, and "Wav" denotes the average line width.

In FIG. 21, a step S101 sets "sum" to sum=num=0. A step S102 sets $0 \leq k \leq K$ with respect to the kth intersection. A step S103 decides whether or not an intersection associated to the kth intersection exists, and the process advances to a step S105 if the decision result is NO. On the other hand, if the decision result in the step S103 is YES, a step S104 increases "num" by 2 and increases "sum" by $(b_k - a_{k+1}) + (b'_k - a'_{k+1})$. The steps S103 and S104 are repeated for k=0 to K. Thereafter, the step S105 obtains the average line width Wav from Wav=sum/num, and the process of calculating the line width ends.

Returning now to the description of FIG. 6, the distance associating part 31c of the intersection associating part 31 makes a distance association with respect to the intersections having the one-to-many association. In addition, the continuity associating part 31d of the intersection associating part 31 makes a continuity association with respect to the intersections having the one-to-many association.

FIGS. 22A, 22B and 22C show examples of the one-to-many association. FIG. 22A shows a case where the distance association is made, FIG. 22B shows a case where the continuity association is made, and FIG. 22C shows a case where the distance association is made. The distances between character line segments 91a and 91b, between character line segments 92a and 92b, and between character line segments 93a and 93b which are to be associated become farther towards FIG. 22C from FIG. 22A, but the association of the intersections is made if one of the conditions shown in FIGS. 22A, 22B and 22C is satisfied.

In FIG. 22A, a middle point between 2 intersections existing in the character line segments 91a through 91c is obtained for each of the character line segments 91a through 91c, and the distances among the middle points are obtained. In other words, a distance d1 between a middle point of the outer contour (a middle point of the 2 intersections of the character line segment 91a) and a middle point of the inner contour (a middle point of the 2 intersections of the character line segment 91c), and a distance d2 between a middle point of the outer contour (a middle point of the 2 intersections of the character line segment 91b) and the middle point of the inner contour (a middle point of the 2 intersections of the character line segment 91c) are obtained. Next, the distances d1 and d2 are compared with a line width W of a frame portion 94, and if a relation $d1 \leq W$ or $d2 \leq W$ is satisfied, the intersection satisfying the relation is associated. In addition, if there exist a plurality of intersections satisfying the above relation, all of these intersections are associated. By making such a association, the hand-written character patterns "H", "*", "U" and "A", for example, are interpolated as indicated on the lower portion of FIG. 22A.

FIG. 22B shows a case where the intersections are associated based on continuity. Even if the distance between the character line segment is far or the line width of the character line segment at the inner or outer contour is wide, the intersections are associated based on the directional continuity between the character line segments. When making the association based on the continuity, the slope of the contour of the character line segment is calculated at each intersection, and the continuity is obtained based on the slope. However, in order to simplify the calculation of the direction vector, a point of interest is gone upstream by a certain number of pixels along the contour of the character line, and the direction can be obtained from the coordinate value of this point of interest and the coordinate value of the intersection.

FIG. 22B shows an example which uses a vector which is perpendicular to the contour line of the frame from the intersection, so as to simplify the description. As shown in FIG. 22B, the position of the intersection between the direction vector extending from the intersection of the character line segment 92c having the smaller number of intersections and the frame contour line having the larger number of intersections is obtained. If the obtained position belongs within the character line segments 92a or 92b, attention is again focused on the intersections of the character line segment to which this intersection belongs. The direction vector is extended from the intersection of this character line segment, and the position of the intersection between this direction vector and the frame contour having the smaller number of intersections is obtained. If the obtained intersection belongs to the character line segment 92c as shown in FIG. 22B, the intersection from which the direction vector is extended and this intersection belonging to the character line segment 92c are associated.

By making the above described association based on the continuity, the hand-written character patterns "H", "*" and "U", for example, are interpolated as shown in the lower portion of FIG. 22B.

FIG. 22C show a case where the association is made based on the distance if the distance between the associating character line segments 93a and 93b is far. As shown in FIG. 22C, a distance d3 between the intersection of the outer contour and the intersection of the inner contour and a distance d4 between the intersection of the inner contour and the intersection of the outer contour in the direction in which the frame portion extends are calculated. If the calculated distances d3 and d4 is smaller than a predetermined threshold value which is one-half the width W of the frame portion, for example, that is, $d3 \leq W/2$ and $d4 \leq W/2$, the intersections are associated.

By making the association based on the distance, the hand-written character patterns "H" and "*", for example, are interpolated as shown in the lower portion of FIG. 22C.

In FIGS. 22A, 22B and 22C, the association made is a one-to-two association. However, the association may of course be a one-to-one association which associates one intersection to only one of the 2 intersections.

Figure 23:
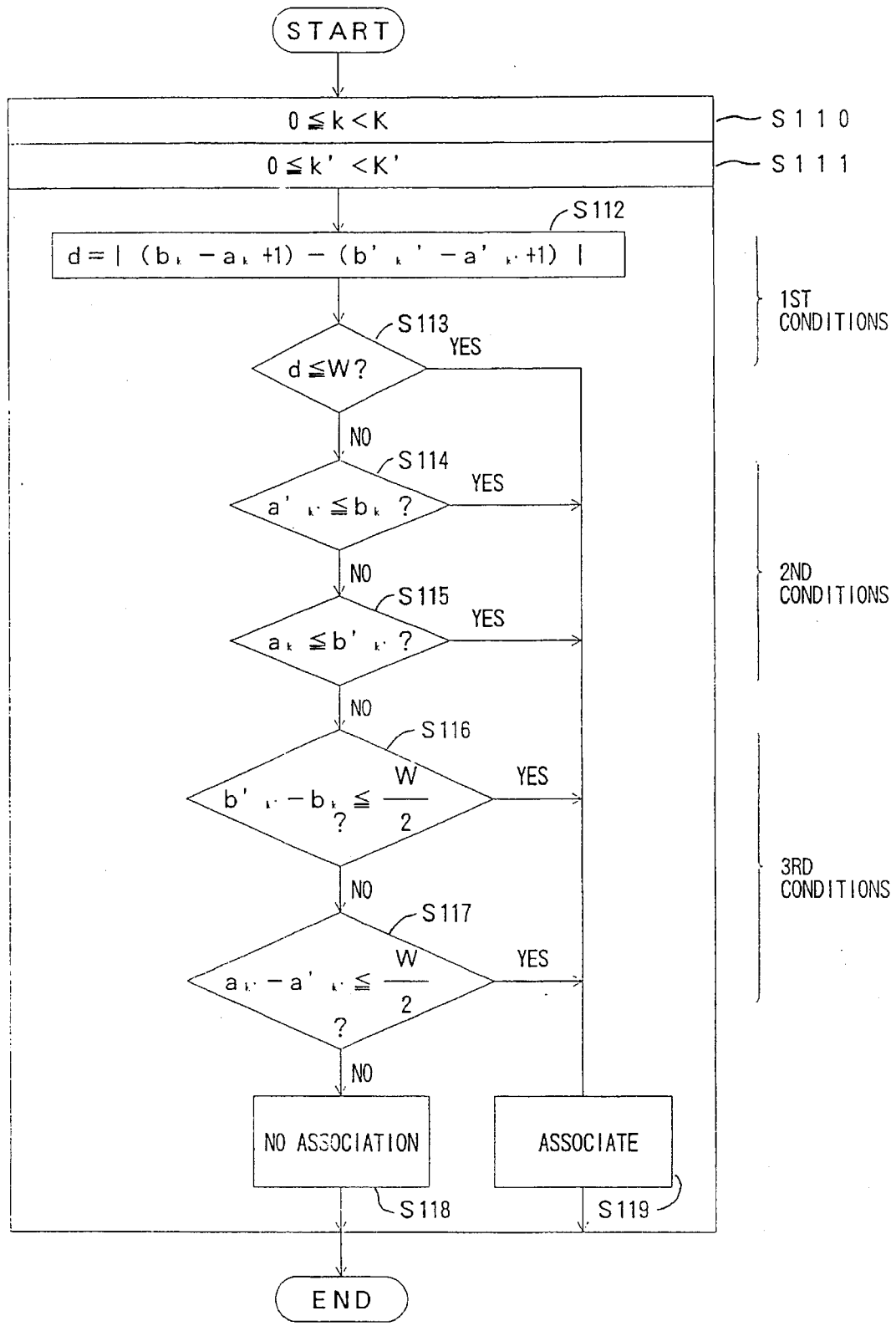
FIG. 23 is a flow chart for explaining a process of a distance associating part 31c.

FIG. 23 shows a flow chart for the case where the processes of the distance associating part 31c and the continuity associating part 31d are carried out by software, in order to describe an embodiment of the processes of the distance associating part 31c and the continuity associating part 31d in more detail.

In FIG. 23, a step S110 sets $0 \leq k \leq K$ with respect to the kth intersection, where K denotes the number of intersections of the outer frame portion. In addition, a step S111 sets $0 \leq k' \leq K'$ with respect to the k'th intersection, where K' denotes the number of intersections of the inner frame portion. A step S112 sets the distance d between the intersection of the outer frame portion and the intersection of the inner frame portion to $d = |(b_k - a_{k+1}) - (b'_{k'} - a'_{k'+1})|$. Next, a step S113 decides whether or not $d \leq W$, where W denotes the width of the frame portion. If the decision result in the step S113 is NO, a step S114 decides whether or not $a_k \leq b_{k'}$. If the decision result in the step S114 is NO, a step S115 decides whether or not $a_k \leq b'_{k'}$. If the decision result in the step S115 is NO, a step S116 decides whether or not $b'_{k'} - b_k \leq W/2$. If the decision result in the step S116 is NO, a step S117 decides whether or not $a_k - a'_{k'} \leq W/2$. If the decision result in the step S117 is NO, a step S118 judges that there is no association between the intersections, and the process ends. On the other hand, if the decision result in any of the steps S113 through S117 is YES, a step S119 associates the intersections and the process ends. The steps S112 through S119 are repeated within the ranges of $0 \leq k \leq K$ and $0 \leq k' \leq K'$.

The steps S112 and S113 correspond to the operation of the distance associating part 31c, and correspond to the conditions described above in conjunction with FIG. 22A. In addition, the steps S114 and S115 correspond to the operation of the continuity associating part 31d, and correspond to the conditions described above in conjunction with FIG. 22B. Furthermore, the steps S116 and S117 correspond to the operation of the distance associating part 31c, and correspond to the conditions described above in conjunction with FIG. 22C.

Returning now to the description of FIG. 6, the size confirming part 31f of the intersection associating part 31 obtains the size of the pattern which is obtained by the association, wit respect to the pattern which satisfies the associating conditions. This size is compared with the character size which is known in advance or the size of the frame which is calculated in the straight line/frame extracting part 22. The intersections are not associated if the size ratio obtained as a result of the comparison is too large.

In other words, the pattern which is formed by the associating the intersections is approximated by a rectangle by carrying out a labeling. Then, the ratio of the pattern of the rectangle which is obtained by the approximation and the character size or the size of 1 character frame is calculated. In addition, the association of the intersections is cancelled if the obtained ratio exceeds a predetermined threshold value.

Figure 24:
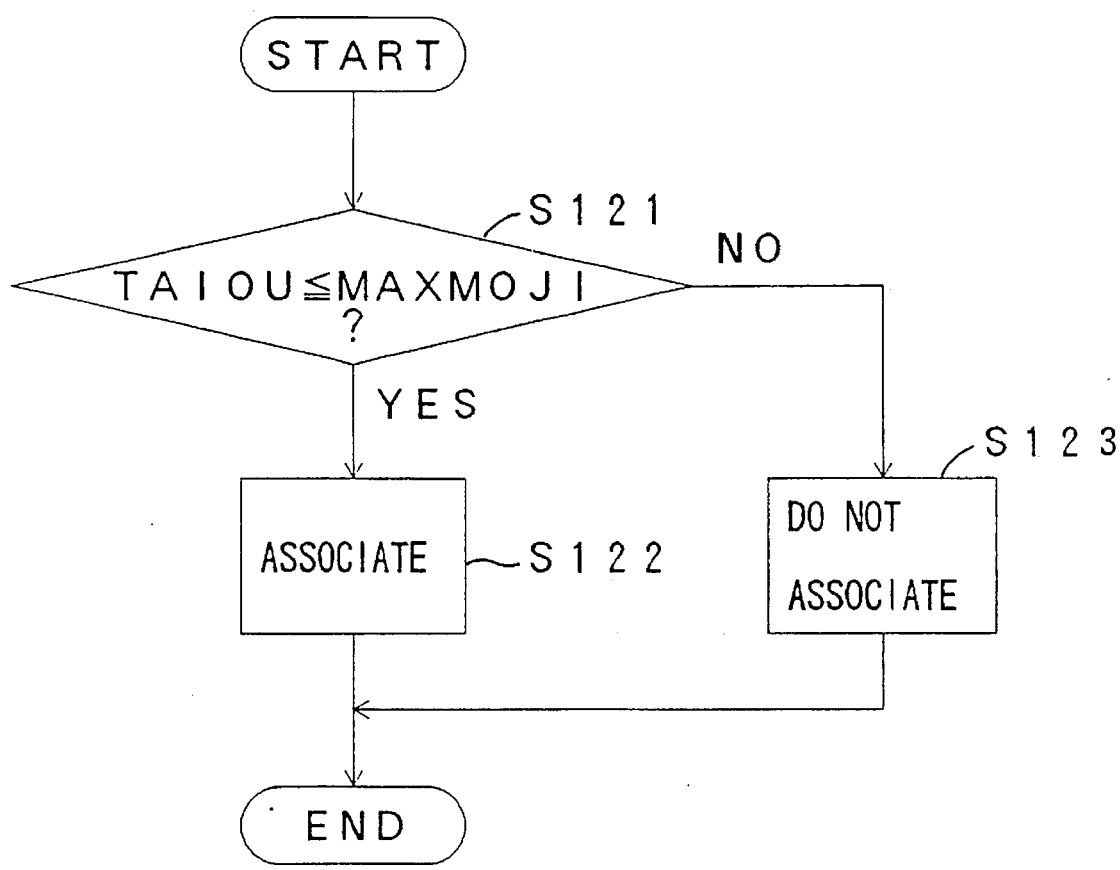
FIG. 24 is a flow chart for explaining a process of a size confirmation part 31f.

FIG. 24 shows a flow chart for the case where the process of the size confirming part 31f is carried out by software, in order to describe an embodiment of the process of the size confirming part 31f in more detail.

In FIG. 24, a step S121 decides whether or not TAIOU $\leq$ MAXMOJI, where TAIOU denotes the size of the pattern which satisfies the conditions for associating the intersections after the association, and MAXMOJI denotes the character size when the character size is known in advance or the size of the frame which is obtained by the frame extracting part 22 when the character size is unknown. If the decision result in the step S121 is YES, a step S122 associates the intersections, and the process ends. On the other hand, if the decision result in the step S121 is NO, a step S123 cancels the association of the intersections, and the process ends.

The re-associating part 31e of the intersection associating part 31 will be described later.

(7) Interpolation of the Frame Interior Character:

The frame interior character interpolator 32 distinguishes the case where the intersections have the one-to-one association and the case where the intersections have the one-to-many association. The frame interior interpolator 32 smoothly connects the intersections of the contact character pattern or a portion thereof, and interpolates the character portion which dropped out (or chipped) when separating the frame. The term "frame interior character" refers to the character written inside the frame.

The simple interpolator 32a is provided as a means for smoothly connecting the intersections of the contact character pattern or a portion thereof which has the one-to-one association. Basically, when making the one-to-one interpolation, the direction vector of the contour of the character line between the intersections is calculated. A straight line is drawn from each intersection depending on the direction vector, and the character line segments are connected at the point where such straight lines intersect. In addition, in order to omit the trouble of calculating the direction vector, it is possible to carry out the interpolation by connecting each of the associated intersections.

Figure 25:
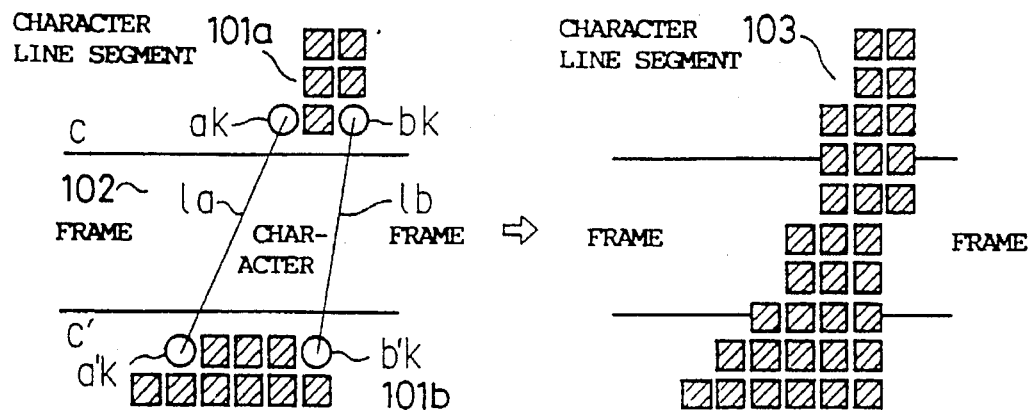
FIG. 25 is a diagram showing an example of a one-to-one simple interpolation.

FIG. 25 shows an example of the one-to-one simple interpolation. In FIG. 25, there are shown character line segments 101a and 101b which are to be interpolated, a frame 102, and an interpolated line segment 103. FIG. 25 shows a case where the interpolation is carried out by connecting each of the associated intersections. The intersections of the character line segment 101a are connected to the intersections of the character line segment 101b by straight lines as shown on the left side of FIG. 25, and the area between the two straight lines is filled by black pixels so as to obtain the interpolated character line segment 103 shown on the right side of FIG. 25.

Figure 26:
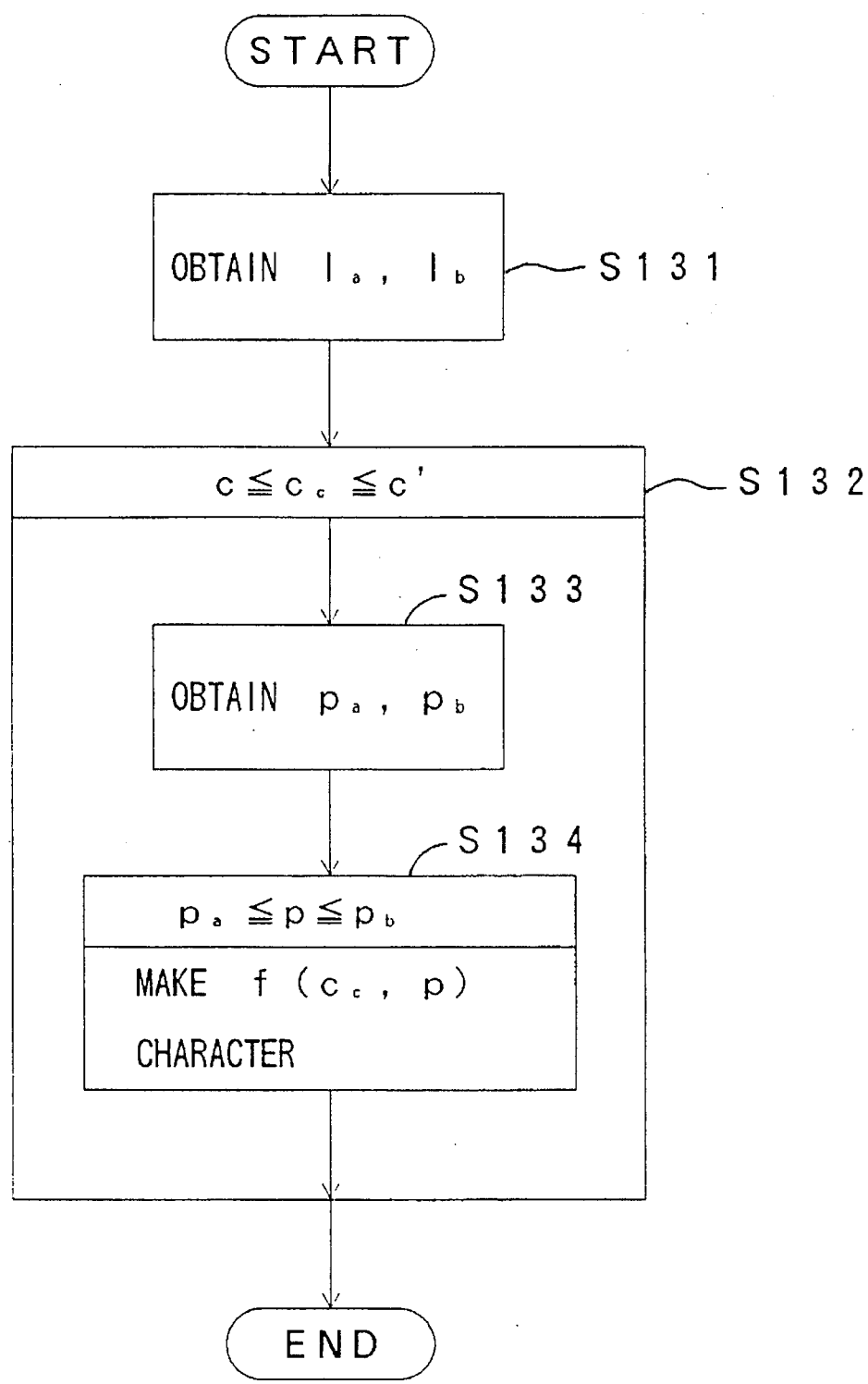

FIG. 26 shows a flow chart for the case where the process of the simple interpolator 32a is carried out by software, in order to describe an embodiment of the process of the simple interpolator 32a in more detail.

In FIG. 26, a step S131 obtains a straight line 1a connecting the intersections $a_k$ and $a'_k$ and a straight line 1b connecting the intersections $b_k$ and $b'_k$ in FIG. 25. A step S132 sets cc to $c \leq cc \leq c'$ for associates c and c' which respectively are 1 pixel to the character side from the frame 102 in FIG. 25. A step S133 obtains an intersection pa of the straight line 1a and the frame 102, and an intersection pb of the straight line 1b and the frame 102. A step S134 sets p to $pa \leq p \leq pb$, and regards f(cc, p) as the character. The steps S133 and S134 are repeated within a range of cc such that $c \leq cc \leq c'$.

In the case of the one-to-many interpolation, the cross-point calculator 32b first calculates the direction vector of the contour of the character line segment at each intersection. A straight line is drawn from each intersection depending on the direction vector, and the intersection of such straight lines is calculated. In order to omit the trouble of calculating the direction vector, the direction vector may be substituted by the straight line which connect the associated intersections.

After the cross-points are calculated in the cross-point calculator 32b, the cross-point frame interior interpolator 32c carries out the interpolation when the calculated cross-point exists within the frame.

Figure 27A:
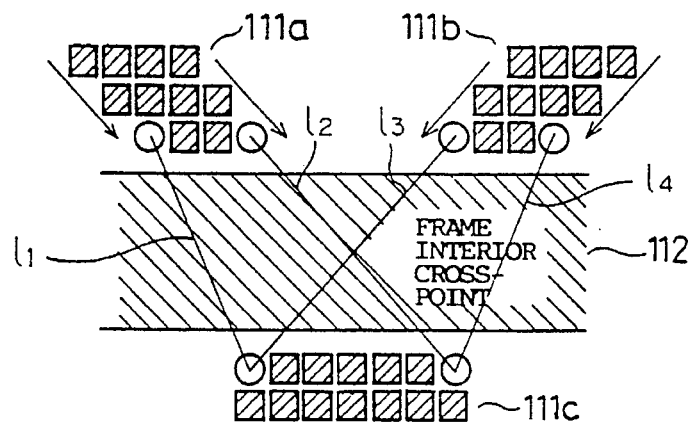
FIGS. 27A and 27B respectively are diagrams showing an example of a cross-point frame interior interpolation.
Figure 27B:
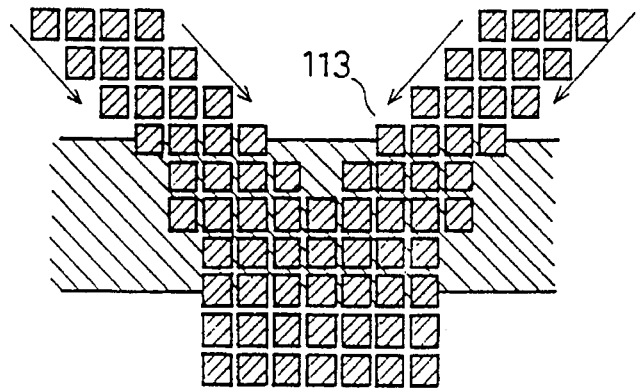

FIGS. 27A and 27B are diagrams showing an example of the cross-point frame interior interpolation. FIG. 27A shows character line segments 111a, 111b and 111c before the interpolation and a frame 112, and FIG. 27B shows the frame 112 and an interpolated character line segment 113. FIGS. 27A and 27B show a case where the direction vector is substituted by the straight line connecting the associated intersections. When the associated intersections are connected by the straight line and a cross-point of such straight lines exists within the frame 112 as shown in FIG. 27A, the area between the straight lines is filled by black pixels so as to interpolate the character line segments 111a, 111b and 111c.

The interpolation and the straight line interpolation for a case where the cross-point exists outside the frame will be described as the re-association, after describing the continuity which is confirmed in the connection confirming part 33.

Figure 28:
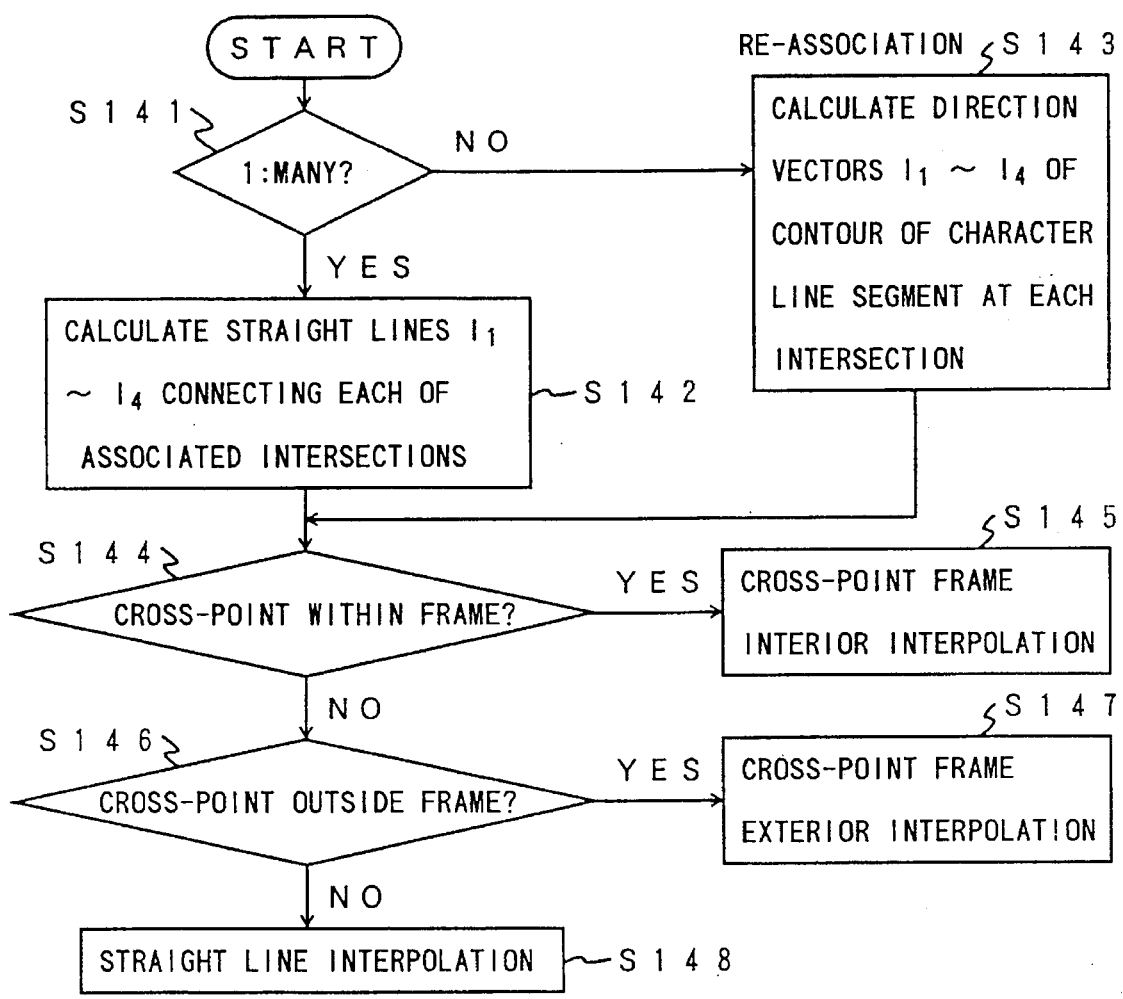
FIG. 28 is a flow chart for explaining a process of a cross-point calculator 32b for associated straight line.

FIG. 28 shows a flow chart for the case where the process of the cross-point calculator 32b is carried out by software, in order to describe an embodiment of the process of the cross-point calculator 32b in more detail.

In FIG. 28, a step S141 decides whether or not the interpolation is the one-to-many interpolation. If the decision result in the step S141 is YES, a step S142 calculates straight lines 11 through 14 which connect each of the associated intersections. On the other hand, if the decision result in the step S141 is NO, a step S143 calculates direction vectors $1_1$ through $1_4$ of the contour of the character line segment at each of the intersections. After the step S142 or S143, a step S144 decides whether or not the cross-point exists within the frame 122. If the decision result in the step S144 is YES, a step S145 advances to the process of the cross-point frame interior interpolator 32c which will be described later. On the other hand, if the decision result in the step S144 is NO, a step S146 decides whether or not the cross-point exists outside the frame 112. If the decision result in the step S146 is YES, a step S147 advances to the process of the cross-point frame exterior interpolator 32d which will be described later. In addition, if the decision result in the step S146 is NO, a step S148 advances to the process of the straight line interpolator 32e.

(8) Confirmation of the Connection and Re-Association:

In the connection confirming part 33, the connection is confirmed by carrying out the labeling again by the labeling part 33a with respect to the interpolated contact character pattern or a portion thereof.

The contact character pattern or the portion thereof is originally a connected pattern. Hence, if the connection can be confirmed as a single pattern after the interpolation, the process advances to the next process of the connected pattern integrating part 34.

In addition, if the connection cannot be confirmed, it means that the connection is lost by the elimination of the frame. Hence, a feedback is made again to re-associate the intersections in the re-associating part 31e of the intersection associating part 31. Out of the patterns for which the connection cannot be confirmed, the processing time can be reduced by carrying out the re-association only for the case where the straight line connecting the intersections exists on the frame.

With respect to the pattern for which the connection could not be confirmed, the re-associating part 31e first associates the intersections existing at the inner contour out of the intersections which could not be associated. For this reason, out of the intersections existing at the plurality of inner contours, the intersections which are close are associated. If only 1 intersection to be associated exists, the association is made with respect to the intersection which is already associated.

If no intersection to be associated exists at the inner contour, the attention is focused on the intersection which cannot be associated at the outer contour, and the association is made with respect to the character line segment which is closest.

With respect to the associate pattern, the size confirming part 31f of the intersection associating part 31 checks the size of the newly generated pattern as described above, and the frame interior character interpolator 32 carries out the interpolation when the size is confirmed. Furthermore, the connection is again confirmed by the connection confirming part 33, and the above described re-association is made if the connection cannot be confirmed. Such a process. is repeated until the connection can be confirmed by the connection confirming part 33.

FIGS. 29A and 29B and FIGS. 30A and 30B show examples of the interpolation carried out by the re-association. FIG. 29A shows an example of the intersection frame interior interpolation for the case where the intersection calculated by the cross-point calculator 32b of the frame interior character interpolator 32 exists within the frame, and FIG. 29B shows an example of the cross-point frame exte-
rior interpolation for the case where the intersection exists outside the frame. FIG. 30A shows an example of the straight line interpolation for the case where no character line segment exists outside the outer contour, and FIG. 30B shows an example of the straight line interpolation for the case where the character line segment exists outside the outer contour. In FIGS. 29A, 29B, 30A and 30B, the character line segments to be interpolated are denoted by reference numerals 121a, 121b, 131a, 131b, 134a and 134b, the frames are denoted by reference numerals 122 and 132, and the interpolated character line segments are denoted by reference numerals 124, 133 and 135.

The term "cross-point frame exterior interpolation" refers to the interpolation of the cross-point outside the frame.

In the case where the cross-point calculated by the cross-point calculator 32b exists within the frame, the cross-point frame interior interpolator 32c obtains the character line segment 124 which is interpolated by filling black pixels in the character region. As shown in FIG. 29A, a portion surrounded by the straight lines connecting the cross point calculated in the cross-point calculator 32b and the intersections of the character line segments 121a and 121b, the straight lines extended from the intersections of the character line segments 121a and 121b, and the outer contour is regarded as the character region.

In the case where the cross-point calculated by the cross-point calculator 32b exists outside the frame, the cross-point frame exterior interpolator 32d regards a portion shown in FIG. 29B surrounded by the straight lines extending from the intersections of the character line segments 121a and 121b as the character region and carried out the interpolation. In addition, the in order to integrate the divided character regions, the cross-point frame exterior interpolator 32d interpolates between the character regions which are divided by the straight lines by a width corresponding to the line width of the character from the outer contour. As a result, the character line segment 124 is obtained by filling black pixels in the interpolated character region.

On the other hand, if the cross-point cannot be calculated by the cross-point calculator 32b, the straight line interpolator 32e extends the intersections of the character line segments 131a and 131b as shown in FIG. 30A. In addition, the straight line interpolator 32e interpolates the regions formed by the extended straight lines by a width corresponding to the line width of the character. As a result, the character line segment 133 is obtained by filling black pixels in these regions by regarding these regions as character regions.

In addition, if a closest line segment having associated intersections exists on the outer side of the outer contour, the character line segment of the inner contour is interpolated by the above described technique as shown in FIG. 30B, so as to obtain the interpolated character line segment 134a. Thereafter, a region surrounded by the straight lines extended from the intersections of the character line segment 134b on the outer side of the outer contour and the character line segment 134a is regarded as the character region, and the character line segment 135 is obtained by filling black pixels in the character region.

The character line segment is interpolated as described above. But for the intersections which cannot be associated, the following cross-point frame interior interpolation and the cross-point frame exterior interpolation are carried out when only 1 character line segment exists at the inner contour, for example.

Figures 31A, 31B:
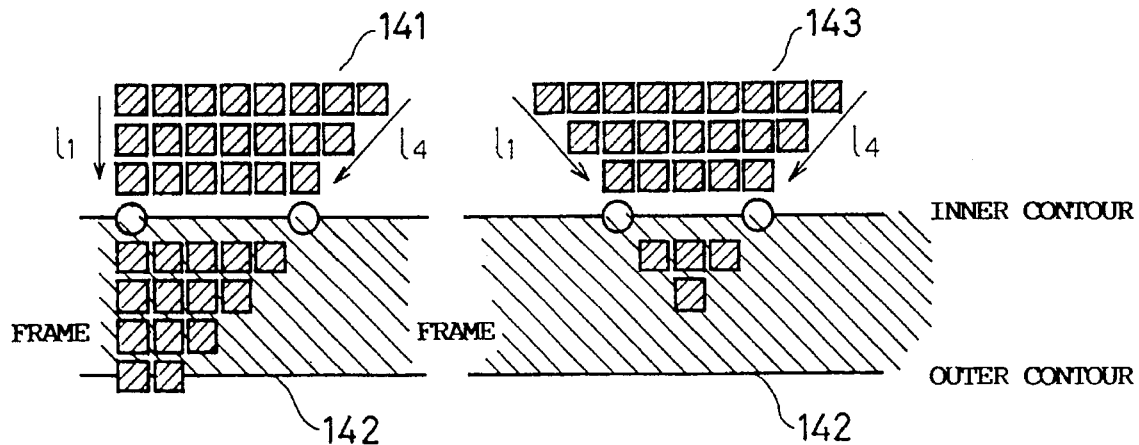
FIGS. 31A and 31B respectively are diagrams showing an example of the interpolation at an intersection where no association is possible.

FIGS. 31A and 31B show examples of the above interpolation. FIG. 31A shows the example of the cross-point frame exterior interpolation, and FIG. 31B shows the example of the cross-point frame interior interpolation. In FIGS. 31A and 31B, the character line segments to be interpolated are denoted by reference numerals 141 and 143, and the frame is denoted by a reference numeral 142.

In the case where the cross-point exists outside the frame 142, a region surrounded by the extension line from the intersection of the character line segment 141 and the outer contour of the frame 142 is regarded as the character region, and the interpolation is carried out by filling this character region by black pixels as shown in FIG. 31A.

On the other hand, in the case where the cross-point exists inside the frame 142, a region surrounded by the extension lines from the intersections of the character line segment 143 is regarded as the character region, and the interpolation is carried out by filling this character region by black pixels as shown in FIG. 31B.

Figure 32:
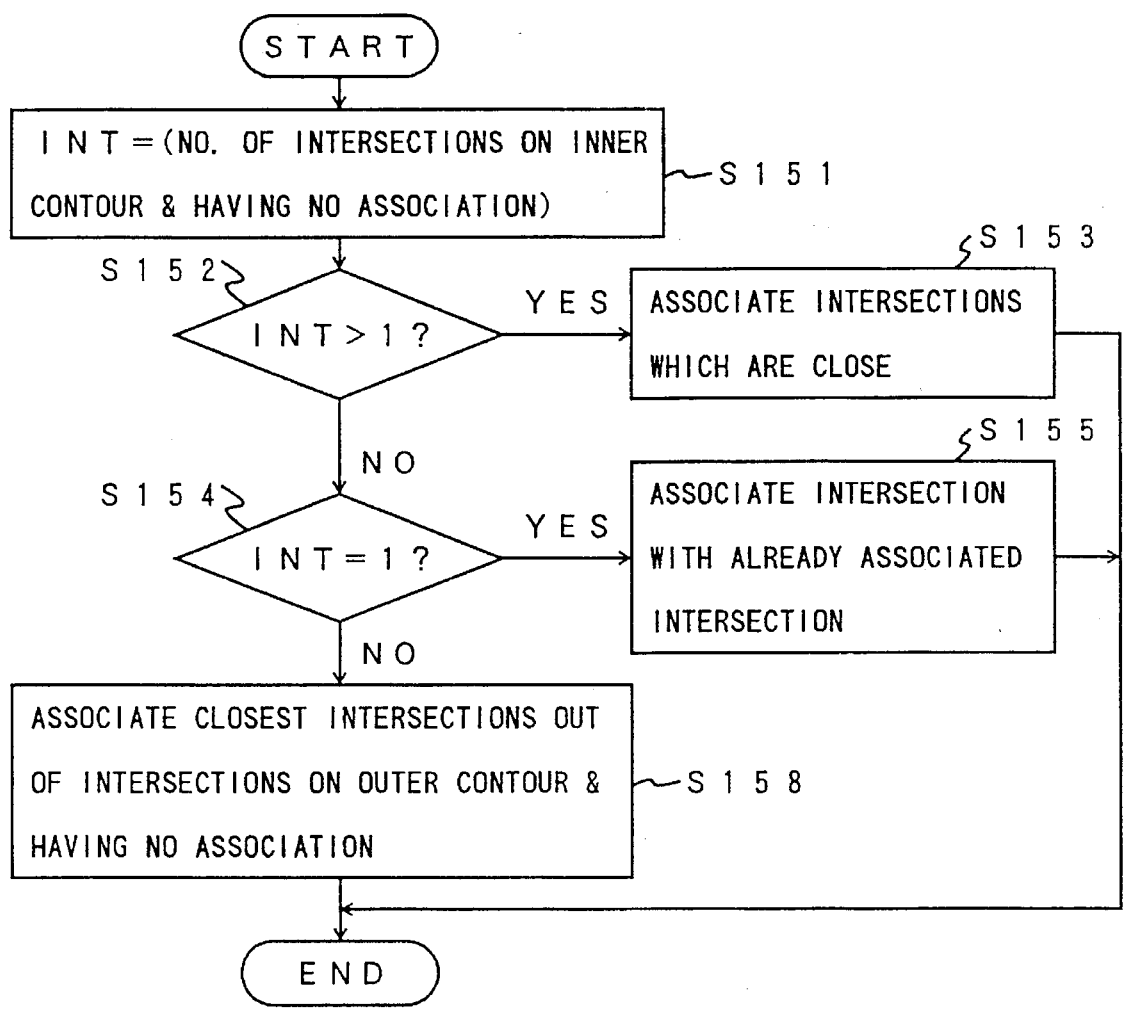
FIG. 32 is a flow chart for explaining a process of a re-associating part 31e.

FIG. 32 shows a flow chart for the case where the process of the re-associating part 31e is carried out by software, in order to describe an embodiment of the process of the re-associating part 31e in more detail.

In FIG. 32, a step S151 sets a number of intersections on the inner contour and having no association to INT. A step S152 decides whether or not INT>1. If the decision result in the step S152 is YES, a step S153 associates the intersections which are close in distance, and the process ends. On the other hand, if the decision result in the step S152 is NO, a step S154 decides whether or not INT=1. If the decision result in the step S154 is YES, a step S155 associates the intersection with the intersection which is already associated, and the process ends. In addition if the decision result in the step S154 is NO, a step S156 associates the intersections which are closest in distance out of the intersections on the outer contour and having no association, and the process ends.

Figure 33:
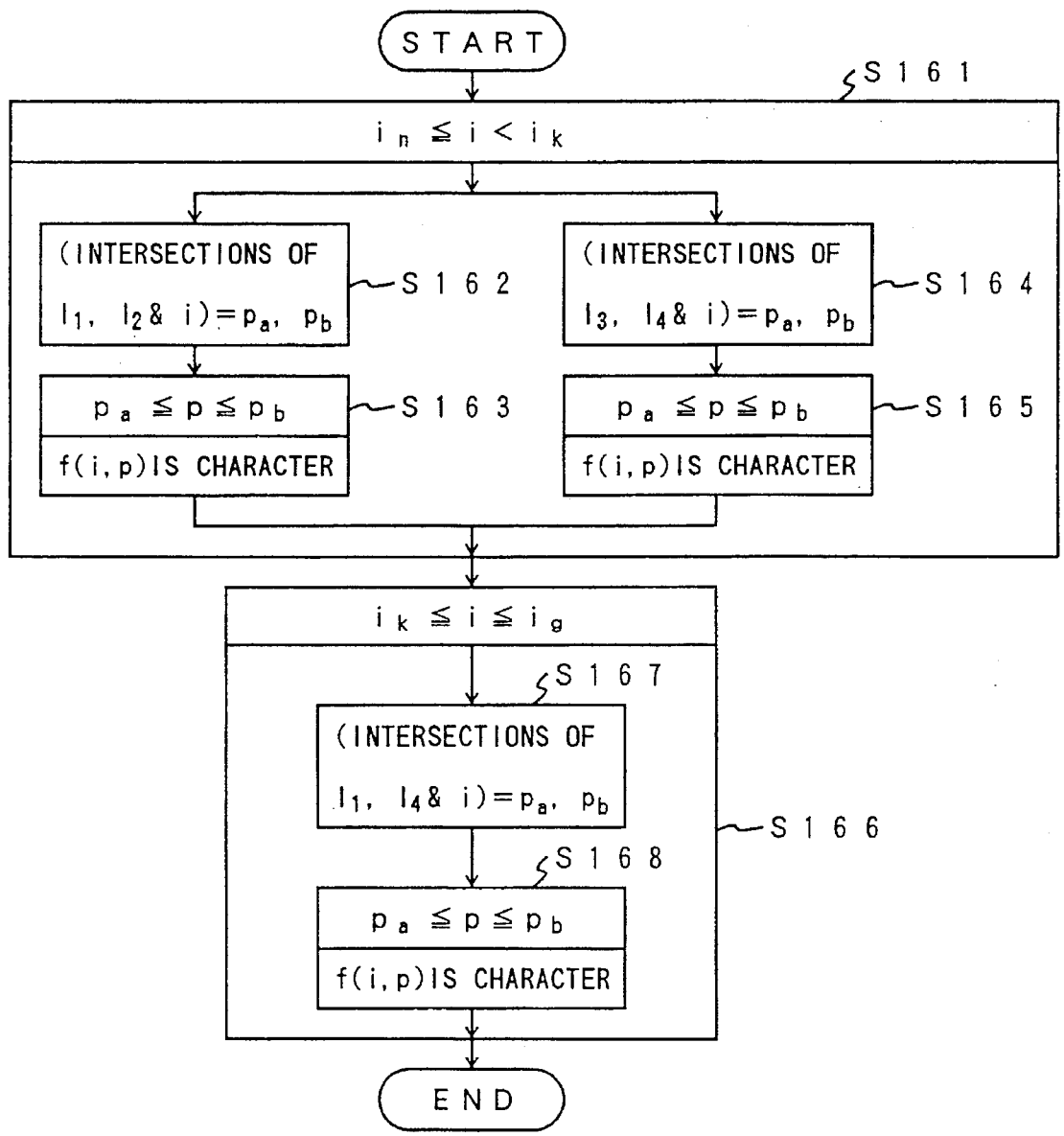
FIG. 33 is a flow chart for explaining a process of a cross-point frame interior interpolator 32c.

FIG. 33 shows a flow chart for the case where the process of the cross-point frame interior interpolator 32c is carried out by software, in order to describe an embodiment of the process of the cross-point frame interior interpolator 32c in more detail. In FIG. 33 and FIGS. 34 through 37 which will be described later, it is assumed for the sake of convenience that $(i_k, j_k)$ denotes the cross-point and the intersection of the straight lines 11 and 12 in FIG. 27A, $i_n$ denotes the coordinate of the inner contour of the frame 112, $i_g$ denotes the coordinate of the outer contour of the frame 112, w denotes the line width of the character, and $i_{g-w}$ denotes the coordinate on the inside of the outer contour of the frame 112 by an amount corresponding to the character line width w.

In FIG. 33, a step S161 sets i to $i_n \leq i \leq i_k$. A step S162 sets the intersections of the straight lines 11 and 12 and i to Pa and Pb, and a step S163 regards f(i, P) as the character if P satisfies $Pa \leq P \leq Pb$. In addition, steps S164 and 165 are carried out simultaneously as the steps S162 and S163. The step S164 sets the intersections of the straight lines 13 and 14 and i to Pa and Pb, and the step S165 regards f(i, P) as the character if P satisfies $Pa \leq P \leq Pb$. The above described steps S162 through S165 are repeated within a range of $i_n \leq i \leq i_k$. In addition, a step S166 sets i to $i_k \leq i \leq i_g$. A step S167 sets the intersections of the straight lines 11 and 14 and i to Pa and Pb, and a step S168 regards f(i, P) as the character if P satisfies $Pa \leq P \leq Pb$. The steps S167 and S168 are repeated within a range of $i_k \leq i \leq i_g$, and the process thereafter ends.

Figure 34:
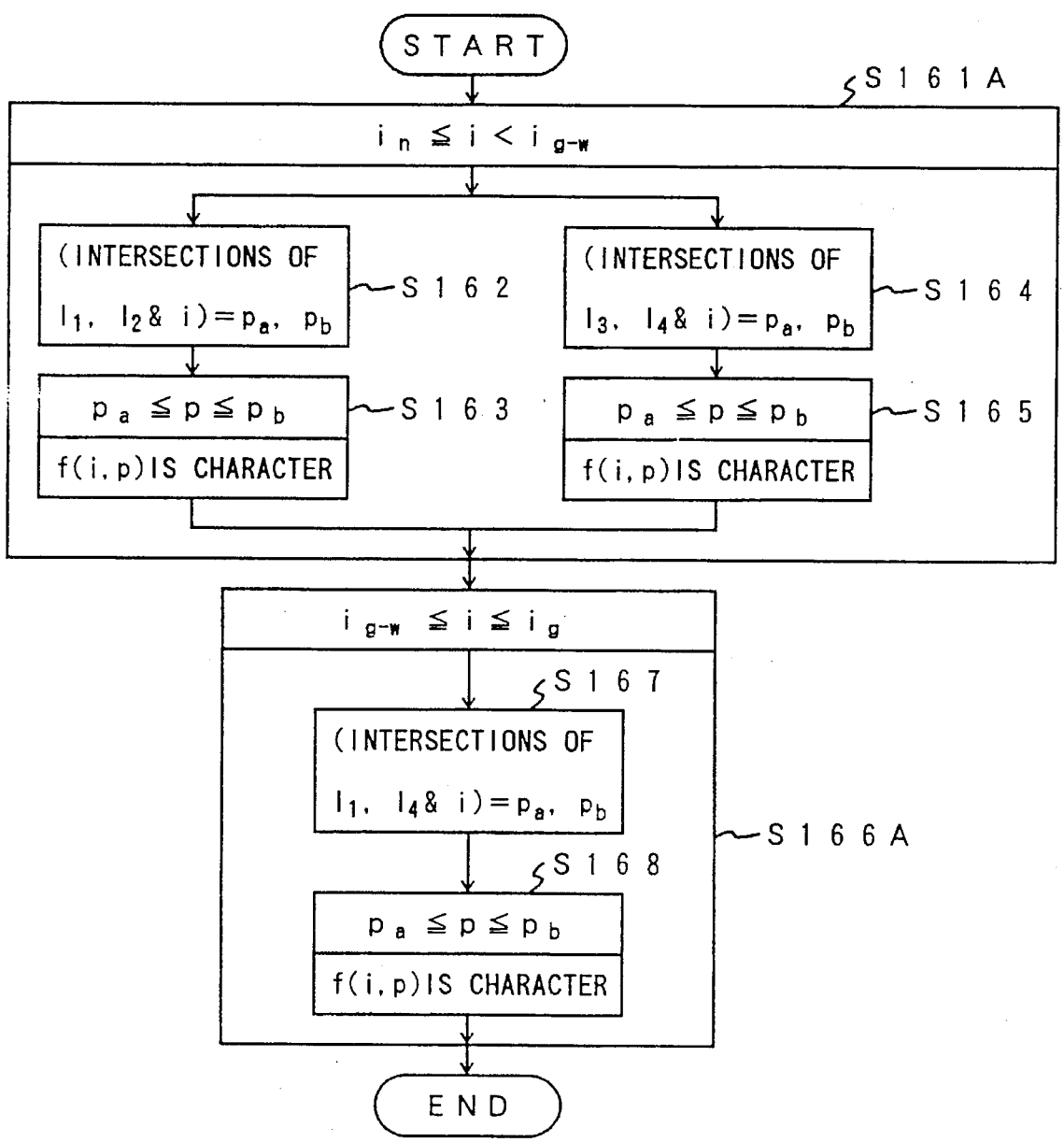
FIG. 34 is a flow chart for explaining a process of a cross-point frame exterior interpolator 32d.

FIG. 34 shows a flow chart for the case where the process of the cross-point frame exterior interpolator 32d is carried out by software, in order to describe an embodiment of the process of the cross-point frame exterior interpolator 32d in more detail. In FIG. 34, those steps which are the same as those corresponding steps in FIG. 33 are designated by the same reference numerals, and a description thereof will be omitted.

The process shown in FIG. 34 is basically the same as that shown in FIG. 33 except that in FIG. 34, a step S151A sets i to $i_n \leq i \leq i_{g-w}$, and a step S166A sets i to $i_{g-w} \leq i \leq i_g$.

Figure 35:
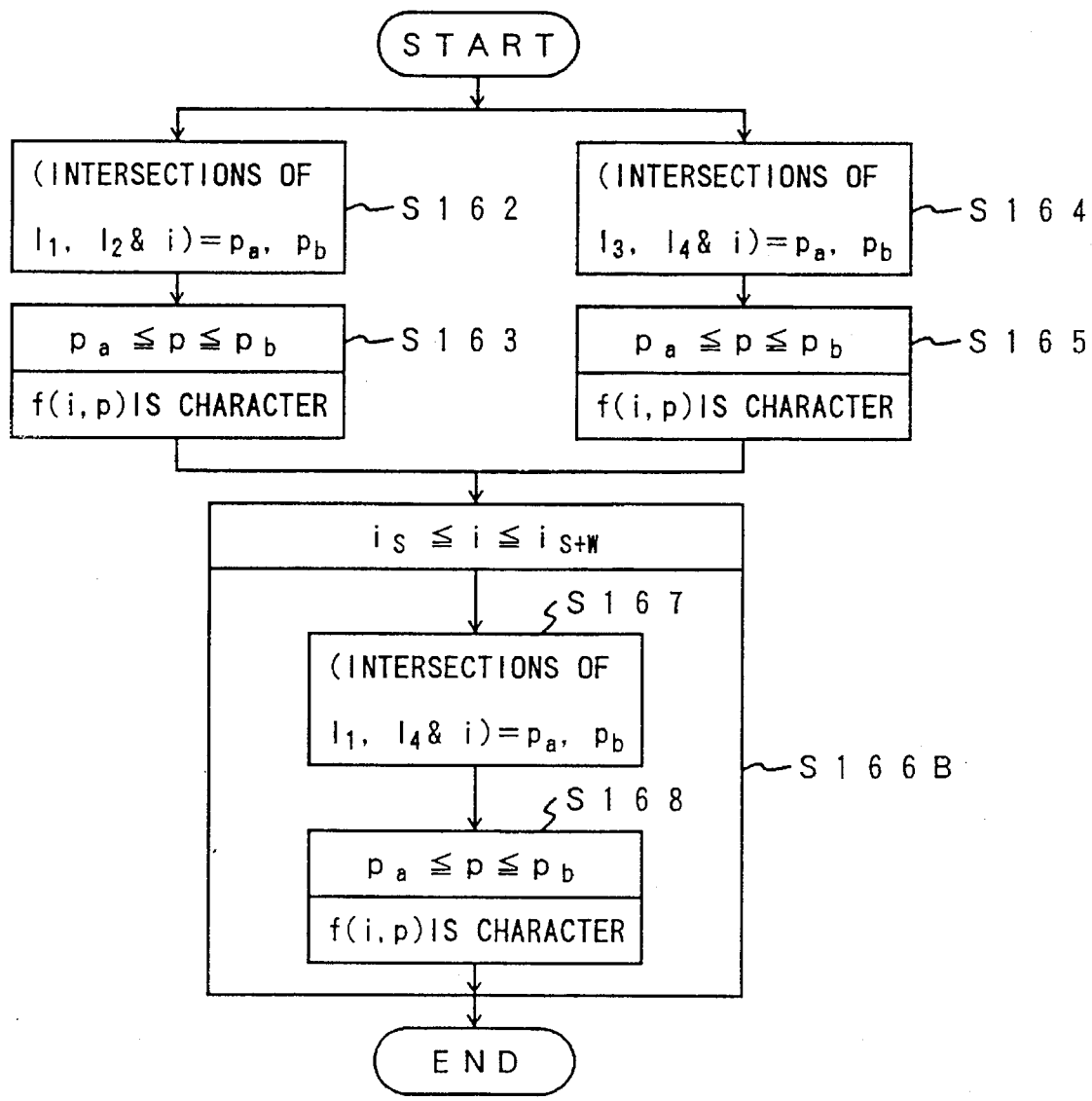
FIG. 35 is a flow chart for explaining a process of a straight line interpolator 32e.

FIG. 35 shows a flow chart for the case where the process of the straight line interpolator 32e is carried out by software, in order to describe an embodiment of the process of the straight line interpolator 32e in more detail. In FIG. 35, those steps which are the same as those corresponding steps in FIG. 33 are designated by the same reference numerals, and a description thereof will be omitted.

The process shown in FIG. 35 is basically the same as that shown in FIG. 33 except that in FIG. 35, no step S161 is provided and a step S166B sets i to $i_s \leq i \leq i_{s+w}$.

Figure 36:
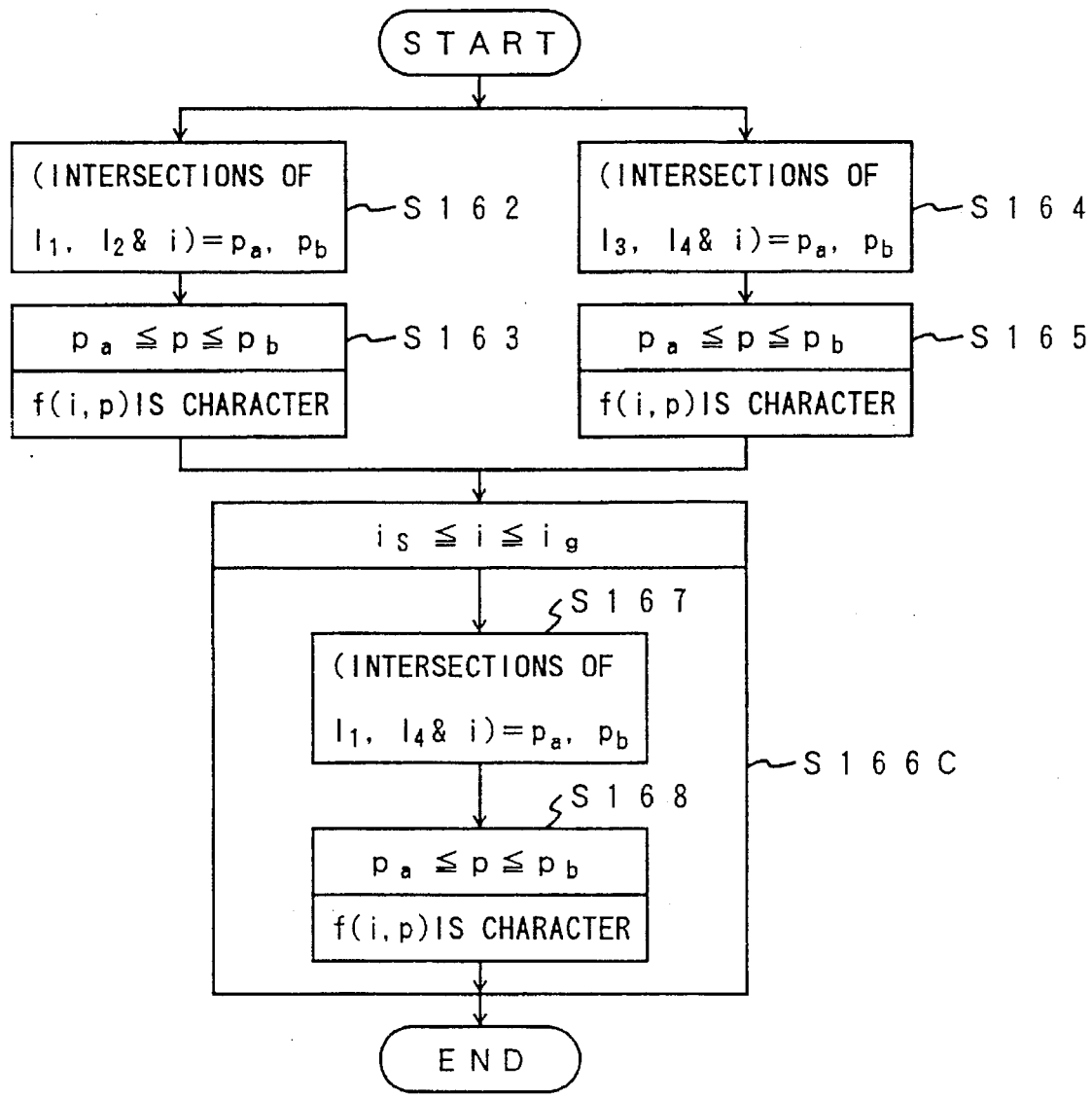
FIG. 36 is a flow chart for explaining a process with respect to an intersection where no association is possible.

With respect to the intersection which cannot be associated, a software processing such as that shown in FIG. 36 may be carried out. In FIG. 35, those steps which are the same as those corresponding steps in FIG. 33 are designated by the same reference numerals, and a description thereof will be omitted.

The process shown in FIG. 36 is basically the same as that shown in FIG. 33 except that in FIG. 36, no step S161 is provided and a step S166C sets i to $i_s \leq i \leq i_g$.

Figure 37:
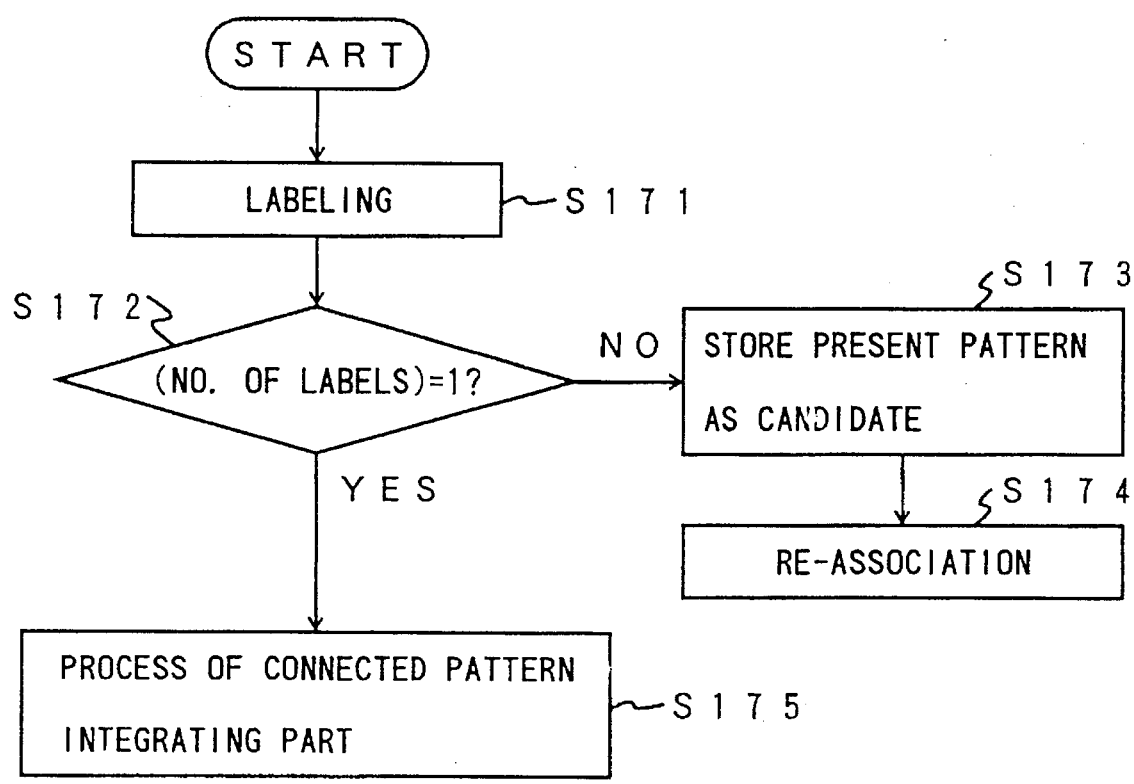

FIG. 37 shows a flow chart for the case where the process of the labeling part 33a of the connection confirming part 33 is carried out by software, in order to describe an embodiment of the process of the labeling part 33a in more detail.

In FIG. 37, a step S171 carries out the labeling, and a step S172 decides whether or not the number of labels is 1. If the decision result in the step S172 is NO, a step S173 stores the present pattern as a candidate, and the process advances to a step S174 which carries out the re-association process of the re-associating part 41e. On the other hand, if the decision result in the step S172 is YES, the process advances to a step S175 which carries out the integrating process of the connected pattern integrating part 34.

(9) Integration of the connected Pattern:

The connected pattern integrating part 34 integrates the contact character pattern which is interpolated in the frame interior character interpolator 32 and the character pattern or a portion thereof added with the attribute in the connected pattern attribute adder 23.

In the case where the frame is a 1 character frame, integration of the interpolated pattern and the character pattern added with the attribute or even a portion thereof if this portion belongs to the same character frame. Hence, the provisional integration is made in the connected pattern provisional integrating part 34a, and the size of the pattern which is obtained by the integration of the two is confirmed in the size confirming part 34b. The two are integrated in the connected pattern integrating part 34c if the confirmed size is appropriate, and no integration is made if the confirmed size is not appropriate.

In other words, based on the position of the extracted 1 character frame, the partial patterns are integrated as elements forming 1 character if a portion of the partial patterns exist within 1 character frame. The size of the pattern obtained by this integration is obtained, and the size ratio between this size and the size of 1 character frame is calculated. A judgement is then made to determine whether or not the calculated size ratio falls within a predetermined range of the threshold value. The pattern is employed as it is if the calculated size ratio falls within the predetermined range of the threshold value. On the other hand, no integration is made and the character is extracted for each of the original partial patterns if the calculated size ratio falls outside the predetermined range of the threshold value.

According to this embodiment, it is possible to accurately extract the character which conventionally could not be accurately extracted, because the character extraction is made in the above described manner.

Figure 38:
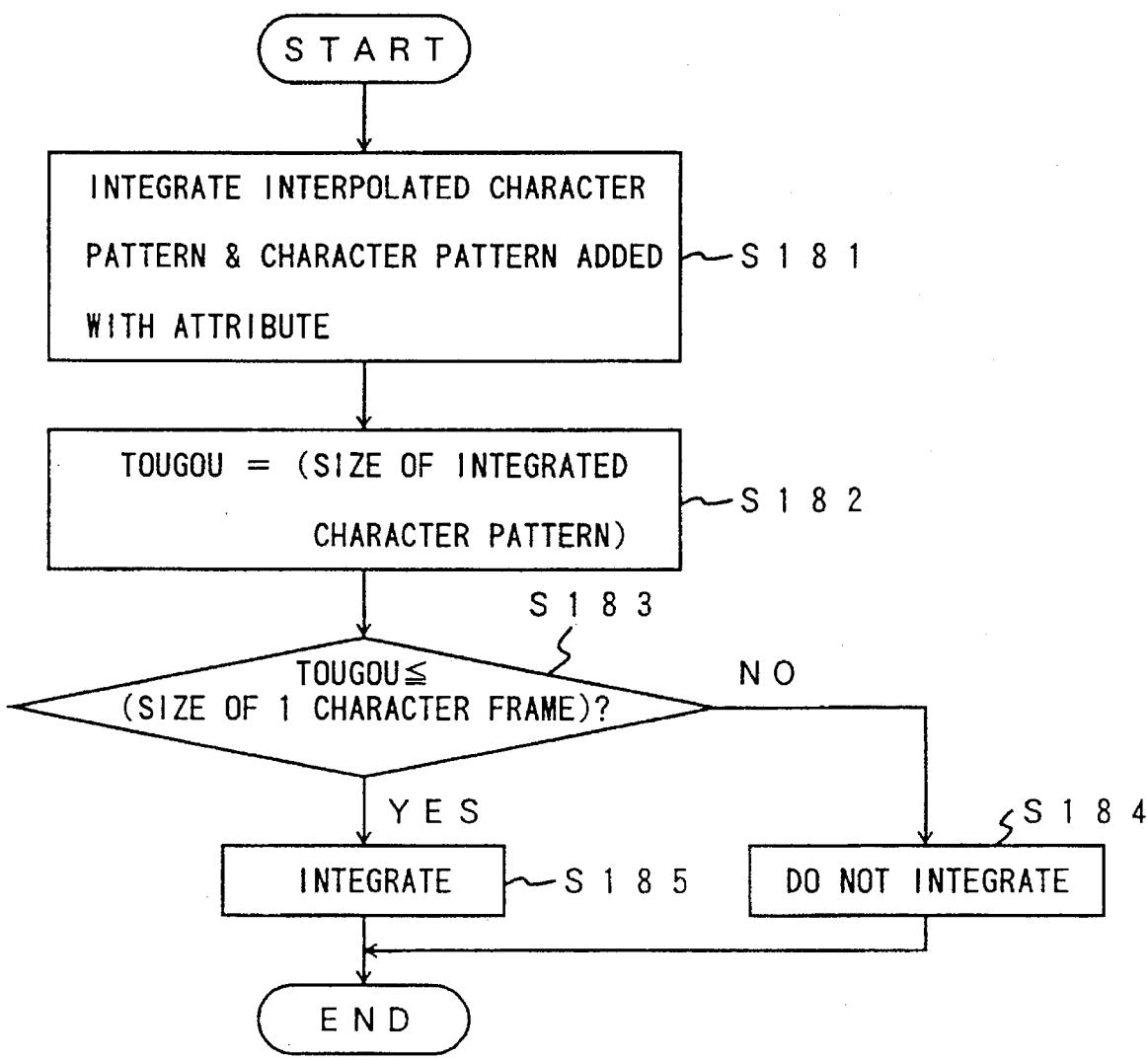
FIG. 38 is a flow chart for explaining a process of a connected pattern integrating part 34.

FIG. 38 shows a flow chart for the case where the process of the connected pattern integrating part 34 is carried out by software, in order to describe an embodiment of the process of the connected pattern integrating part 34 in more detail.

In FIG. 38, a step S181 integrates the interpolated character pattern and the character pattern added with the attribute, an a step S182 sets TOUGOU which indicates the size of the integrated character pattern. A step S183 decides whether or not TOUGOU is less than the size of 1 character frame. If the decision result in the step S183 is NO, a step S184 does not carry out the integration, and the process ends. On the other hand, if the decision result in the step S183 is YES, a step S185 carries out the integration, and the process ends thereafter.

FIG. 39, FIGS. 40A, 40B and 40C, and FIGS. 41A and 41B show examples of the character patterns extracted by this embodiment.

Figure 1:
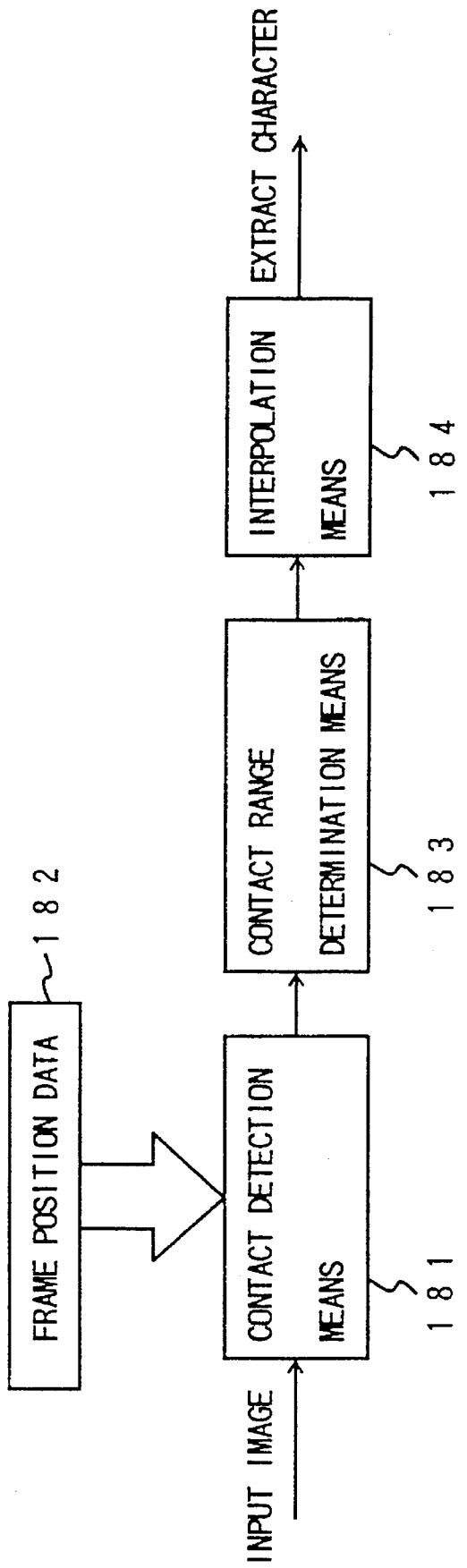
FIG. 1 is a system block diagram showing an example of a conventional character extraction system.
Figure 2:
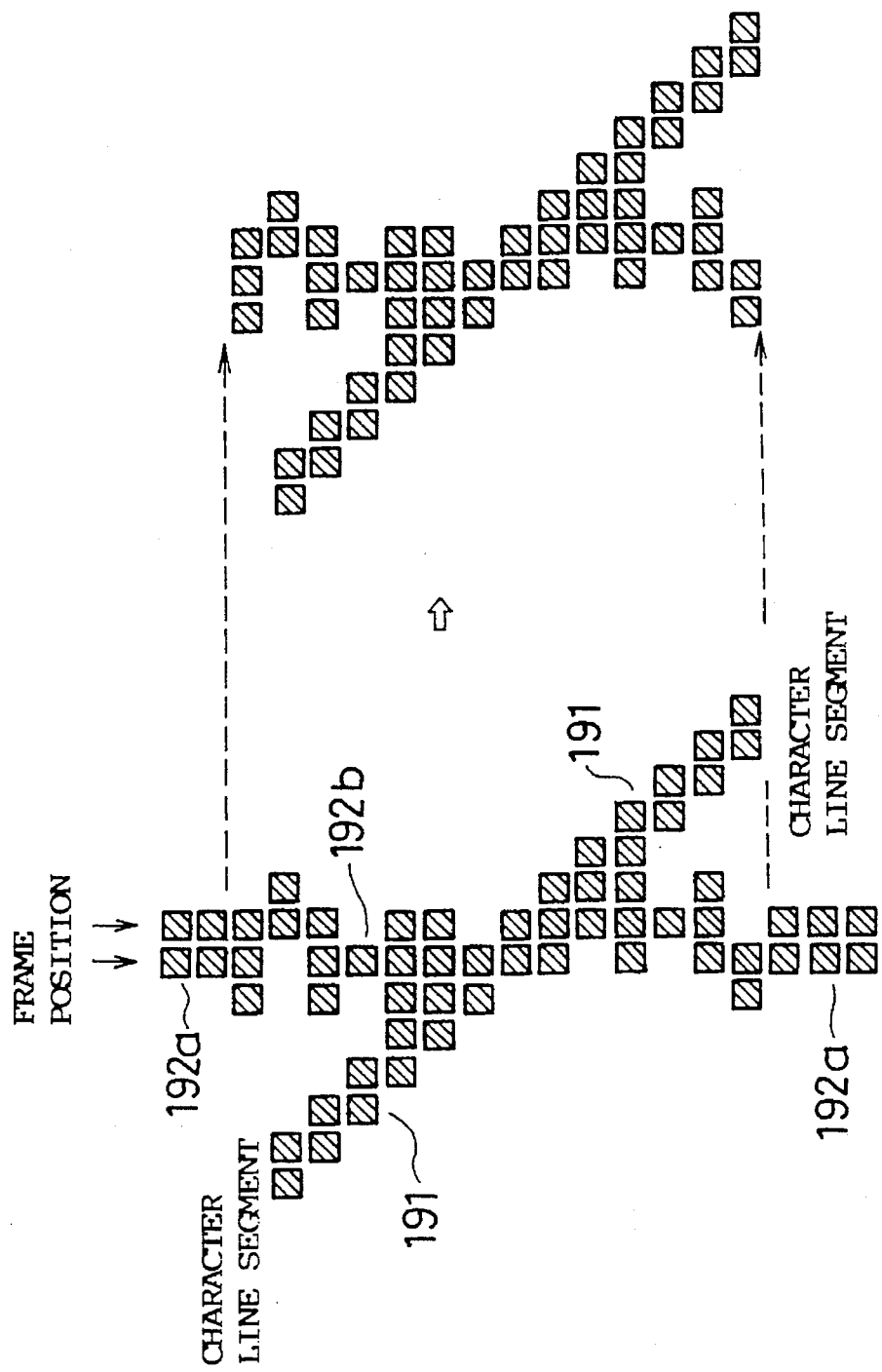
FIG. 2 is a diagram showing an example of a character pattern which is extracted by the conventional character extraction system.
Figure 39:
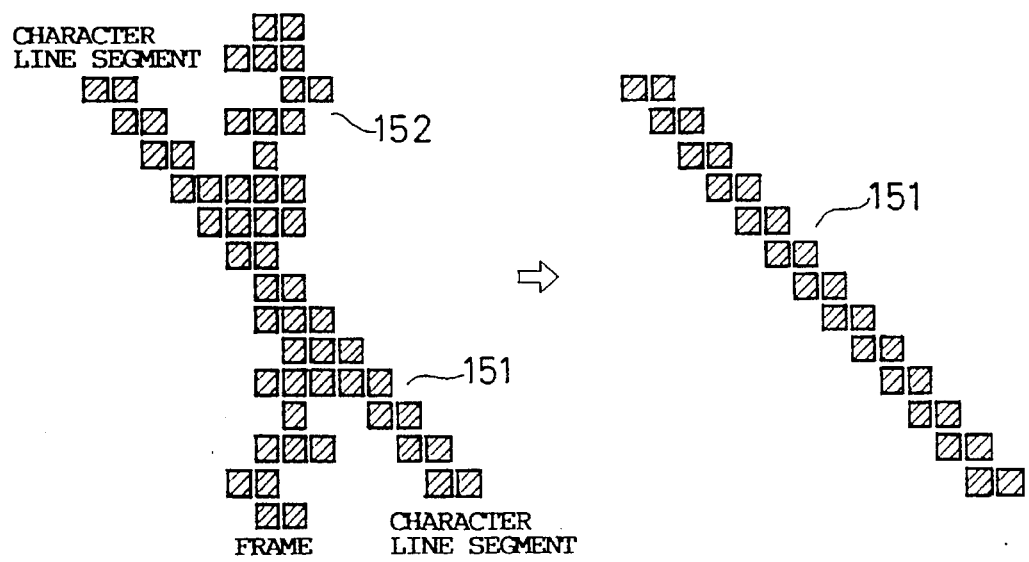
FIG. 39 is a diagram for explaining an example of character line segment extracted by the second embodiment.

FIG. 39 shows the character pattern which is obtained when the character line segment shown in FIG. 2 is extracted by this embodiment. According to this embodiment, it is possible to accurately extract the character line segment 151 which touches the frame 152 by eliminating the frame 152.

Figure 3A:
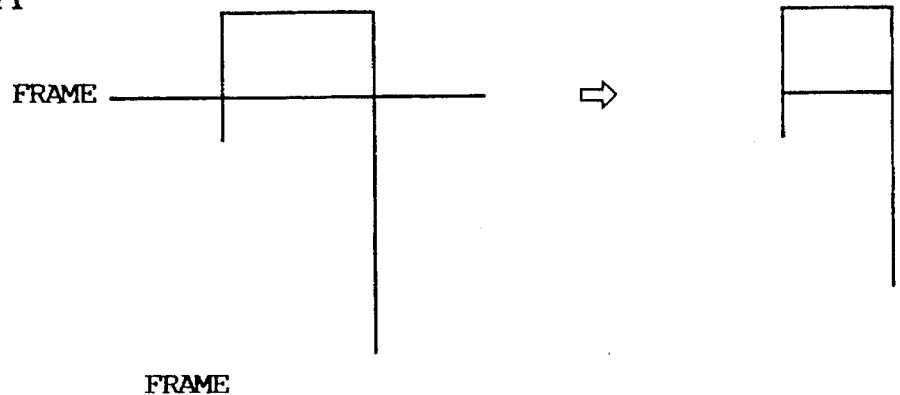
FIGS. 3A, 3B and 3C respectively are diagrams showing examples of the character which is extracted by the conventional character extraction system.
Figure 3B:
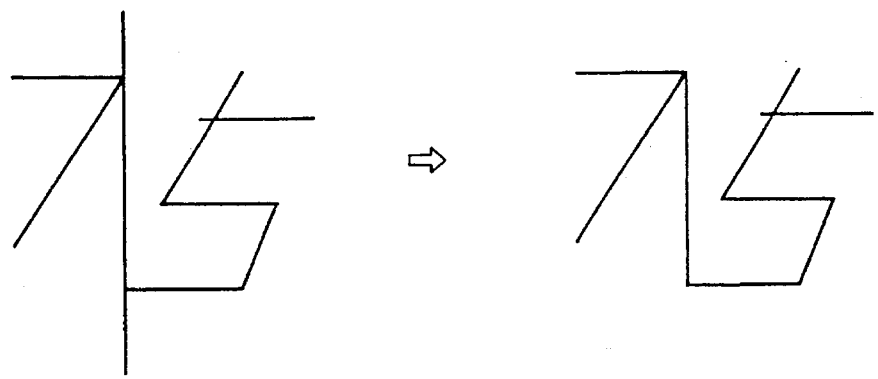
Figure 3C:
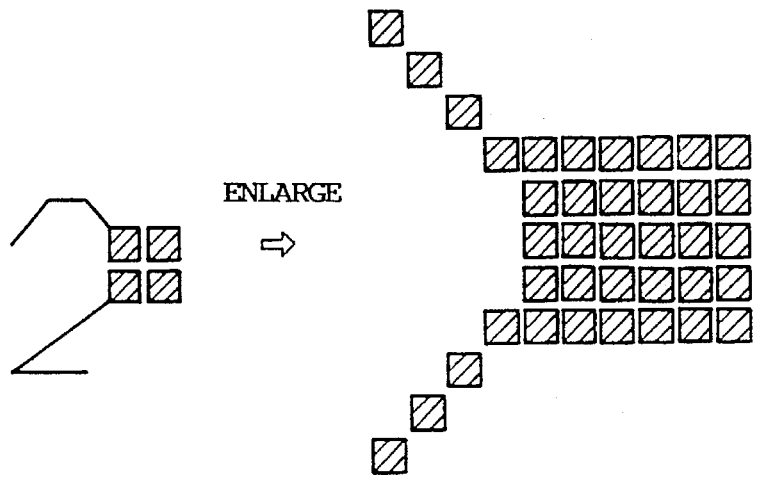

FIGS. 40A, 40B and 40C respectively show the character patterns which are obtained when the characters shown in FIGS. 3A, 3B and 3C are extracted by this embodiment. According to this embodiment, it is possible to extract only the character by accurately eliminating the frame which touches the character, the stain or spot on the character and the like.

Figures 41A, 41B:
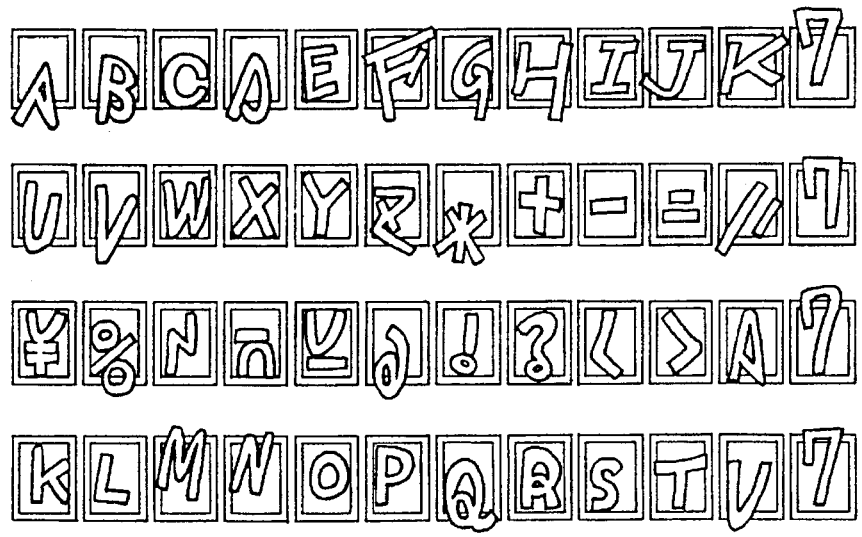
FIG. 41A and 41B respectively are diagrams for explaining character patterns which are extracted from hand-written characters by the second embodiment.

FIG. 41B shows the character patterns which are obtained when hand-written characters in a binary image shown in FIG. 41A are extracted by this embodiment. According to this embodiment, it is possible to accurately restore the character even when the character touches the frame and the character projects outside the frame as shown in FIG. 41A.

As described above, this embodiment extracts the character, graphic or symbol by extracting and separating a straight line portion such as the rule and frame from the character, graphic or symbol which touches the rule or frame. In addition, the dropped out (or chipped) portion of the character, graphic or symbol is interpolated by separating the straight line portion such as the rule and frame from the character, graphic or symbol. As a result, the following features 1) through 16) are obtainable according to this embodiment.

1) It is possible to positively eliminate the straight line such as the frame and rule from the image which is formed by the straight line portion such as the frame and rule and the character, graphic or symbol, and to accurately interpolate the eliminated portion of the character, graphic or symbol. For this reason, it is possible to extract the character, graphic or symbol having a high quality, and the recognition Pate of the character, graphic and symbol can be improved considerably when applied to the character recognition apparatus. In addition, it is possible to remove the strict condition that the character, graphic, symbol or the like must be written within the frame without touching the frame in order for the character recognition apparatus to accurately make the recognition.

2) The pattern for which the connection cannot be confirmed is fed back to the intersection associating means so that the association of the intersections and the interpolation of the region of the character, graphic or symbol are carried out again. For this reason, it is possible to restore the character, graphic or symbol with a high quality. In addition, the candidates of the restored pattern can be increased adaptively until the connection is confirmed, thereby making is possible to positively extract the correct pattern.

3) The processing speed can be increased by taking measures such as obtaining the connection component with respect to only the candidates of the pattern in which the character, graphic or symbol touches the straight line portion such as the frame and rule, and limiting the intersections which are associated out of the pattern for which the connection cannot be confirmed to the case where the straight line connecting the intersections are located on the straight line portion such as the frame and rule.

4) By associating the intersections having the one-to-one association based on information related to the distance or the like, it is possible to avoid erroneous association of the intersections and avoid restoration of an inappropriate pattern.

5) By associating the intersections having the one-to-one association by taking into consideration the distance between the middle points between the intersections and the continuity or the like of the portion forming the character, graphic or symbol, it is possible to positively associate the intersections having the one-to-many association. Hence, it is possible to extract patterns having a high quality without introducing a dropout (or chip) in the restored pattern due to lacking association of the intersections.

6) The ratio of the pattern which is approximated by the rectangle and the size of the character, graphic or symbol or the frame size is calculated. If this ratio exceeds a predetermined threshold value, the association of the intersections is cancelled, so that it is possible to extract the character having a high quality without extracting an inappropriate pattern.

7) The slope of the contour line of 1 line segment at the intersection of the line segment which forms the character, graphic or symbol is obtained, and a cross-point of 2 straight lines having the slope of the contour line is obtained. Hence, the region of the character, graphic or symbol can be extracted accurately depending on the position of the cross-point, thereby making it possible to extract the pattern having a high quality.

8) When interpolating the line segment which is cut or broken, the interpolation is made using the straight line along the rule, and the region within the straight line portions such as the frame and rule is interpolated by the straight line corresponding to the line width of the character, graphic or symbol. Hence, even when the stroke of the character, graphic or symbol is missing (dropped out or chipped) at the straight line portion such as the frame and rule, it is possible to extract the character, graphic or symbol having a high quality. In addition, it is possible to extract the pattern having a high quality because it is possible to prevent local widening of the line width.

9) The partial patterns are integrated if a portion of the partial patterns are located inside the frame. In addition, the size of the integrated pattern is obtained, and a decision is made to determine whether or not the integrated pattern should be employed based on a ratio of the pattern size and the frame size. Hence, an inappropriate pattern will not be extracted.

10) With respect to the line segment forming the character, graphic or symbol having the intersections which have the one-to-one association, the distance between candidates of the intersections is calculated at each of the 2 contours on the inner side and the outer side forming the straight line portion such as the frame and rule, and the average value of the calculated distances is then obtained. The average line width of the line segment forming the character, graphic or symbol is calculated based on this average value of the calculated distances. Hence, it is possible to accurately obtain the width of the line segment forming the character, graphic or symbol.

11) The connection component is obtained with respect to the pattern which is separated of the straight line portion such as the frame and rule. The noise remaining as a portion of the straight line portion such as the frame and rule is eliminated based on the area of each connection component. As a result, it is possible to associate the line segment forming the character, graphic or symbol and the portion of the frame, and to avoid an inappropriate pattern from being restored.

12) The projections of each partial pattern are obtained by taking into consideration the slope, unevenness and the unknown size, and the candidates of the straight line forming the frame are extracted based on the ratios of the projection values and the horizontal and vertical lengths of the rectangle approximating the partial pattern. Hence, it is possible to accurately extract at a high speed the frame which has the wide line width and appear frequently. In addition, it is possible to separate only the frame from the character, graphic or symbol touching the frame, without eliminating a portion of such character, graphic or symbol. As a result, it is possible to restore the character, graphic or symbol with a high quality.

13) The search is made from a predetermined starting point along the right and left or the top and bottom of the partial pattern, and a ratio is obtained between the length of the straight line obtained by the search and the length of each side of the approximating rectangle. The frame is extracted based on the ratio, and the line width of each side of the frame is calculated. For this reason, it is possible to accurately extract the frame having the narrow line width.

14) The extracted frame is scanned for the entire image a matching is carried out with respect to the partial pattern, so as to newly extract a frame. In addition, the partial pattern is approximated by the rectangle, and a size ratio of the of the approximating rectangle and the extracted frame is calculated, so as to focus the attention on only the partial pattern having a size ratio which is within a predetermined threshold value, and to newly extract the frame by carrying out the matching with respect to the frame which has been extracted. For this reason, it is possible to extract the frame which is otherwise difficult to extract.

15) The frame is extracted from the partial pattern, and the partial pattern existing to the right or left, or above or below the extracted frame by an amount corresponding to the extracted frame is extracted. In a case where all of the extracted partial patterns are patterns made up solely of the character, graphic or symbol, a judgement is made over again to judge the extracted frame as being a pattern made up solely of the character, graphic or symbol. As a result, even if the character is a Japanese Kanji character "kuni" which has the rectangular frame-shaped portion as described above, such a rectangular frame-shaped portion of the character will not be erroneously extracted as the frame. Therefore, the frame can be extracted stably.

16) When extracting the straight line portion such as the frame and rule which is inclined or includes noise, the n-line run length technique described above is used for the extraction of the straight line portion. For this reason, it is possible to positively extract the straight line even if the straight line includes unevenness.

Figure 42:
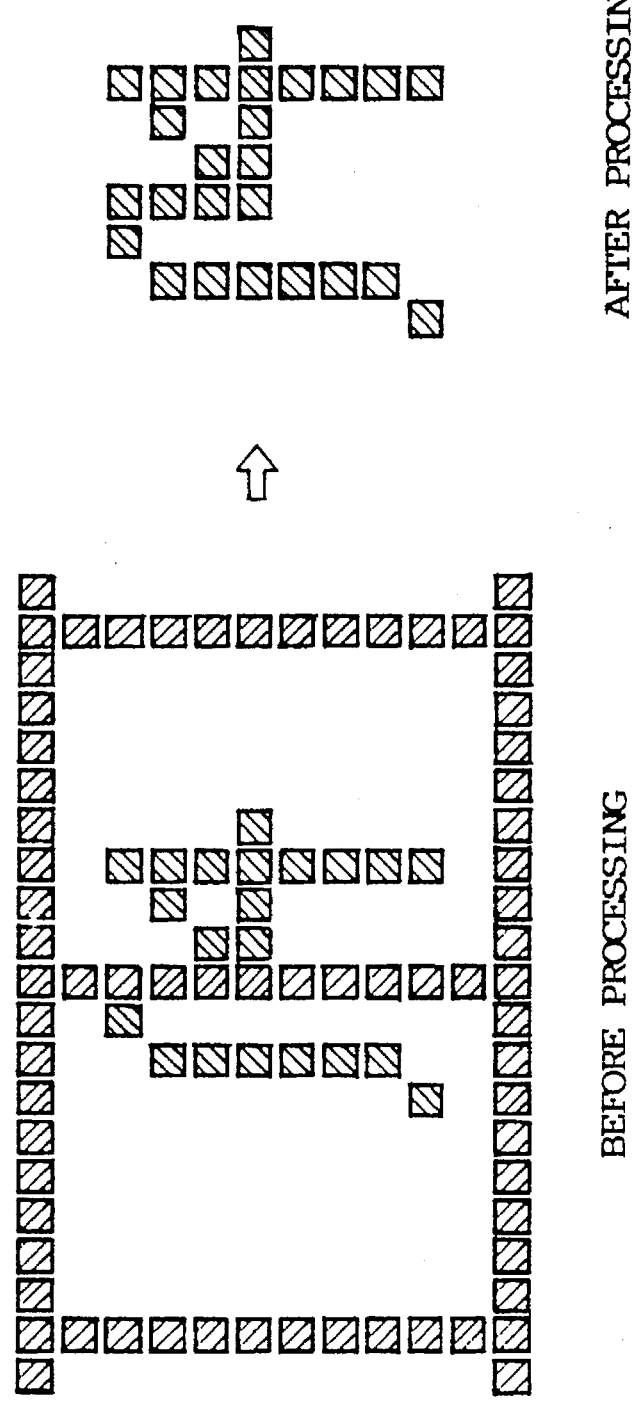
FIG. 42 is a diagram for explaining an erroneous one-to-one ordering association.

When associating the intersections which are calculated by the character/frame intersection calculator 25 shown in FIG. 5 in the intersection associating part 31 shown in FIG. 6, the narrow character line segments cannot be eliminated by the character size information and the adjacent characters touching the frame may be associated when the intersections have the one-to-one association and the ordering association is made. For example, if the characters "1" and "4" touch the frame from both sides as shown on the left portion of FIG. 42, the intersections of the frame have the one-to-one association, and the ordering association is made even if the intersections are distant from each other. For this reason, the processed characters become as shown on the right portion of FIG. 42, and such characters cannot be decoded.

Figures 43A, 43B, 43C, 43D:
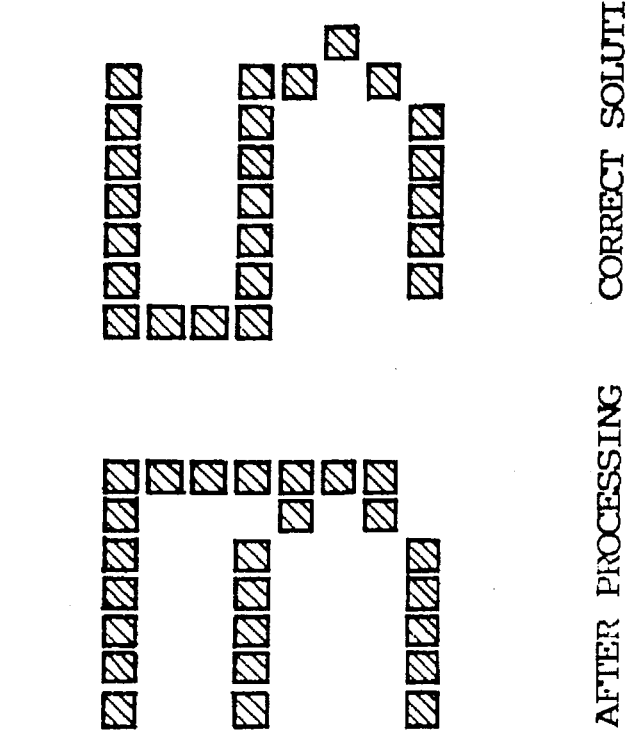
FIGS. 43A, 43B, 43C and 43D respectively are diagrams for explaining an erroneous association by confirmation of the connection.

In addition, until the connection is confirmed by the connection confirming part 33 shown in FIG. 6, the association of the intersections in the intersection associating part 31 is repeated. However, the result which is obtained becomes different depending on the order in which the portions of the frame are searched, and the correct solution may not be included in the candidates. For example, when the connection of the left frame portion is first obtained with respect to the image shown in FIG. 43A in which the character "5" touches the frame, the processed character becomes as shown in FIG. 43B. On the other hand, when the connection of the right frame portion is first obtained with respect to the image shown in FIG. 43A, the processed character becomes as shown in FIG. 43C. However, the correct solution should be the character shown in FIG. 43D.

Figure 44:
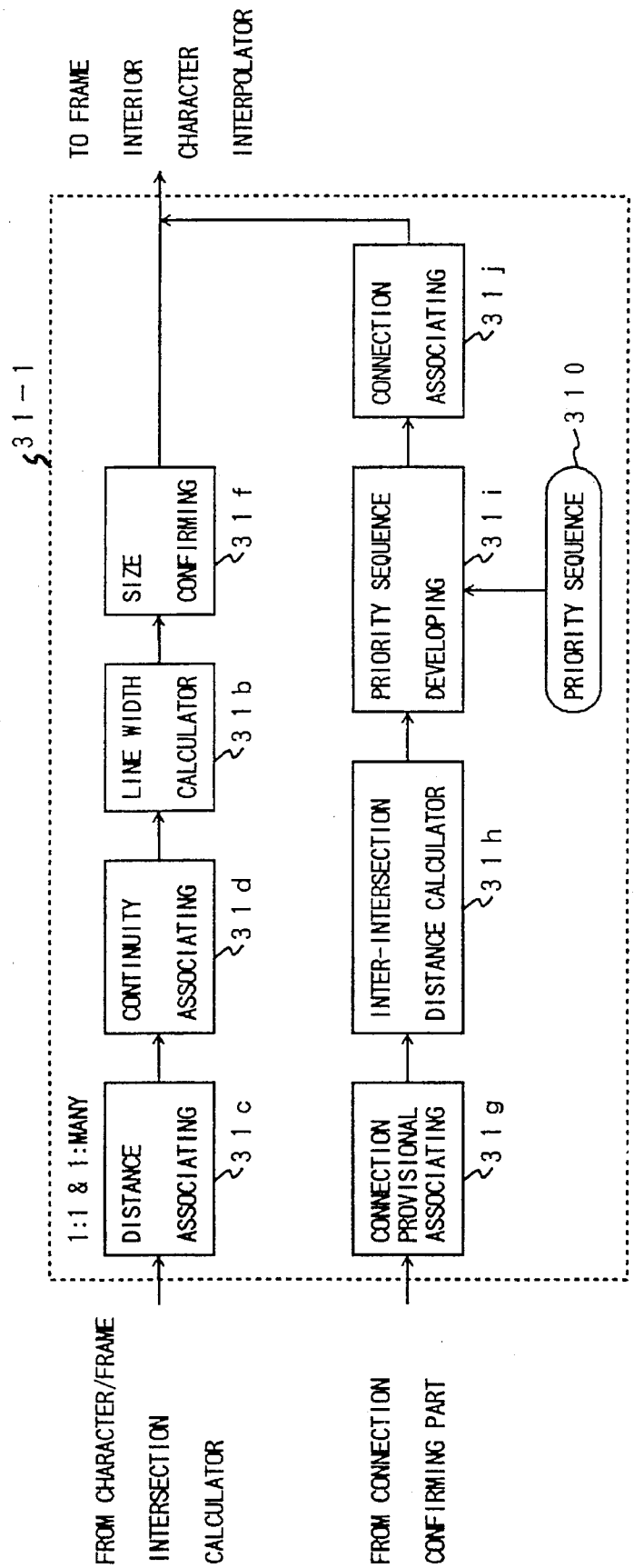
FIG. 44 is a system block diagram showing a third embodiment of the image extraction system according to the present invention.

Accordingly, a description will next be given of a third embodiment of the image extraction system according to the present invention which can eliminate the problems described above in conjunction with FIG. 42 and FIGS. 43A through 43D. FIG. 44 shows an intersection associating part 31-1 which is an important part of the third embodiment. Other parts of this third embodiment are the same as those of the second embodiment, and an illustration and description of the other parts will be omitted. In this third embodiment, the intersections are associated depending on the distance between the character line segments and the continuity of the slope of the character line segment. In addition, references on which the judgement related to the distance and continuity are based are adaptively changed depending on the line width of the frame, rule or the like.

In this embodiment, the intersection associating part 31-1 includes a distance associating part 31c, a continuity associating part 31d, a line width calculator 31d, a size confirming part 31f, a connection provisional associating part 31g, an inter-intersection distance calculator 31b a priority sequence developing part 31i and a connection associating part 31j. The distance associating part 31c receives the output of the character/frame intersection calculator 25. On the other hand, the connection provisional associating part 31g receives the output of the continuity confirming part 33. In addition, the outputs of the size confirming part 31f and the connection associating part 31j are supplied to the frame interior character interpolator 32.

This embodiment extracts the characters from a form sheet which is printed with black frames. In other words, the hand-written characters which touch or project outside the character frames are extracted one character at a time, where the size of the character frame and the positions of the character frames are unknown. For the sake of convenience, it is assumed that the input pattern to be processed is a binary image which is already subjected to preparations such as correcting extreme inclination or rotation (that is, skew), noise elimination and filling of gaps introduced by grazing or the like.

Unlike the intersection associating part 31, the intersection associating part 31-1 does not associate the intersections depending on the associating number of intersections, that is, does not make the one-to-one or one-to-many association. Instead, the intersection associating part 31-1 associates the intersections based on the distance and continuity. The first and third conditions which will be described hereunder are used when associating the intersections based on the distance. The second condition which will be described hereunder is used when associating the intersections based on the continuity. As the condition changes from the first condition to the third condition, the distance between the character line segments which are associated becomes farther, however, the intersections are associated if one of the conditions is satisfied.

The distance associating part 31c determines whether or not the intersection satisfies the first condition described above in conjunction with FIG. 22A. If a plurality of intersections satisfying the first condition exist, all of these intersections are associated.

With respect to the intersection which does not satisfy the first condition, the continuity associating part 31d determines whether or not the second condition described above in conjunction with FIG. 22B is satisfied. The intersection is associated if the second condition is satisfied.

In addition, with respect to the intersection which cannot be associated based on the first and second conditions, the distance associating part 31c determines whether or not the third condition described above in conjunction with FIG. 22C is satisfied. The intersection is associated if the third condition is satisfied.

The line width calculator 31b calculates the distance between 2 intersections existing in 1 character line segment at both the outer contour and the inner contour, and calculates the line width of the character line segment by obtaining an average of the two distances calculated at the outer and inner contours.

The size confirming part 31f obtains the size of the pattern which is obtained by the association, with respect to the pattern which satisfies the associating condition. The obtained size of the pattern is compared with the character size which is known in advance, or with the frame size which is calculated by the straight line/frame extracting part 22. The association of the intersections is not made if a ratio of the sizes obtained as a result of the comparison is too large. As shown in FIG. 19, a middle point between 2 intersections existing in 1 character line segment is obtained, and differences $d_k$ and $d_{k+1}$ in the coordinate values in the X-axis direction of the middle point of the outer contour and the middle point of the inner contour are obtained or the differences in the coordinate values in the Y-axis direction are obtained. The intersections are associated if the differences in the coordinate values are less than or equal to the value which is obtained by multiplying the weighting coefficient $\alpha$ to the line width W of the frame which is obtained from the difference between the outer contour and the inner contour.

Figure 45:
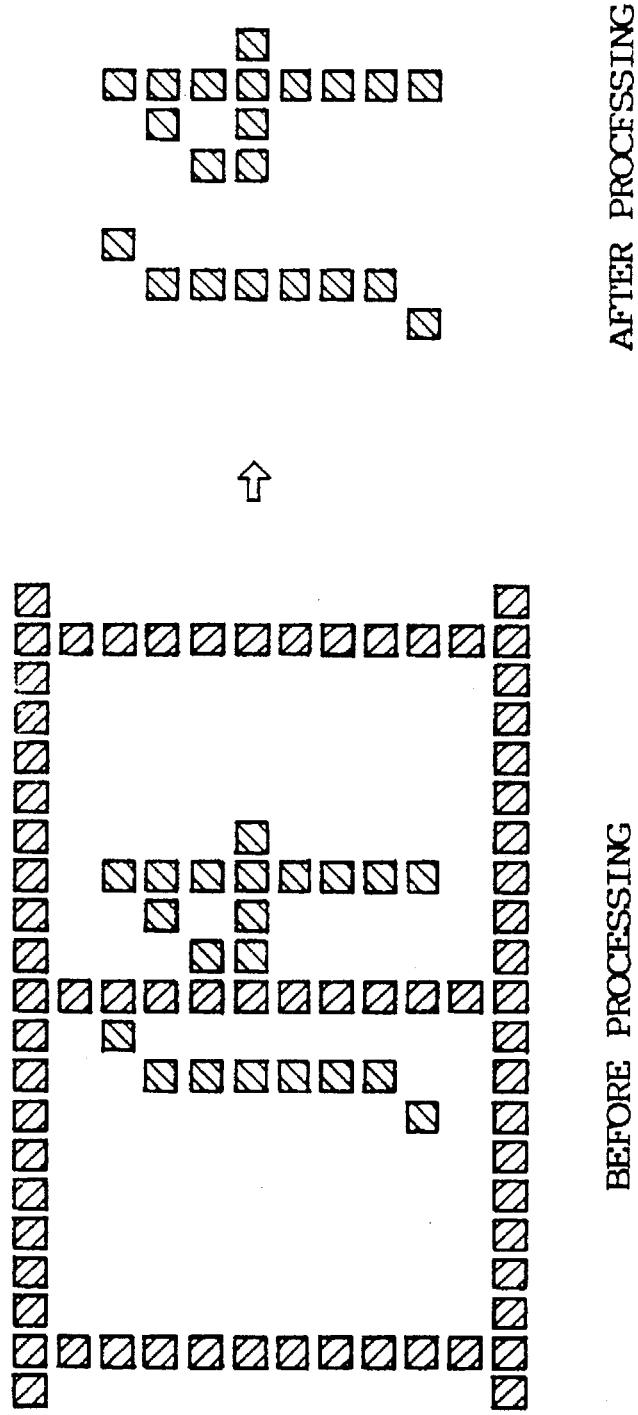
FIG. 45 is a diagram for explaining the association of intersections in the third embodiment.

Accordingly, even if the image before the preparation is as shown on the left portion of FIG. 45, it is possible to obtain the character pattern shown on the right portion of FIG. 45 after the processing. Hence, the problems described above with reference to FIG. 42 are eliminated.

On the other hand, the connection provisional associating part 31g uses the intersections calculated in the intersection calculator 25 with respect to the character pattern or a portion thereof for which the connection cannot be confirmed, and associates the intersections so that the connection is maintained from the outside or depending on the priority sequence shown in FIG. 46.

The inter-intersection distance calculator 31h calculates the distance between each 2 corresponding intersections. For example, when the line segments shown in FIG. 47B are extracted from the image shown in FIG. 47A, one of the labels "A", "B" and "C" is added to each line segment in the connected pattern extracting part 21. In the case shown in FIG. 47B, the distance between the intersections is calculated at the right and left frame portions at 2 locations each between the labels "A" and "B" and between the labels "B" and "C". In this particular case, the distance between the labels "A" and "B" is "3" pixels at the left frame portion, and the distance between the labels "B" and "C" is "4" pixels at the left frame portion. Similarly, the distance between the labels "A" and "B" is "4" pixels at the right frame portion, and the distance between the labels "B" and "C" is "2" pixels at the right frame portion.

The priority sequence developing part 31i determines the association of the intersections based on a priority sequence table 310 shown in FIG. 46. In this case, as indicated by a mark "O" in the table 310, the priority sequence developing part 31i associates those intersections having the smaller distance. The associating conditions indicated by a mark "X" do not contribute to the priority sequence. The setting of the associating conditions in the table 310 are of course not limited to those shown in FIG. 46.

Figure 47C:
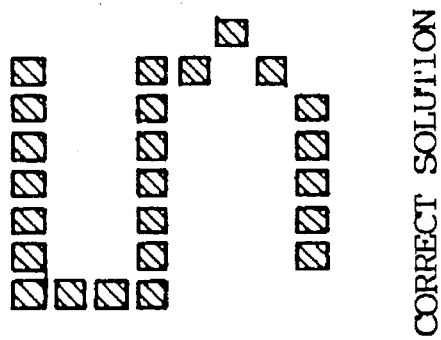
FIGS. 47A, 47B and 47C respectively are diagrams for explaining the association of intersections for maintaining continuity by the priority sequence.
Figure 47B:
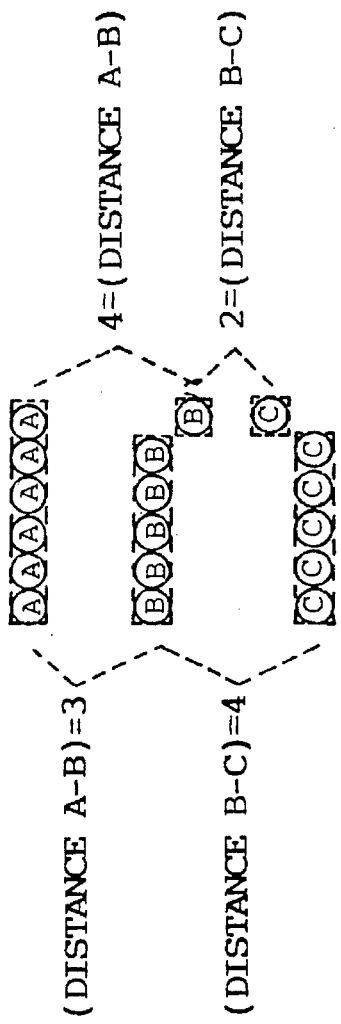
Figure 47A:
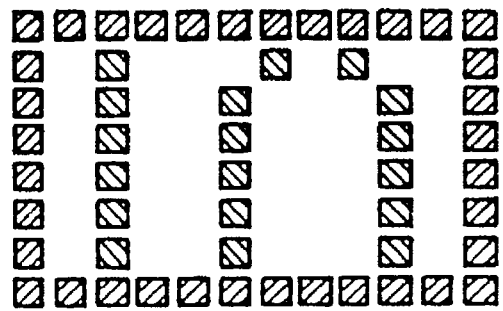

The connection associating part 31j associates the intersections which are associated in the priority sequence developing part 31i as shown in FIG. 47C.

Thereafter, similarly to the case where the connection is confirmed, the interpolated contact character pattern or a portion thereof and the character pattern or a portion thereof added with the attribute are integrated.

Figure 50A:
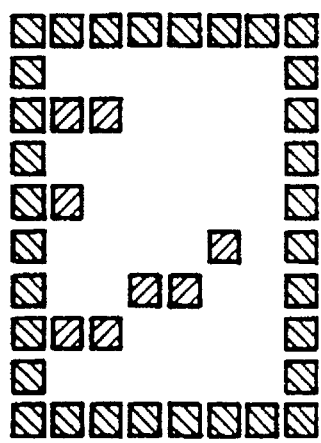
FIGS. 50A and 50B respectively are diagrams for explaining the character extraction when the kind of character is a Japanese Katakana character.
Figure 50B:
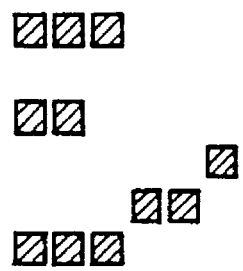
Figure 51A:
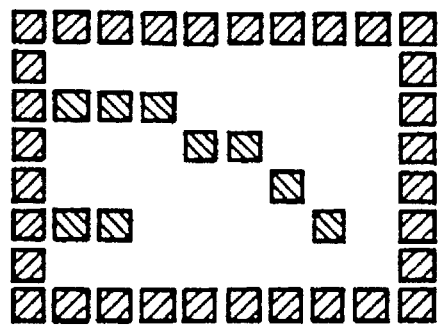
FIGS. 51A, 51B and 51C respectively are diagrams for explaining the character extraction when the kind of character is a numeral, Japanese Katakana character or Japanese Hiragana character.
Figure 51B:
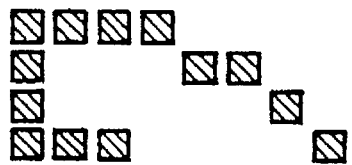
Figure 51C:
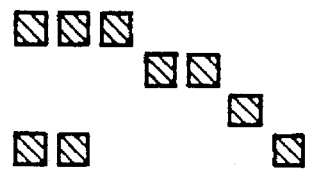

As shown in FIG. 48, the priority sequence table 310 may give the priority sequence for each kind or type of character. In this case, if the kind of character is "alphabet", the character "E" shown in FIG. 49B is finally extracted from the image shown in FIG. 49A. In addition, if the kind of character is "Japanese Katakana character", the Japanese Katakana character pronounced "shi" and having the pattern shown in FIG. 50B is finally extracted from the image shown in FIG. 50A. Further, if the kind of character is "numeral", the numeral "7" shown in FIG. 51B is finally extracted from the image shown in FIG. 51A. But if the kind of character is "Japanese Hiragana character", the Japanese Hiragana character pronounced "ri" and having the pattern shown in FIG. 51C is finally extracted from the image shown in FIG. 51A. Moreover, if the kind of character is "Japanese Katakana character", the Japanese Katakana character pronounced "ku" and having the pattern shown in FIG. 51B is finally extracted from the image shown in FIG. 51A.

Figure 52:
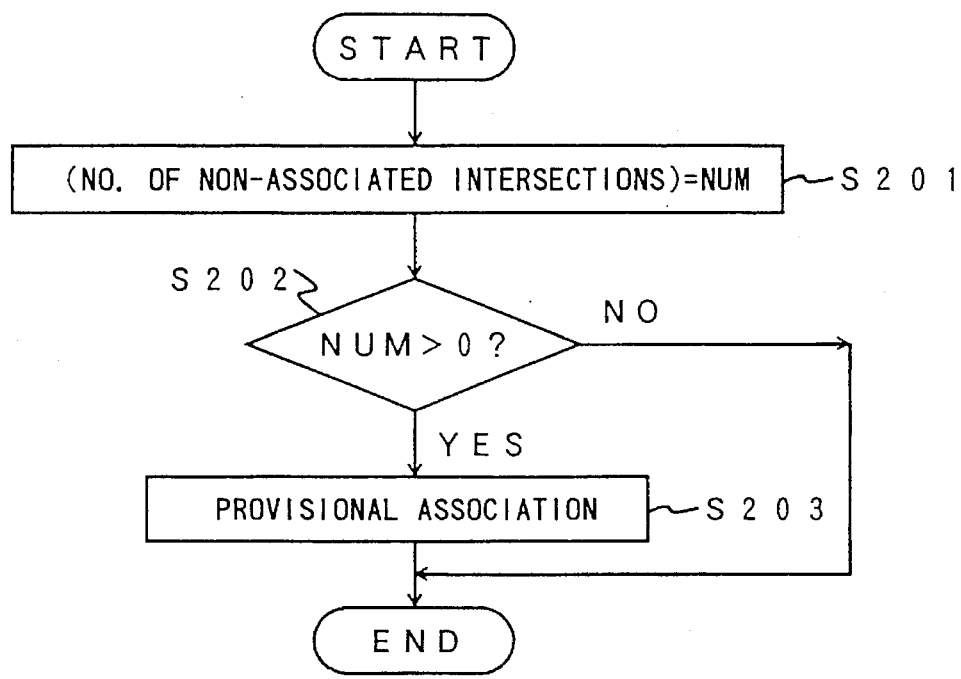
FIG. 52 is a flow chart for explaining a process of a connection provisional associating part 31g.

FIG. 52 shows a flow chart for the case where the process of the connection provisional associating part 31g is carried out by software, in order to describe an embodiment of the process of the connection provisional associating part 31g in more detail.

In FIG. 52, a step S201 sets the number of non-associated intersections to NUM. A step S202 decides whether or not NUM>0, and the process ends if the decision result in the step S202 is NO. On the other hand, if the decision result in the step S202 is YES, a step S203 provisionally associates the intersections and the process ends.

Figure 53:
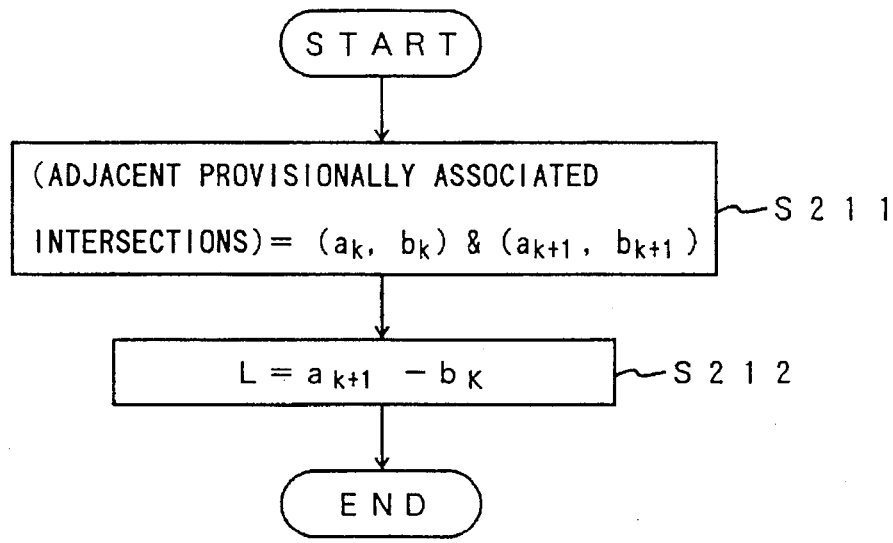
FIG. 53 is a flow chart for explaining a process of an inter-intersection distance calculator 31h.

FIG. 53 shows a flow chart for the case where the process of the inter-intersection distance calculator 31h is carried out by software, in order to describe an embodiment of the process of the inter-intersection distance calculator 31h in more detail.

In FIG. 53, a step S211 sets the adjacent intersections which are provisionally associated to $(1_k, b_k)$ and $(a_{k+1}, b_{k+1})$. A step S212 sets a distance L between the intersections to $a_{k+1}-b_k$, and the process ends.

Figure 54:
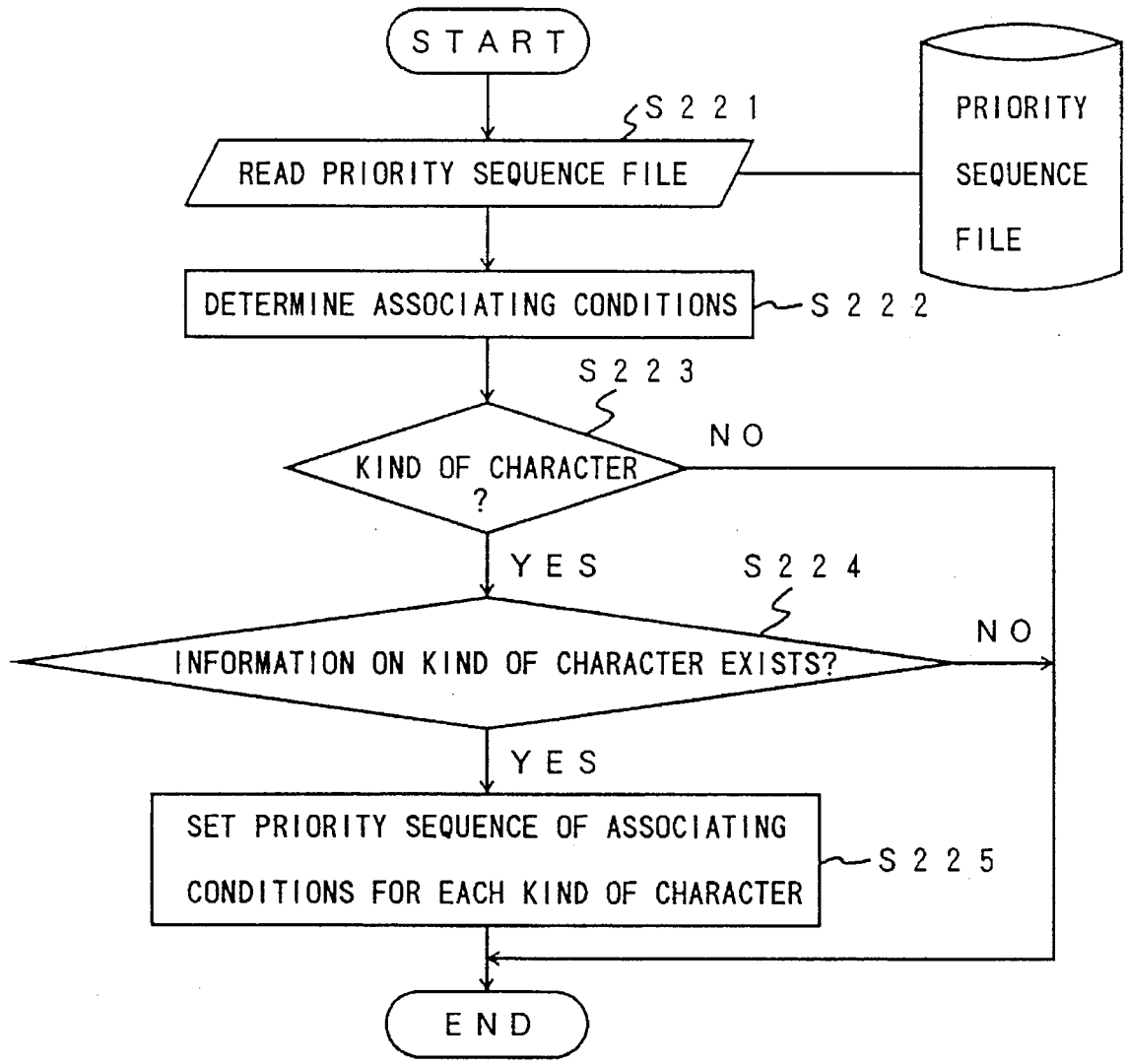
FIG. 54 is a flow chart for explaining a process of a priority sequence developing part 31i.

FIG. 54 shows a flow chart for the case where the process of the priority sequence developing part 31i is carried out by software, in order to describe an embodiment of the process of the priority sequence developing part 31i in more detail.

In FIG. 54, a step S221 reads the priority sequence table 310 or a priority sequence file. A step S222 determines the associating condition for associating the intersections based on the priority sequence table 310 or the priority sequence file. A step S223 decides whether or not the priority sequence is determined by the kind or type or character, and the process ends if the decision result in the step S223 is NO. On the other hand, if the decision result in the step S223 is YES, a step S224 decides whether or not information related to the kind or type of character exists, and the process ends if the decision result in the step S224 is NO. But if the decision result in the step S224 is YES, a step S225 sets the priority sequence depending on the kind or type of character, and the process ends.

Figure 55:
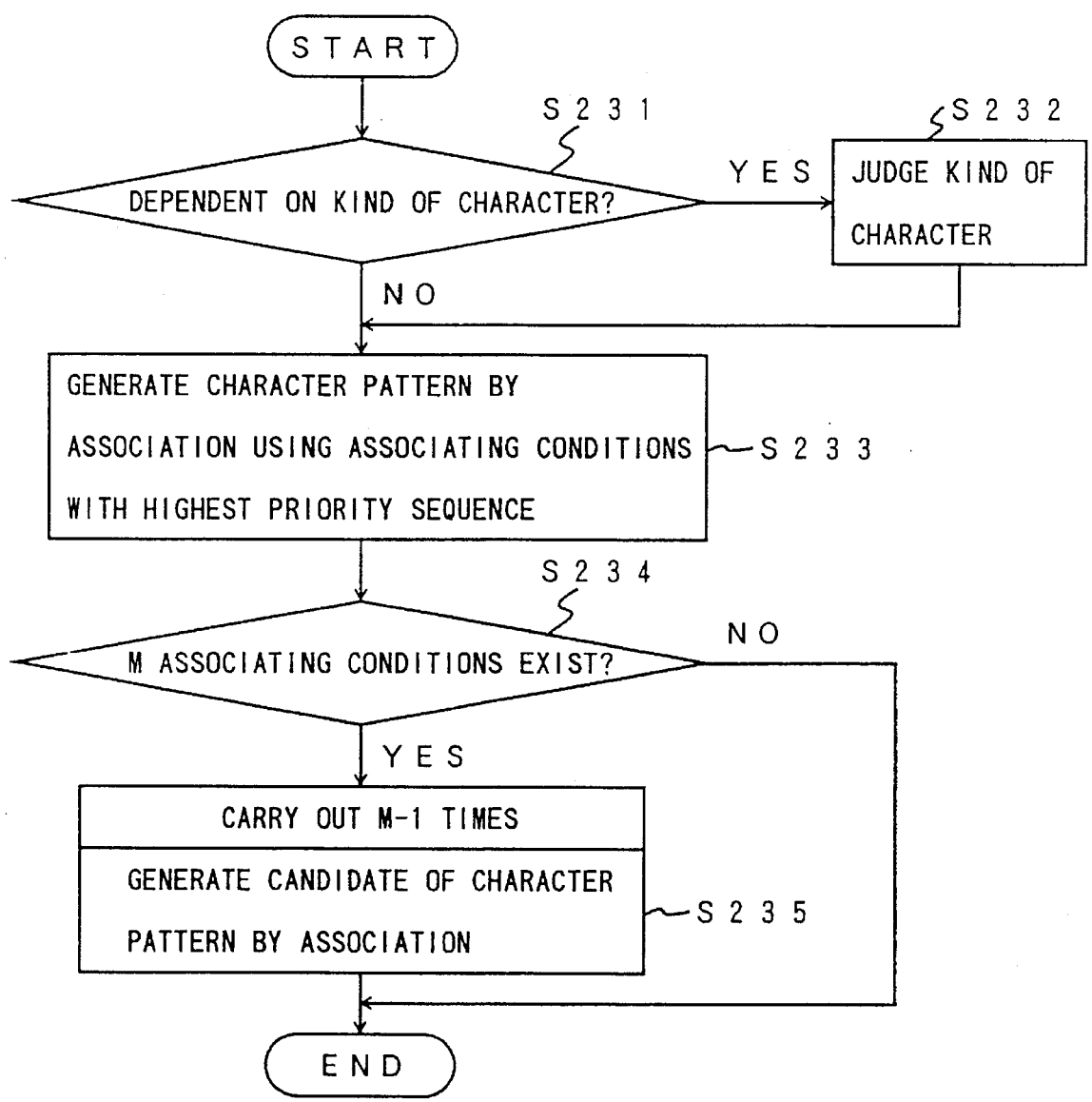
FIG. 55 is a flow chart for explaining a process of a connection associating part 31j.

FIG. 55 shows a flow chart for the case where the process of the connection associating part 31j is carried out by software, in order to describe an embodiment of the process of the connection associating part 31j in more detail.

In FIG. 55, a step S231 decides whether or not the association is made depending on the kind or type of character. A step S232 judges the kind or type of character if the decision result in the step S231 is YES. If the decision result in the step S231 is NO or after the step S232, a step S233 generates the character pattern by carrying out the association using the associating condition having the highest priority sequence. A step S234 decides whether or not M associating conditions exist, where M is a plural number, and the process ends if the decision result in the step S234 is NO. On the other hand, if the decision result in the step S234 is YES, a step S235 decrements M by 1 and generates the character pattern of the candidate by making the association. The step S235 is carried out M–1 times, and the process thereafter ends.

When extracting the character which touches the frame, rule or the like by the conventional image extraction system, it was necessary for the user to input form data in advance. The form data include format information related to the position, size and the like of the frame, rule or the like, and information related to the inclination of the frame, rule or the like. Such techniques of inputting the form data in advance were proposed in Japanese Laid-Open Patent Applications No. 62-212888 and No. 3-126186, for example.

On the other hand, according to each of the embodiments of the character extraction system according to the present invention, it is unnecessary to input in advance the information related to the position and size of the frame, rule or the like.

However, in each of the above described embodiments, the straight line is extracted by the straight line/frame extracting part 22. In other words, if the image to be extracted is a 1 character frame, the horizontal and vertical projections are obtained for each partial pattern obtained by the labeling, the ratios of the projection values with respect to the horizontal and vertical sizes of the rectangle which approximates the partial pattern are calculated, and the pattern is regarded as a long straight line if the ratios are greater than or equal to the predetermined threshold value. For this reason, the above ratios become small when the frame becomes inclined by a relatively large inclination, and the straight line cannot be detected in such a case. In addition, even if the frame is only slightly inclined, the ratios still become small and the straight line cannot be detected in such a case. Accordingly, in a case where the frame, rule or the like is relatively long, the information related to the inclination of the frame, rule or the like should be input in advance by the user.

In other words, in each of the above described embodiments, the subject to be eliminated is only the 1 character frame, but when the subject of the elimination is a block frame which is elongated in the horizontal direction, for example, it is a precondition that the inclination or rotation of the frame, rule or the like is corrected in advance before the processing. Hence, in FIG. 5, the input pattern input to the connected pattern extracting part 21 is already subjected to a preparation such as rotation correction. For this reason, the user must input in advance the information related to the inclination of the frame, rule or the like for each frame, rule or the like, and the inputting of such information is not only time consuming but the load on the user is also large.

Accordingly, a description will now be given of an embodiment which can also eliminate these inconveniences of the above described embodiments. FIG. 56 shows a fourth embodiment of the image extraction system according to the present invention. It is assumed in this embodiment that the input pattern to be processed is a binary image which is already subjected to a preparation such as correction of only an extremely large inclination or rotation, elimination of noise, filling of gaps formed by grazing and the like. In addition, it is assumed for the sake of convenience that this embodiment eliminates a black frame from a form sheet having the black frame. In other words, with regard to the character frame, a plurality of block frames which are elongated in the horizontal direction are arranged, and the size, position and inclination of the block frames are unknown. Hand-written characters are written in such block frames, and only the block frame is eliminated even if the character touch the block frame or the character projects out from the block frame. In this embodiment, the image extraction system includes a connected pattern extracting part 40, a line segment detector 41, a straight line detector 42, a frame detector 43 and a frame separating part 44 as shown in FIG. 56. The connected pattern extracting part 40 extracts a partial pattern having pixels which are connected from the input pattern which is formed by the straight line portion such as the frame and rule and the character, graphic or symbol. The line segment detector 41 detects the line segment or a portion of the straight line at a predetermined length for every connected pattern using "adjacent projection". The "adjacent projection" will be described later. The straight line detector 42 detects a long straight line by integrating a plurality of line segments or portions of the straight line which are obtained. The frame detector 43 detects the straight line forming the character frame based on the intervals or the like of the plurality of straight lines which are obtained. The frame separating part 44 divides the block frame into frames of one character based on the intersection of the frames to calculate the width of each frame, and separates the character frame from the connected pattern depending on the width.

After separating the frame, it is possible to carry out for example the processes of the elements shown in FIGS. 5 and 6 starting from the character/frame intersection calculator 25 shown in FIG. 5 to the connected pattern integrating part 34 shown in FIG. 6.

The connected pattern extracting part 40 includes a labeling part 40a. In order to stably extract each pattern without being dependent on the relative relationship of the positions where the plurality of block frames are arranged, the labeling part 40a extracts by labeling the pattern which is connected by the 8-connection. The partial pattern which is obtained by the labeling is one of (i) a frame which does not touch a character, (ii) a character which does not touch a frame or a portion of such a character, and (iii) a frame which touches a character. Hence, such partial patterns are distinguished in order to extract the frame. In addition, since the size of the partial pattern which is obtained by the labeling becomes necessary during a latter process, corner coordinates of the rectangle which approximates the partial pattern are calculated during the labeling process.

The line segment detector 41 includes a thinning part 41a, an adjacent projection part 41b, a horizontal/vertical line segment detector 41c and a horizontal line segment searching part 41d.

The thinning part 41a carries out a thinning process for every partial pattern which is obtained by the labeling. This thinning process is carried out to make the line width the same so as to facilitate extraction of the long straight line which exists only in the frame. A known technique may be used for the thinning process itself. The original pattern of the partial pattern before the thinning process is stored independently of the thinned pattern, so that both may be used in latter processes when searching the line segment and separating the frame.

The adjacent projection part 41b divides the thinned pattern vertically and horizontally into a plurality of parts, calculates the adjacent projections within the divided ranges in both the vertical and horizontal directions, and detects by rectangular approximation the line segment having a predetermined length or a portion of a straight line. The "adjacent projection" takes as the projection value a sum of the projection value of a target row or column and the projection of an adjacent (or surrounding) row or column which is adjacent to the target row or column. Accordingly, even if the straight line extends over a plurality of rows or columns due to the inclination or slope of the straight line, it is possible to detect the straight line. As a result, even if the frame is large such as the case of the block frame and the frame is inclined, it is possible to detect the straight line forming the frame by use of the adjacent projection technique. For example, if the projection value of the ith row is denoted by p(i) as shown in FIG. 57, an adjacent projection value P(i) can be calculated from the following formula (11), where j=1 in FIG. 57. The projection value of the column can be calculated similarly to the projection value of the row.

$$P(i)=p(i-j)+p(i-j+1)+\ldots+p(i)+\ldots+p(i+j) \quad (11)$$

Figure 58:
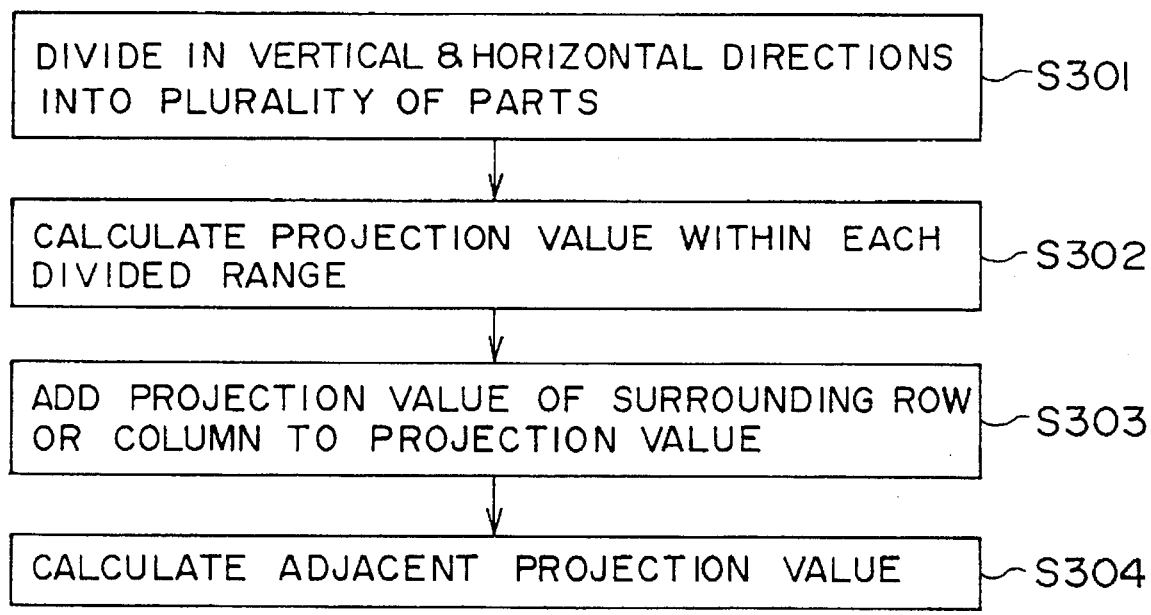
FIG. 58 is a flow chart for explaining a process of an adjacent projection part 41b.

FIG. 58 shows a flow chart for the case where the process of the adjacent projection part 41b is carried out by software, in order to describe an embodiment of the process of the adjacent protection part 41b in more detail.

In FIG. 58, a step S301 divides the partial pattern which is obtained by the connected pattern extracting part 40 in the vertical and horizontal directions into a plurality of parts. A step S302 calculates the projections within the divided ranges in both the vertical and horizontal directions. A step S303 adds the projection value of the adjacent or surrounding row or column to each projection value calculated in the step S302. In addition, a step S304 calculates the adjacent projection values based on the formula (11) described above.

Figure 59:
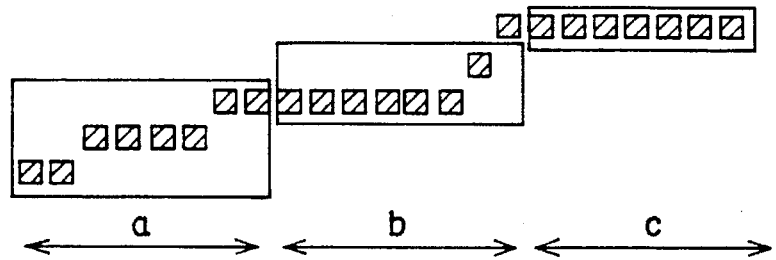
FIG. 59 is a diagram for explaining the detection of rectangular line segments.

The vertical/horizontal line segment detector 41c regards as the position where the candidate of the straight line exists the part for which the ratios of the adjacent projection value calculated in the adjacent projection part 41b and the divided lengths in both the vertical and horizontal directions are greater than or equal to a predetermined threshold value. In addition, as indicated by a part "a" in FIG. 59, when the ratios are greater than or equal to the predetermined threshold value continuously for a plurality of rows or columns, it is regarded that a straight line exists within a rectangular range which includes such rows or columns. Because the detected straight line or portion of the straight line is approximated by the rectangular, that is, subjected to rectangular approximation, such a straight line or a portion thereof will hereinafter be referred to as a "rectangular line segment".

The inclined long straight line cannot be detected if the normal (general) projection were used in place of the adjacent projection, and it would be necessary in this case to increase the number of divisions of the partial pattern and to shorten the length of the divisions. However, if the length of the divisions is short, a plurality of short straight lines forming the character would also be detected. On the other hand, this embodiment uses the adjacent projection technique described above which makes it possible to also detect a relatively long straight line.

Figure 60:
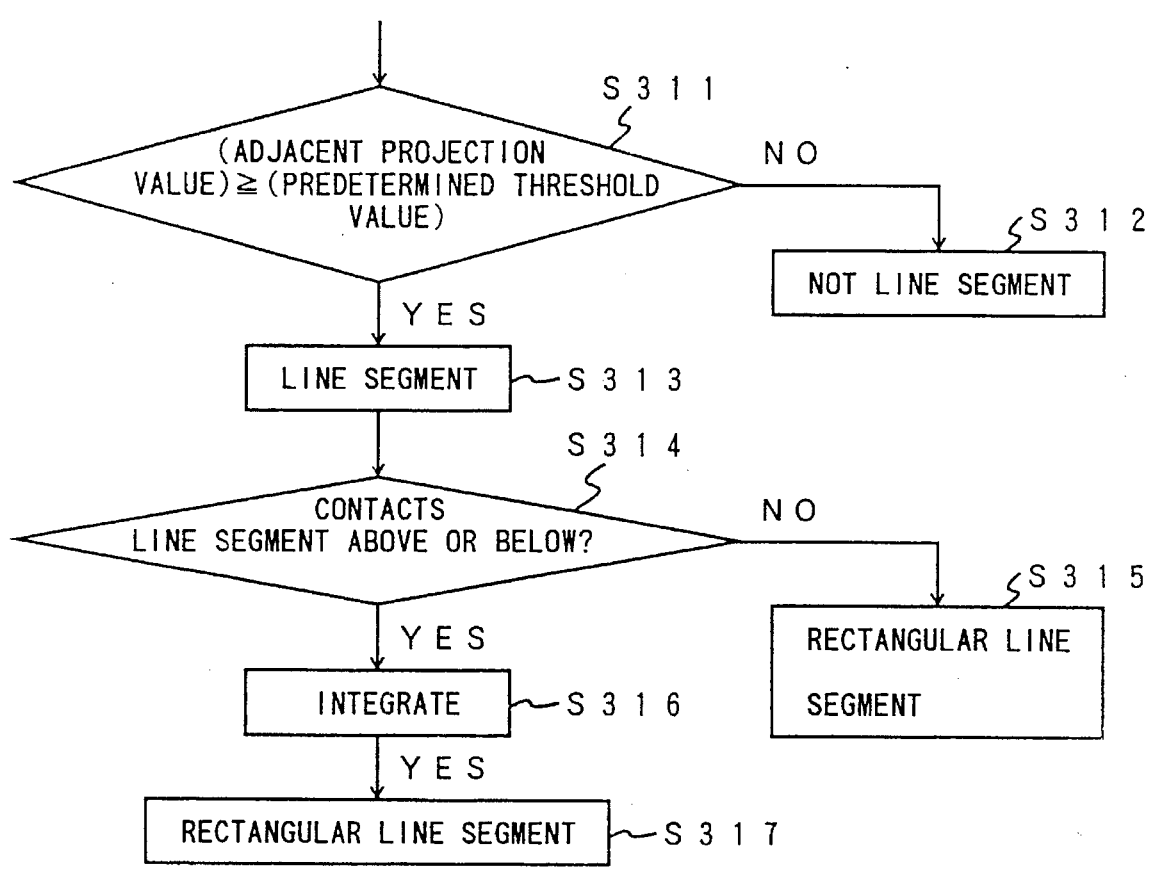
FIG. 60 is a flow chart for explaining a process of a vertical/horizontal line segment detector 41c.

FIG. 60 shows a flow chart for the case where the process of the vertical/horizontal line segment detector 41c is carried out by software, in order to describe an embodiment of the process of the vertical/horizontal line segment detector 41c in more detail.

In FIG. 60, a step S311 decides whether or not a ratio of the adjacent projection values calculated by the adjacent projection part 41b and the divided lengths in the vertical and horizontal directions are greater than or equal to a predetermined threshold value. If the decision result in the step S311 is NO, a step S312 determines that no line segment exists. On the other hand, if the decision result in the step S311 is YES, a step S313 determines that a line segment exists. In this latter case, a step S314 decides whether or not the line segment which is determined to exist in the step S313 is connected to a line segment located above and below this line segment. If the decision result in the step S314 is NO, a step S315 determines that the line segment which is determined to exist in the step S313 is a rectangular line segment. On the other hand, if the decision result in the step S314 is YES, a step S316 integrates the line segment which is determined to exist in the step S313 and the line segment existing above and below this line segment, and a step S317 determines that the integrated line segment is a rectangular line segment.

Figure 61:
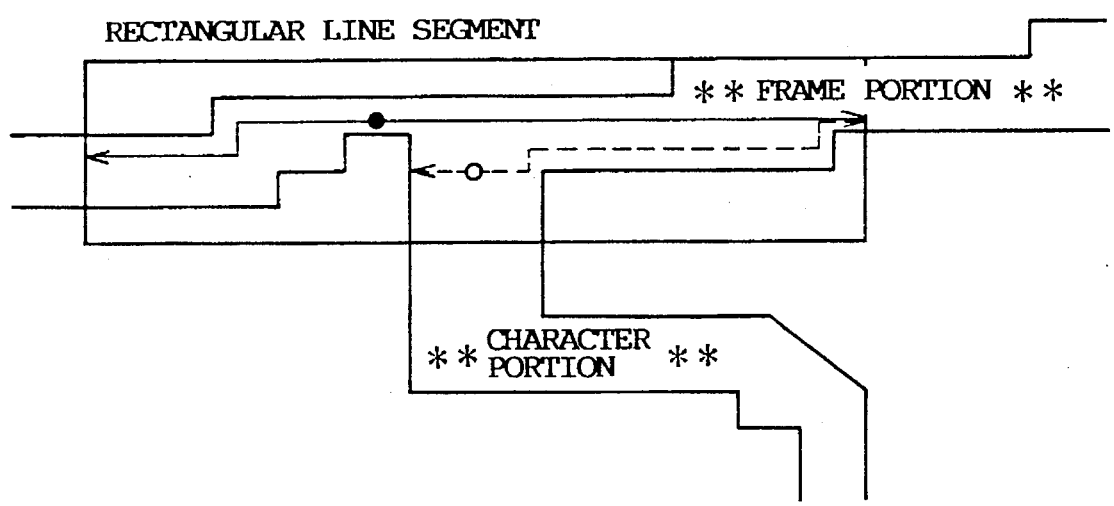
FIG. 61 is a diagram for explaining a starting point of search.

The horizontal line segment searching part 41d carries out a search with respect to the rectangular line segment which is detected by the vertical/horizontal line segment detector 41c, so as to confirm whether or not the horizontal line segment is cut at an intermediate portion thereof. A narrowest portion of the rectangular line segment is used as a starting point for the search. For example, when a predetermined location such as a middle point indicated by a white circular mark in FIG. 51 is used as the starting point, the possibility of the search failing is high if the starting point is located at a portion of the character as shown and the search progresses as indicated by a dotted line with an arrow. However, the possibility that the narrowest portion indicated by the black circular mark in FIG. 61 is located at a portion of the character is low, thereby making it possible to positively carry out the search as indicated by a solid line with an arrow.

Figure 62:
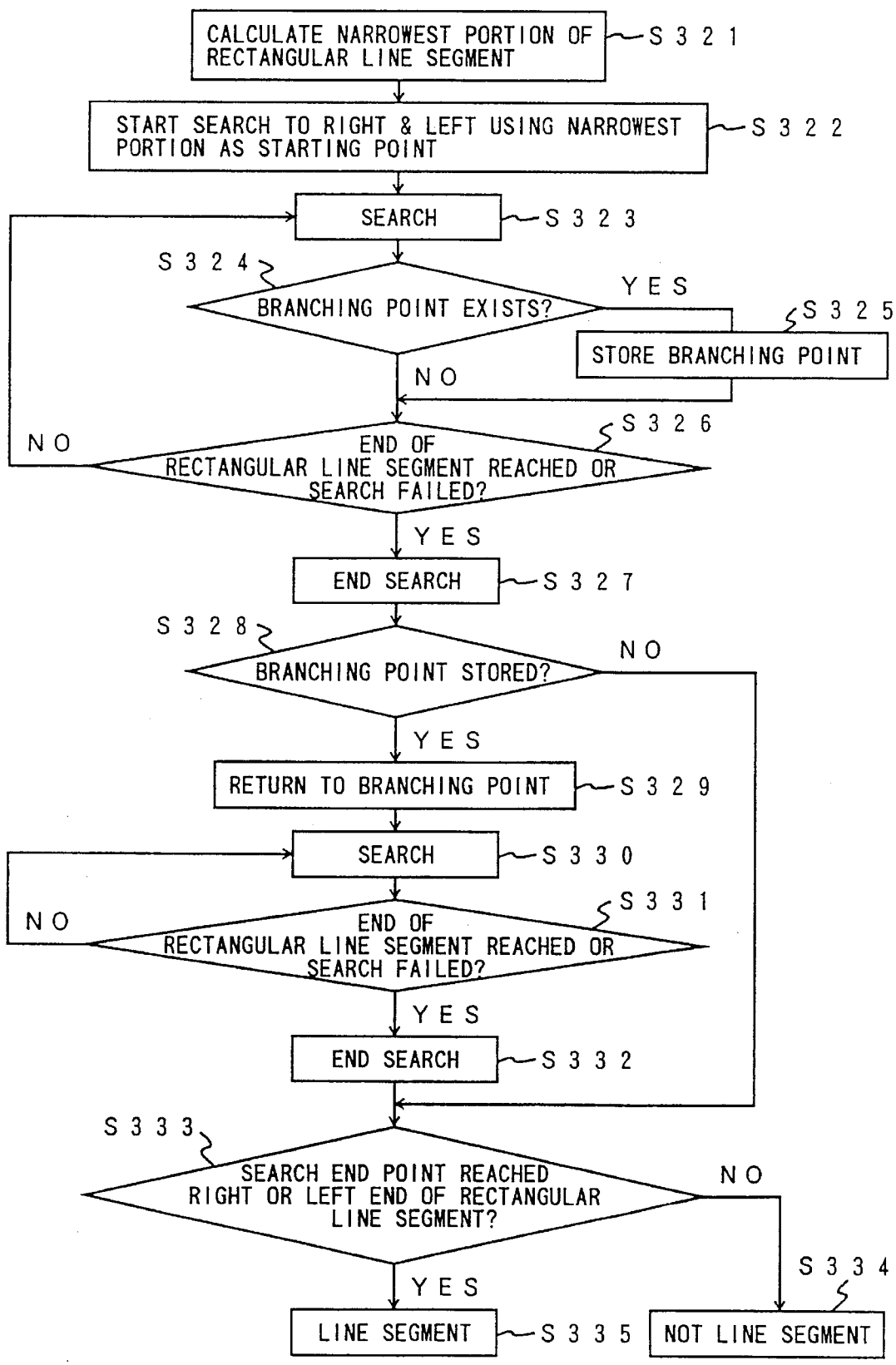
FIG. 62 is a flow chart for explaining a process of a horizontal line segment selector 41d.

FIG. 62 shows a flow chart for the case where the process of the horizontal line segment searching part 41d is carried out by software, in order to describe an embodiment of the process of the horizontal line segment searching part 41d in more detail.

In FIG. 62, a step S321 calculates a narrowest portion of the rectangular line segment which is detected by the vertical/horizontal line segment detector 41c. A step S322 starts the search to the right and left by using the narrowest portion which is calculated as the starting point. A step S323 carries out the search, and a step S324 decides whether or not a branching point exists. If the decision result in the step S324 is YES, a step S325 stores the branching point. In addition, if the decision result in the step S324 is NO or after the step S325, a step S326 decides whether or not an end of the rectangular line segment is reached or, whether or not the search has failed. If the decision result in the step S326 is NO, the process returns to the step S323.

On the other hand, if the decision result in the step S325 is YES, a step S327 ends the search, and a step S328 decides whether or not the branching point is stored. If the decision result in the step S328 is NO, the process advances to a step S333 which will be described later. If the decision result in the step S328 is YES, a step S329 returns to the stored branching point, and a step S330 carries out the search. A step S331 decides whether or not the end of the rectangular line segment is reached or, whether or not the search has failed. If the decision result in the step S311 is NO, the process returns to the step S330. On the other hand, if the decision result in the step S331 is YES, a step S332 ends the search, and the step S333 decides whether or not the end point of the search has reached the right and left end of the rectangular line segment. If the decision result in the step S333 is NO, a step S334 determines that the rectangular line segment is not a horizontal line segment. In addition, if the decision result in the step S333 is YES, a step S335 determines that the rectangular line segment is a horizontal line segment.

Figure 63A:
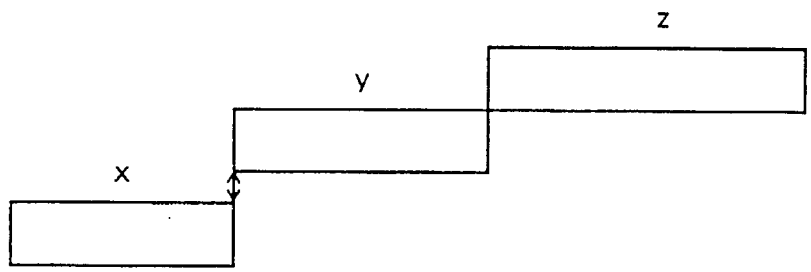
FIGS. 63A and 63B respectively are diagrams for explaining a connection of rectangular line segments and a slope of a straight line.
Figure 63B:
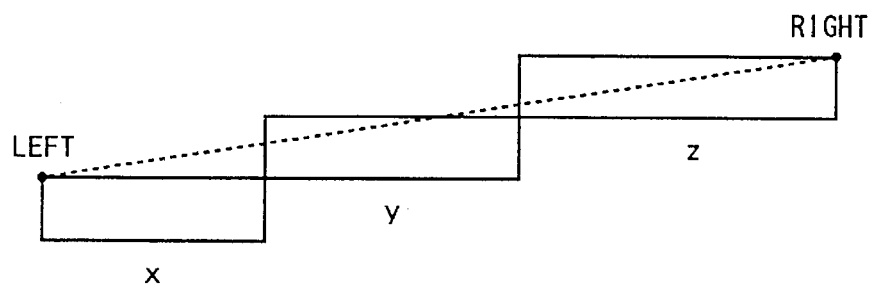

Returning now to the description of FIG. 56, the straight line detector 42 includes a line segment integrating part 42a, a straight line detector 42b, a line segment integrating part 42c, and a straight line detector 42d. The line segment integrating part 42a and the straight line detector 42b are provided with respect to the horizontal line segment, and the line segment integrating part 42c and the straight line detector 42d are provided with respect to the vertical line segment. The line segment integrating part 42a integrates the rectangular line segments to form a long straight line if the rectangular line segments touch or are connected without being cut at an intermediate portion thereof, such as the case of line segments y and z shown in FIG. 63A. In addition, even when the rectangular line segments are not connected to each other, such as the case of line segments x and y shown in FIG. 63A, the straight line detector 42 integrates these rectangular line segments to form a long straight line if the distance in the vertical direction between the rectangular line segments is within the number j of columns or rows added during the adjacent projection described above. The straight line detector 42b determines that the integrated straight line is a candidate of the straight line forming the horizontal frame portion if a ratio of the length of the integrated straight line and the length of the rectangle approximating the partial pattern is greater than or equal to a predetermined threshold value. In addition, the straight line detector 42b obtains the slope of the integrated straight line, that is, the inclination of the partial pattern, from the slope of a straight line connecting a coordinate at the top left of the line segment x and a coordinate at the top right of the line segment z which are integrated in the line segment integrating part 42a, as shown in FIG. 63B. This inclination of the partial pattern is used at a latter process which will be described later. With regard to the vertical line segment, the line segment integrating part 42c and the straight line detector 42d carry out processes similar to those of the line segment integrating part 42c and the straight line detector 42d described above with respect to all of the detected rectangular line segments. In other words, the line segment integrating part 42c detects the straight line by integrating the rectangular line segments, and the straight line detector 42d approximates the detected straight line by the rectangle and determines that it is a candidate of the straight line forming the vertical frame portion.

Figure 64:
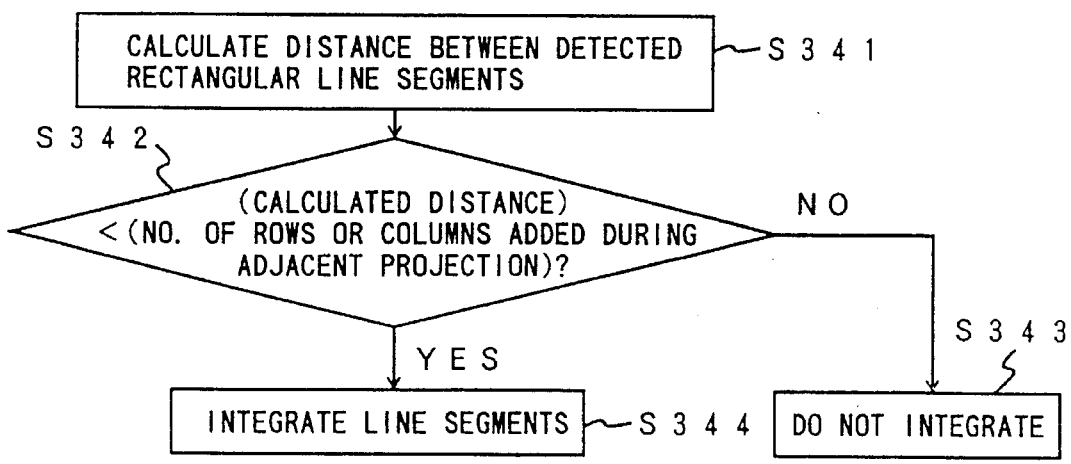
FIG. 64 is a flow chart for explaining processes of line segment integrating parts 42a and 42c.

FIG. 64 shows a flow chart for the case where the process of the line segment integrating part 42a or the straight line integrating part 42c of the straight line detector 42 is carried out by software, in order to describe an embodiment of the process of the line segment integrating part 42a or the line segment integrating part 42c in more detail.

In FIG. 64, a step S341 calculates the distance between the detected rectangular line segments. A step S342 decides whether or not the calculated distance is within the number of rows or columns added during the adjacent projection described above. If the decision result in the step S342 is NO, a step S343 carries out no integration of the rectangular line segments. On the other hand, if the decision result in the step S342 is YES, a step S344 integrates the rectangular line segments.

Returning now to the description of FIG. 56, the frame detector 43 includes a horizontal frame detector 43a, a searching part 43b, a line interval calculator 43c, a histogram forming part 43d, and a vertical frame detector 43e. The horizontal frame detector 43a detects the horizontal frame portion from the candidates of the straight line forming the horizontal frame portion and which are detected by the straight line detector 42b of the straight line detector 42. In this embodiment, the image to be processed has the block frame in which the frames are arranged at constant intervals one character at a time in 1 horizontal row. Hence, out of the straight lines which are obtained and extending in the horizontal direction, the straight line existing at the outermost part is regarded as the horizontal frame portion. The searching part 43b searches for the vertical line segment based on the candidates of the straight line forming the vertical frame portion which are detected by the straight line detector 42d of the straight line detector 42 and the horizontal frame portion detected by the horizontal frame detector 43a, in order to detect the vertical frame portion. More particularly, a search is carried out to check whether or not the straight line which is the candidate of the vertical frame portion reaches the horizontal frame portion located above and below and obtained in the horizontal frame detector 43a or, whether or not the straight line which is the candidate of the vertical frame portion is cut at an intermediate portion thereof. Similarly as in the case of the horizontal line, the search is carried out from a starting point which is located at a narrowest portion within the rectangular range (rectangular line segment). As a result of the search, the vertical straight line which reaches both the horizontal frame portion located above and below is regarded as a candidate of the vertical frame portion, while other vertical straight lines are regarded as portions of the character and omitted. Next, the line interval calculator 43c calculates the interval of the vertical straight lines which remain as the candidates of the vertical line. In addition, the histogram forming part 43d forms a histogram of the calculated line interval and the appearing frequency thereof. The vertical frame detector 43e excludes from the candidate of the vertical frame portion the vertical line which forms an interval greatly different from others, and detects the vertical straight line which is not excluded from the candidate of the vertical frame portion as the vertical frame portion.

Figure 65:
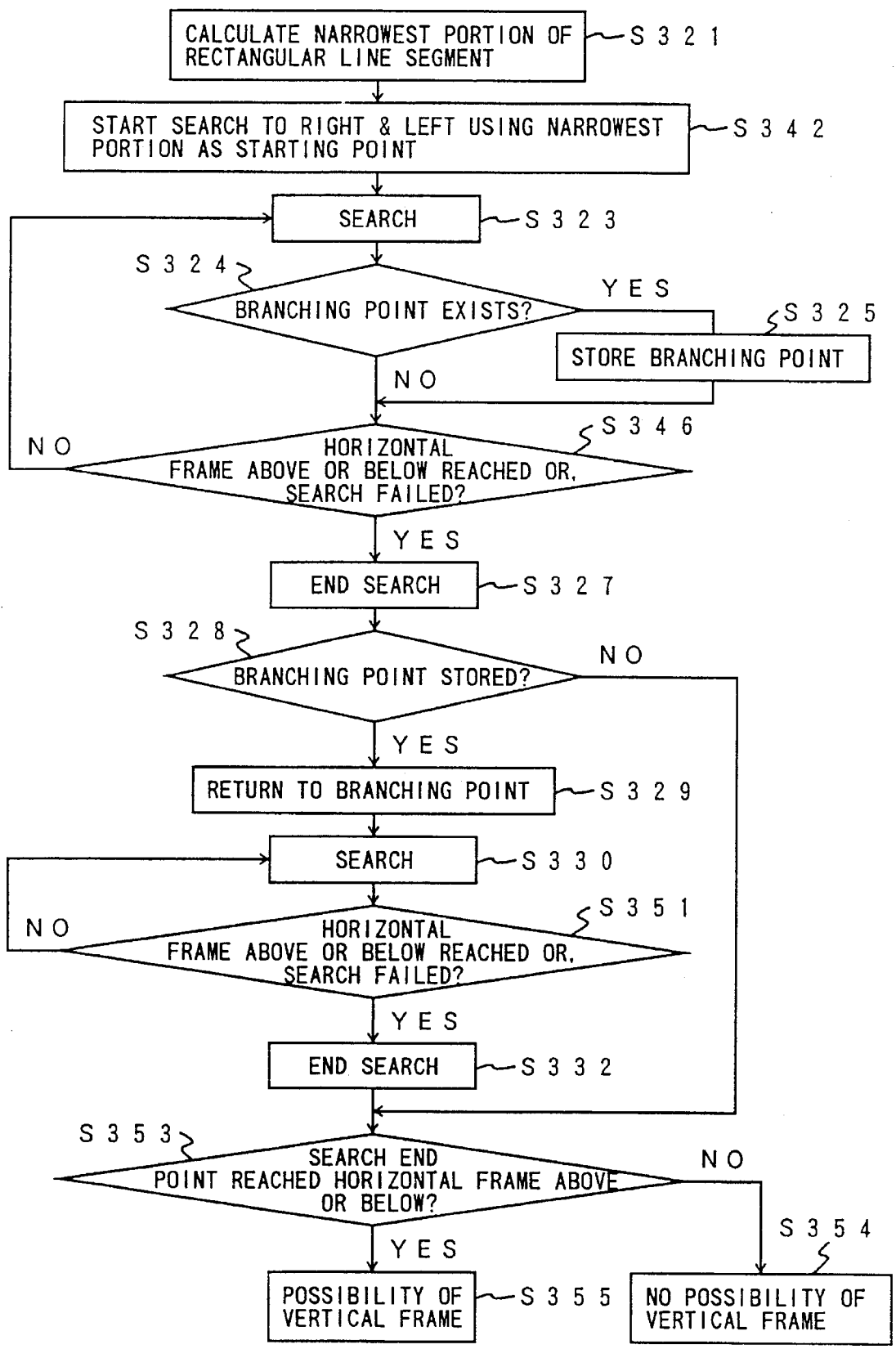
FIG. 65 is a flow chart for explaining a process of a search part 43b.

FIG. 65 shows a flow chart for the case where the process of the searching part 43b of the frame detector 43 is carried out by software, in order to describe an embodiment of the process of the searching part 43b in more detail. In FIG. 65, those steps which are basically the same as those corresponding steps in FIG. 62 are designated by the same reference numerals, and a description thereof will be omitted.

In FIG. 65, a step S342 starts the search upwards and downwards by taking the narrowest portion as the starting point. Steps S346 and S351 respectively decide whether or not the horizontal frame portion above and below is reached or, whether or not the search has failed. A step S353 decides whether or not the end point of the search has reached the horizontal frame portion above and below. If the decision result in the step S353 is NO, a step S354 determines that there is no possibility of the detected straight line forming the vertical frame portion. On the other hand, if the decision result in the step S353 is YES, a step S355 determines that there is a possibility that the detected straight line forms the vertical frame portion.

Next, a description will be given of the frame separating part 44 shown in FIG. 56. The frame separating part 44 includes a frame intersection calculator 44a, a 1 character range separating part 44b, a projection part 44c, a straight line detector 44d, a frame searching part 44e, a side width calculator 44f, a frame eliminating part 44g, and a contact character interpolator 44h.

Figure 66:
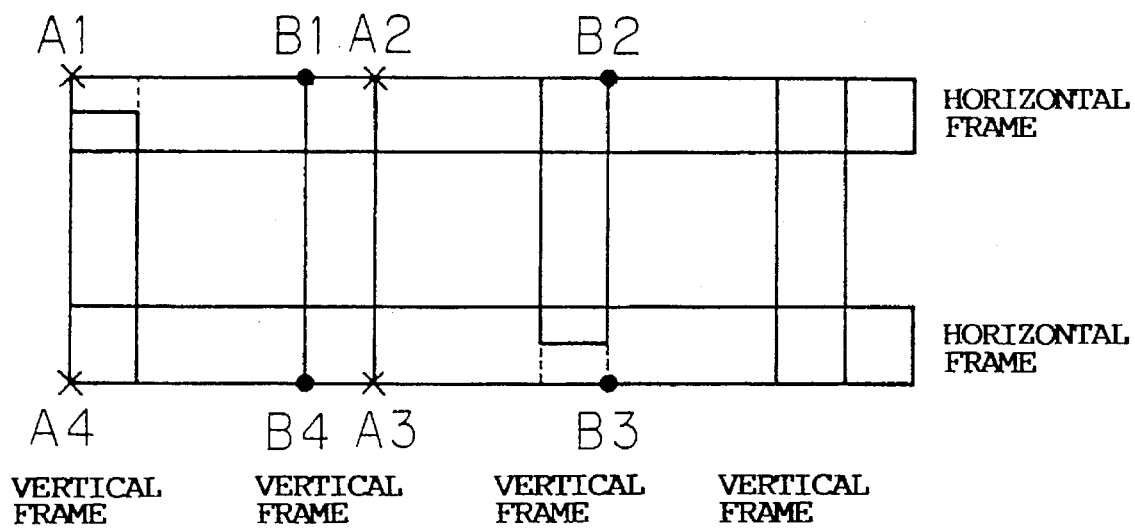
FIG. 66 is a diagram for explaining the separation into 1 character frame.

The frame intersection calculator 44a calculates the intersections of the vertical frame portion and the horizontal frame portion which are obtained from the frame detector 43. In a particular case shown in FIG. 66, the frame intersection calculator 44a calculates intersections A1, B1, A2, B2, . . . The 1 character range separating part 44b uses the calculated intersections and divides the frame portions in to ranges of 1 character each starting from the left in FIG. 66, to separate the ranges (A1, A2, A3, A4), (B1, B2, B3, B4), . . . As a result, each separated portion corresponds to 1 character frame.

The projection part 44c calculates the projections of each of the separated portions<and the straight line detector 44d detects the straight lines from the calculated projections. More particularly, the straight line detector 44d calculates the ratios of the projection values of each row and column of each of the separated portions and the rectangles which are obtained by approximating each of the separated portions by the rectangles, and obtains the candidates of the straight line forming the character frame based on the calculated ratios.

The frame searching part 44e calculates the distance between the straight lines from the candidates of the straight line forming the character frame, and extracts the straight line at the outermost part forming the character frame, so as to search each character frame and obtain the position of each character frame. The side width calculator 44f obtains the candidate of the straight line adjacent to the straight line at the outermost part, and calculates the line width of each side of the searched character frame. The frame eliminating part 44g eliminates the character frames one character frame at a time based on the position of the straight line at the outermost part of each side and the calculated line width of each side. The contact character interpolator 44h interpolates the character portion which drops out or chips when the character frame is eliminated. As a result, the character frame is eliminated and the characters are extracted one character at a time.

Figure 67:
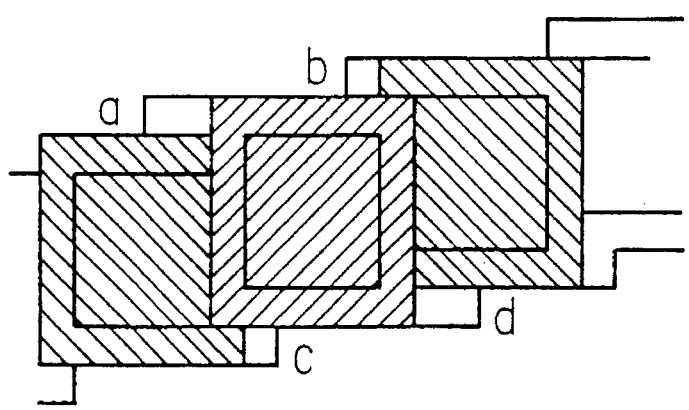
FIG. 67 is a diagram for explaining the elimination range of the frame.

When the frame is inclined as shown in FIG. 67, portions ra, rb, rc and rd may not be eliminated and remain above and below each frame even after the frames are eliminated. Hence, if the slope or inclination obtained in the straight line detector 42 described above is relatively large, the frame eliminating part 44g may slightly increase the eliminating range of the frame.

Figures 68A, 68B:
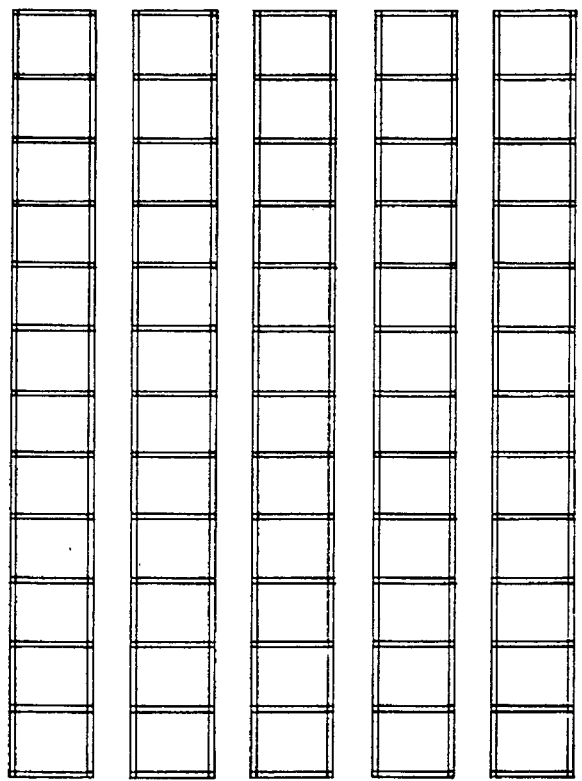
FIGS. 68A and 68B respectively are diagrams for explaining the frame extraction in the fourth embodiment.

FIGS. 68A, 68B, 69A and 69B are diagrams for explaining an example of the character extraction made in this embodiment. FIG. 68A shows the original pattern, and FIG. 68B shows the frames which are extracted by the frame eliminating part 44g of the frame separating part 44 shown in FIG. 56. FIG. 69A shows the characters which are extracted by extracting the frame in the frame eliminating part 44g of the frame separating part 44, and FIG. 69B shows the characters which are interpolated by the contact character interpolator 44h of the frame separating part 44.

As described above, out of the extracted partial pattern, this embodiment decides whether or not the extracted straight line forms the frame and erases the frame line to leave the character region with respect to the block frame in which each character is partitioned by 1 frame. Therefore, it is possible to obtain the following advantageous features 1) through 9).

1) Even if the block frame is inclined, it is possible to positively eliminate only the character frame.

2) When extracting the frame, a histogram is formed to indicate the intervals of the candidates of the straight line forming the frame and the appearing frequency thereof, and the straight line which forms an interval extremely far away from a peak of this histogram is excluded from the candidate of the frame. As a result, it is possible to extract the frame without the knowledge of the kind of frame which is the subject of the processing.

3) The adjacent projection technique is employed to use as the projection value of the row or column the sum of the projection value of a certain row or column and the projection value of the adjacent or surrounding row or column which is adjacent to the certain row or column. Hence, it is possible to detect the straight line which is inclined.

4) When detecting the straight line, it is possible to positively specify the existing range of the straight line by changing the number of rows or columns to be added by the adjacent projection technique.

5) When detecting the straight line, it is possible to positively detect the straight line portion by carrying out the adjacent projection technique with respect to the thinned pattern of the target pattern.

6) When searching along the straight line within the rectangular region in which the straight line exists, the starting point of the search is set to the narrowest portion of the pattern within the rectangle, so that the starting point is located in the frame portion and not in the character portion. As a result, it is possible to positively carry out the search.

7) When searching the straight line, the branching point is stored and the search is carried out by returning to the stored branching point if the search fails, so that the straight line can be searched more positively.

8) The line segments approximated by the rectangles are integrated, so as to detect the straight line. Hence, it is possible to positively detect the straight line even when the length of the straight line is unknown.

9) By obtaining the slope of the detected straight line, it is possible to change the eliminating width of the frame when eliminating the frame, and it is thus possible to prevent insufficient erasure and excess erasure of the frame.

Further, the present invention is not limited to these embodiments, but various variations and modifications may be made without departing from the scope of the present invention.

What is claimed is:

1. An image extraction system for extracting patterns including at least one of characters, graphics and symbols from an image having a frame formed by straight line portions said image extraction system comprising:

connected pattern extracting means for extracting partial patterns having connected pixels from the image;

straight line extracting means for extracting straight line portions from the partial patterns;

attribute adding means for categorizing the partial patterns into a first pattern including only portions of the pattern which do not touch the frame and portions of the frame which do not touch the pattern, and a second pattern including portions of the pattern which touch the straight line portion extracted by said straight line extracting means;

separating means for separating the straight line portions from the second pattern;

intersection calculating means for calculating intersections of the patterns and the straight line portions from the second pattern;

intersection associating means for associating the intersections which are calculated by said intersection calculating means;

interpolating means for interpolating a region of the pattern within the straight line portions forming the frame based on the intersections which are associated by said intersection associated means; and connection confirming means for confirming a connection of a pattern with respect to the extracted partial patterns of the pattern, said connection confirming means extracting a confirmed connection of the pattern and feeding back the portions of the pattern which cannot be confirmed to said intersection associating means, said intersection associating means re-associating the intersections calculated by said intersection calculating means with respect to the portion of the pattern fed back by said connection confirming means, said interpolating means interpolating a region of the pattern within the straight line portions forming the frame based on the intersections which are re-associated by said intersection associating means.

2. The image extraction system as claimed in claim 1, wherein said connection confirming means obtains a connection component by labeling only candidates of the pattern including portions of the pattern which touch the frame.

3. The image extraction system as claimed in claim 1, wherein said connection confirming means limits re-associating the intersections in said intersection associating means to where a straight line connecting the intersections exists on the straight line portion.

4. The image extraction system as claimed in claim 1, wherein said intersection associating means comprises:

means for extracting both end points of a line segment which forms the pattern as intersection candidates to be associated from intersections where said line segment and the straight line portions connect;

means for calculating a number of intersection candidates at each of two contours respectively located on inner and outer sides of and forming each straight line portion and calculating a distance between each pair of associated candidates by associating the candidates when the calculated number of candidates at the two contours match; and means for confirming the association by checking each distance between the candidates based on a line width of the straight line portion.

5. The image extraction system as claimed in claim 1, wherein said intersection associating means comprises:

first means for extracting both end points of a line segment which forms the pattern as intersection candidates to be associated out of intersections where said line segment and the straight line portions connect;

second means for calculating a number of intersection candidates at each of two contours respectively located on inner and outer sides of and forming each straight line portion;

third means for calculating a middle point between two intersections of each line segment forming the pattern when the calculated number of candidates at the two contours do not match, and for calculating a distance between the middle points which are calculated for the two contours on the inner and outer sides forming the straight line portion;

fourth means for associating the middle points and the intersection candidates forming the middle points when the calculated distance between the middle point is less than or equal to a predetermined threshold value which is determined by a line width of the straight line portion; and fifth means for obtaining one of a slope of a line segment forming the pattern at the intersection candidates and a straight line perpendicularly intersecting the straight line portion, with respect to the innersection candidates which cannot be associated by said fourth means, and for associating the intersection candidates depending on a continuity of said line segment based on the slope of said line segment and the intersection candidate by including the intersection candidates which are already associated.

6. The image extraction system as claimed in claim 1, wherein said intersection associating means approximates a pattern which is formed by the association by a rectangle using labeling, calculates a ratio of a size of the rectangle and one of a size of the pattern and a size of the frame, and cancels association of the intersections when the ratio exceeds a predetermined threshold value.

7. The image extraction system as claimed in claim 1, wherein said interpolating means comprises:

means for obtaining straight lines connecting the intersections which are associated by said intersection associating means and for identifying a portion inside of said straight lines as a region of the pattern;

means for obtaining a slope of a contour line of a line segment forming the pattern at an intersection of a line segment that is not associated, and for obtaining a cross-point of two straight lines which pass through each intersection and have the obtained slope of the contour;

means for identifying a range surrounded by said two straight lines and an ouster contour line of the frame, including the outer contour line of the frame, as a region of the pattern when the cross-point is located within the frame; and means for identifying a range within the frame between said two straight lines and the intersection of said two straight lines and the outer contour line of the frame, excluding the outer contour line of the frame as a region of the pattern when the cross-point is located outside the frame.

8. The image extraction system as claimed in claim 1, wherein said interpolating means interpolates a region within the straight line portions using straight lines corresponding to a line width of the pattern, so that a continuity of the pattern is restored.

9. The image extraction system as claimed in claim 1, which further comprises:

connected pattern integrating means for determining whether a portion of the partial patterns exists inside the frame based on a position of the extracted frame, integrating the partial patterns as a constituent element of the pattern if a decision result is yes, determining whether a ratio of a size of the integrated pattern and a size of the frame is within a range of a predetermined threshold value, employing the integrated pattern if the ratio is within the range, and extracting each original partial pattern without integration if the ratio is outside the range.

10. The image extraction system as claimed in claim 1, wherein said intersection associating means calculates a distance between candidates of the intersections at two contours on inner and outer sides forming each straight line portion with respect to each of line segments forming the pattern and are associated by a one-to-one association, and calculates an average line width of the line segments forming the pattern from an average value of the calculated distances.

11. The image extraction system as claimed in claim 1, wherein said separating means obtains connection components using labeling with respect to a separated pattern which is obtained by separating the straight line portions from an original pattern including the straight line portions and the pattern, and eliminates noise in the straight line portions based on an area of each connection component.

12. The image extraction system as claimed in claim 1, wherein said intersection associating means comprises:

means for associating the intersections based on a distance between each pair of character line segments which form one character and are included in the first pattern and a continuity of a slope of each of the character line segments; and means for adaptively changing references used to determine the distance and continuity depending on a line width of the character line segments.

13. The image extraction system as claimed in claim 1, wherein said intersection associating means comprises:

means for associating intersections to maintain continuity according to a priority sequence set based on at least the distances among the intersections having different labels using the intersections calculated by said intersection calculating means, with respect to one of the pattern and a portion of the pattern a connection of which cannot be confirmed by said connection confirming means.

14. The image extraction system as claimed in claim 13, wherein said priority sequence is a table of conditions for associating the intersections.

15. The image extraction system as claimed in claim 1, wherein said intersection associating means comprises:

means for associating intersections to maintain continuity according to a predetermined priority sequence using the intersections calculated by said intersection calculating means, with respect to a pattern or a portion of the pattern a connection of which cannot be confirmed by said connection confirming means.

16. The image extraction system as claimed in claim 15, wherein said predetermined priority sequence is set in a table of conditions for associating the intersections based on a kind or type of character such as alphabets including Japanese Katakana characters and Japanese Hiragana characters.

17. The image extraction system as claimed in claim 1, wherein said straight line extracting means comprises:

first means for extracting a straight line portion from each partial pattern out of the partial patterns extracted by said connected pattern extracting means, with respect to a block frame which is partitioned into frames of 1 character each; and second means for determining whether the straight line portion extracted by said first means forms a part of the frame.

18. The image extraction system as claimed in claim 17, wherein said second means determines whether the straight line portion is a part of the frame depending on whether the straight line portion extracted by said first means is perpendicular to and reaches a straight line portion on an outermost part within the partial pattern.

* * * * *

UNITED STATES PATENT AND TRADEMARK OFFICE
CERTIFICATE OF CORRECTION

PATENT NO. : 5,572,602  Page 1 of 2
DATED : November 5, 1996
INVENTOR(S) : Satoshi NAOI, et al.

It is certified that error appears in the above-indentified patent and that said Letters Patent is hereby corrected as shown below:

Title Page, Item [56], line 3, delete "4,741,095" and insert -- 4,741,045 --.
Column 1:
    Lines 16-17, delete "characters, increase" and insert -- characters increase, --.
    Line 23, delete "th" and insert -- the --.
Column 2, line 29, delete "191" and insert -- 192 --.
Column 6, line 65, delete "FIG." and insert -- FIGS. --.
Column 7, line 25, delete "51A." and insert -- 51A, --.
Column 9:
    Line 5, delete "inetrpolating" and insert -- interpolating --.
    Line 16, delete the first occurrence of "the" and insert -- a --.
    Line 17, delete "a" and insert -- the --.
Column 10, line 59, after "intersections" insert -- , --.
Column 12:
    Line 5, delete "connected" and insert -- Connected --.
    Line 51, paragraph indentation.
Column 14, line 22, delete "$TH_L$" and insert -- $TH_L'$ --.
Column 16, line 53, delete "Lx" and insert -- $L_X$ --.
Column 17, line 54, delete "connected" and insert -- Connected --.
Column 19:
    Line 38, delete "is2," and insert -- js2 --.
    Line 59, delete "is2," and insert -- js2 --.
Column 21, line 6, indent.
Column 28, line 40, delete "connected" and insert -- Connected --.
Column 29, line 58, delete "Pate" and insert -- rate --.
Column 31, line 43, delete first occurrence of "of the".
Column 36, line 41, before "In this embodiment. . .". insert paragraph indentation.
Column 41:
    Line 23, delete "0n" and insert -- On --.
    Line 36, delete "portion-which" and insert -- portion which --.

UNITED STATES PATENT AND TRADEMARK OFFICE
CERTIFICATE OF CORRECTION

PATENT NO. : 5,572,602            Page 2 of 2
DATED       : November 5, 1996
INVENTOR(S) : Satoshi NAOI, et al.

It is certified that error appears in the above-indentified patent and that said Letters Patent is hereby corrected as shown below:

Line 46, after " ∠ " insert -- -- (one space).

Signed and Sealed this

Eighteenth Day of February, 1997

Attest:

BRUCE LEHMAN

*Attesting Officer*        *Commissioner of Patents and Trademarks*